US012775664B2

(12) United States Patent
Rey et al.

(10) Patent No.: US 12,775,664 B2
(45) Date of Patent: Oct. 27, 2026

(54) AGGREGATION, ORGANIZATION, BRANDING, STAKE AND MINING OF IMAGE, VIDEO AND DIGITAL RIGHTS

(71) Applicant: POPOLOGY Megaverse LLC, Philadelphia, PA (US)

(72) Inventors: Joe Rey, Collingswood, NJ (US); Daniel Rush, Philadelphia, PA (US)

(73) Assignee: POPOLOGY Megaverse LLC, York, PA (US)

( * ) Notice: Subject to any disclaimer, the term of this patent is extended or adjusted under 35 U.S.C. 154(b) by 0 days.

(21) Appl. No.: 19/218,424

(22) Filed: May 26, 2025

(65) Prior Publication Data

US 2025/0335503 A1 Oct. 30, 2025

Related U.S. Application Data

(63) Continuation of application No. PCT/US2023/081111, filed on Nov. 27, 2023.

(51) Int. Cl.

| | |
|---|---|
| ***G06F 16/00*** | (2019.01) |
| ***G06F 16/735*** | (2019.01) |
| ***G06F 16/738*** | (2019.01) |
| ***G06F 21/10*** | (2013.01) |
| ***G06Q 30/0251*** | (2023.01) |
| ***G06V 10/70*** | (2022.01) |

(52) U.S. Cl.
CPC .......... *G06F 16/735* (2019.01); *G06F 16/738* (2019.01); *G06F 21/106* (2023.08); *G06Q 30/0251* (2013.01); *G06V 10/70* (2022.01)

(58) Field of Classification Search
CPC ........ G06F 16/00; G06F 16/41; G06F 16/735; G06F 16/738; G06F 16/44; H04L 9/50; H04L 2209/56; G06Q 30/0251
See application file for complete search history.

(56) References Cited

U.S. PATENT DOCUMENTS 12,003,622 B1 * 6/2024 Anderson ............... H04L 9/085
2019/0362441 A1 * 11/2019 Doyle .................... G06Q 10/40
2024/0045571 A1 * 2/2024 Leon Guerrero ..... G06F 3/0482

* cited by examiner

*Primary Examiner* — Cheryl Lewis
(74) *Attorney, Agent, or Firm* — The Law Offices of Louis M Heidelberger

(57) ABSTRACT

Systems and immersive methods are provided for aggregation and organization of image, video and digital rights data. In an exemplary embodiment, a system and method for aggregation and organization of media data acquired from a plurality of sources is provided. The system and method include a data collection element, a brand commercial (POPmercial) placement for sponsorship element, a stake and mining rewards (Futures In Popular) against placed media element and a user interface that allows publishing of a unique curated media stream as a first-time-ever NFT BROADCAST, (POPcast).

30 Claims, 29 Drawing Sheets

1c
1c-1
3b
1e
1
2
4
5
75

Fig. 6
POPOLOGY
Welcome to POPOLOGY® Networks!
New User Registration
Sign up
Log in

Fig. 14
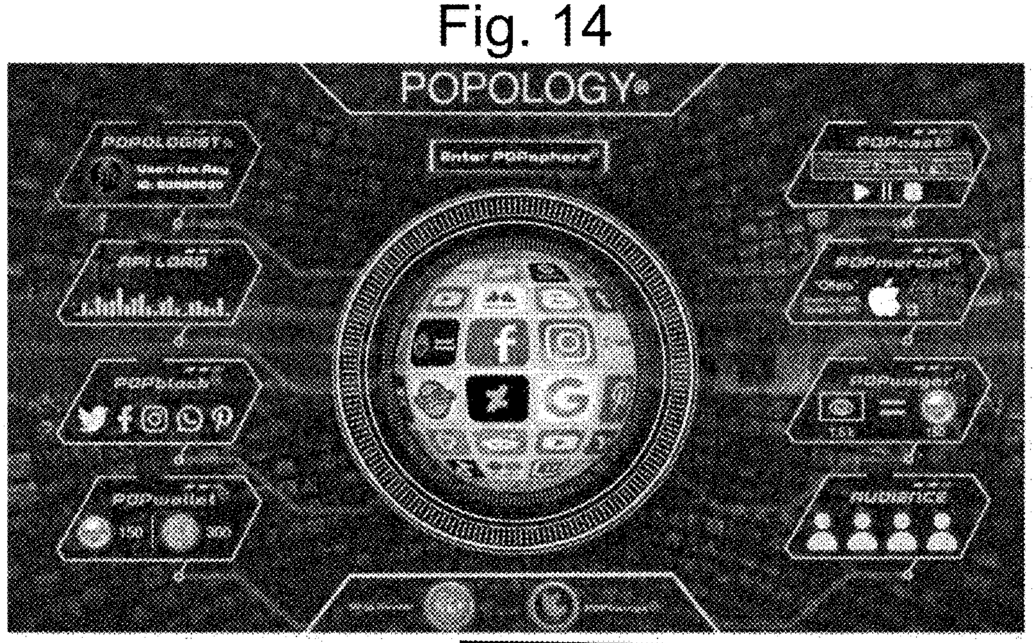
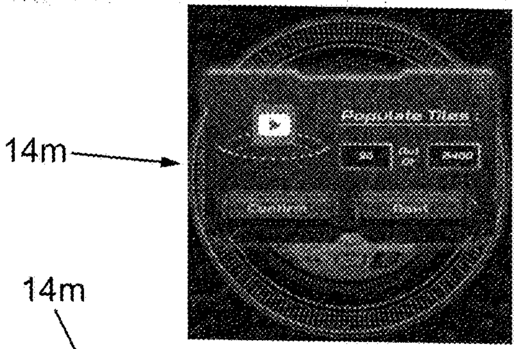
Fig. 14A
Fig. 14B
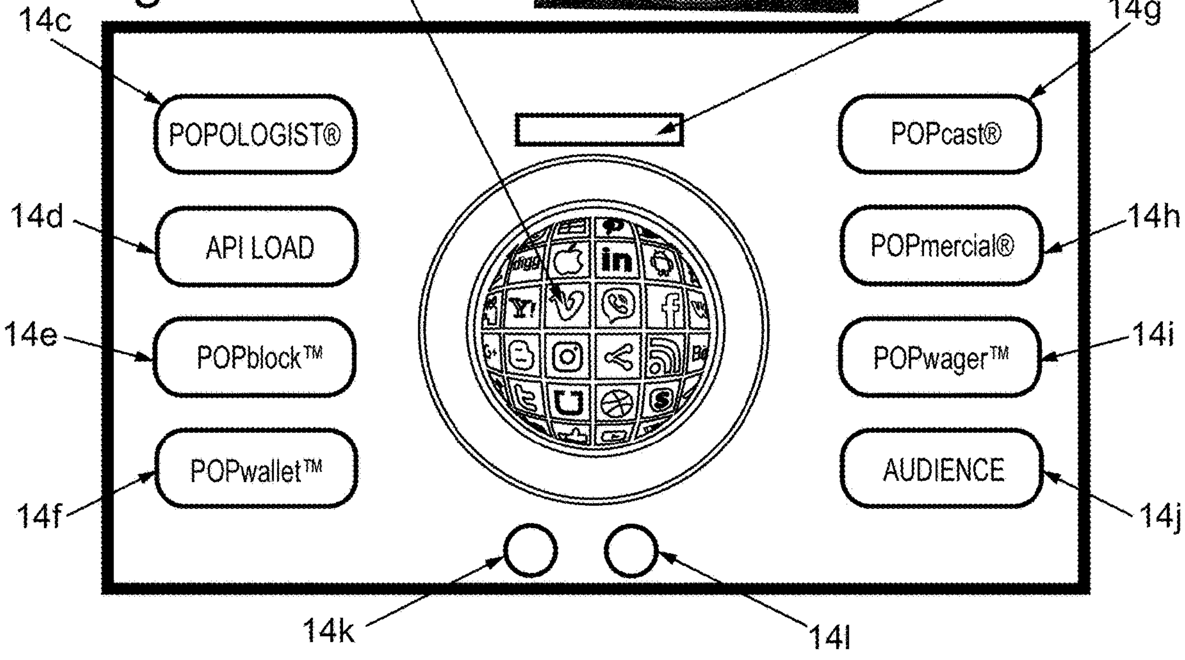

Fig. 18
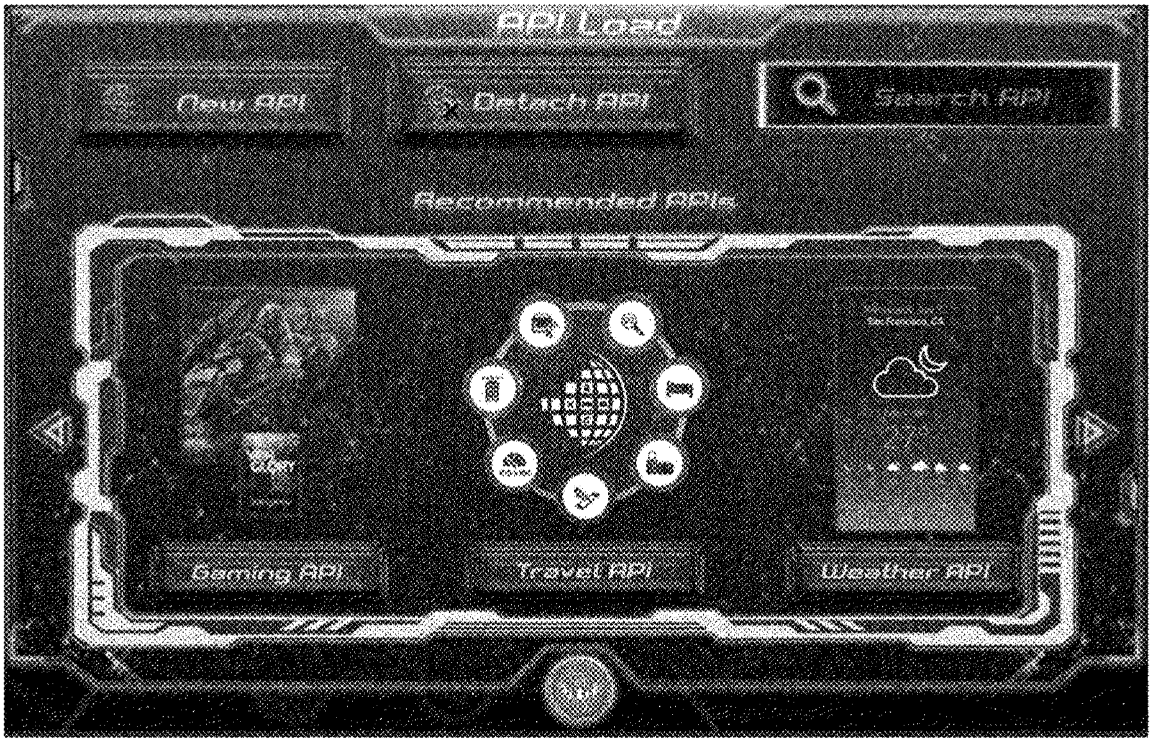
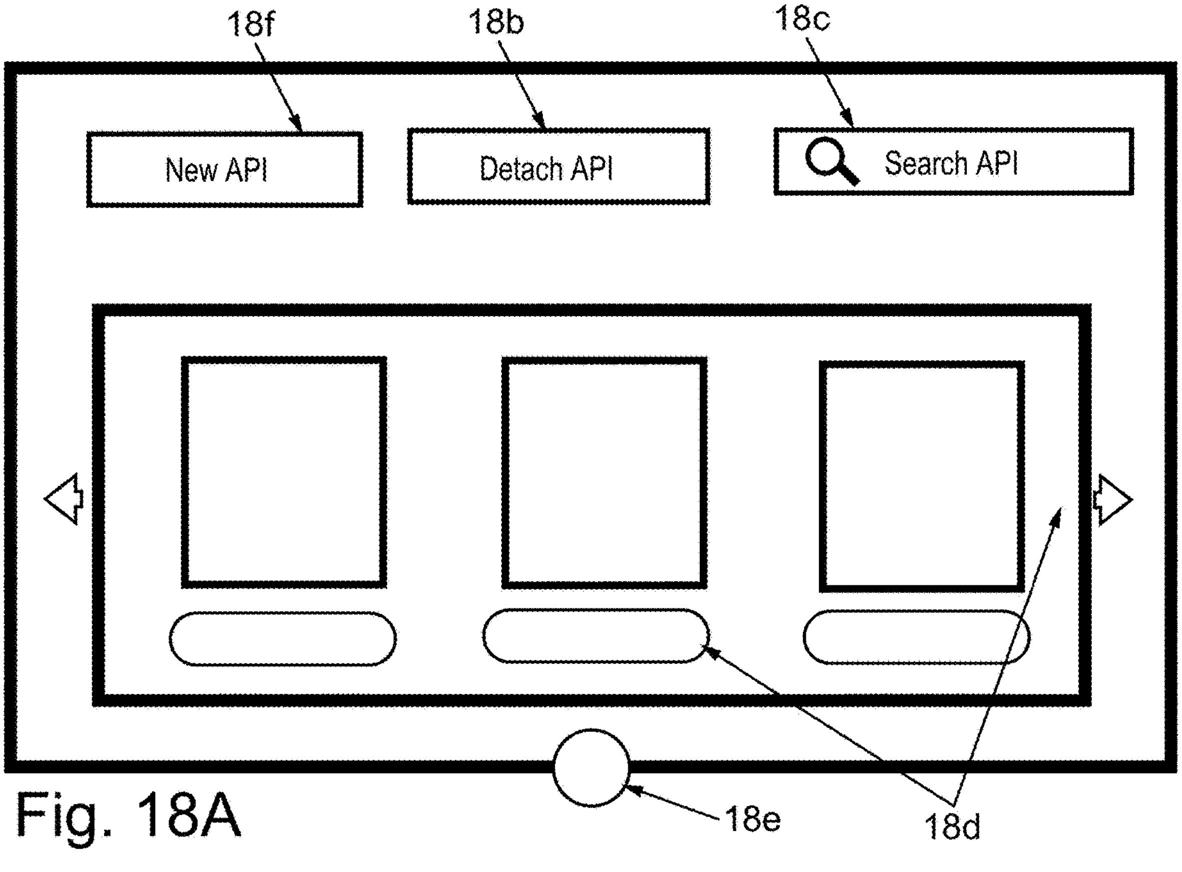
Fig. 18A

Fig. 20
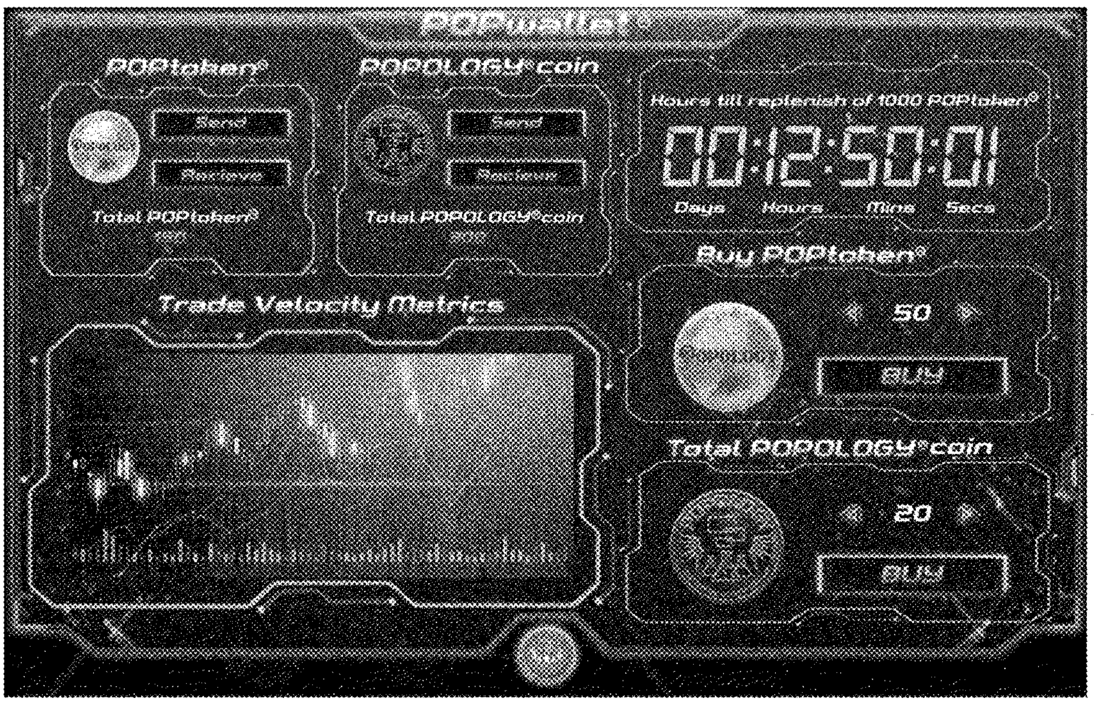
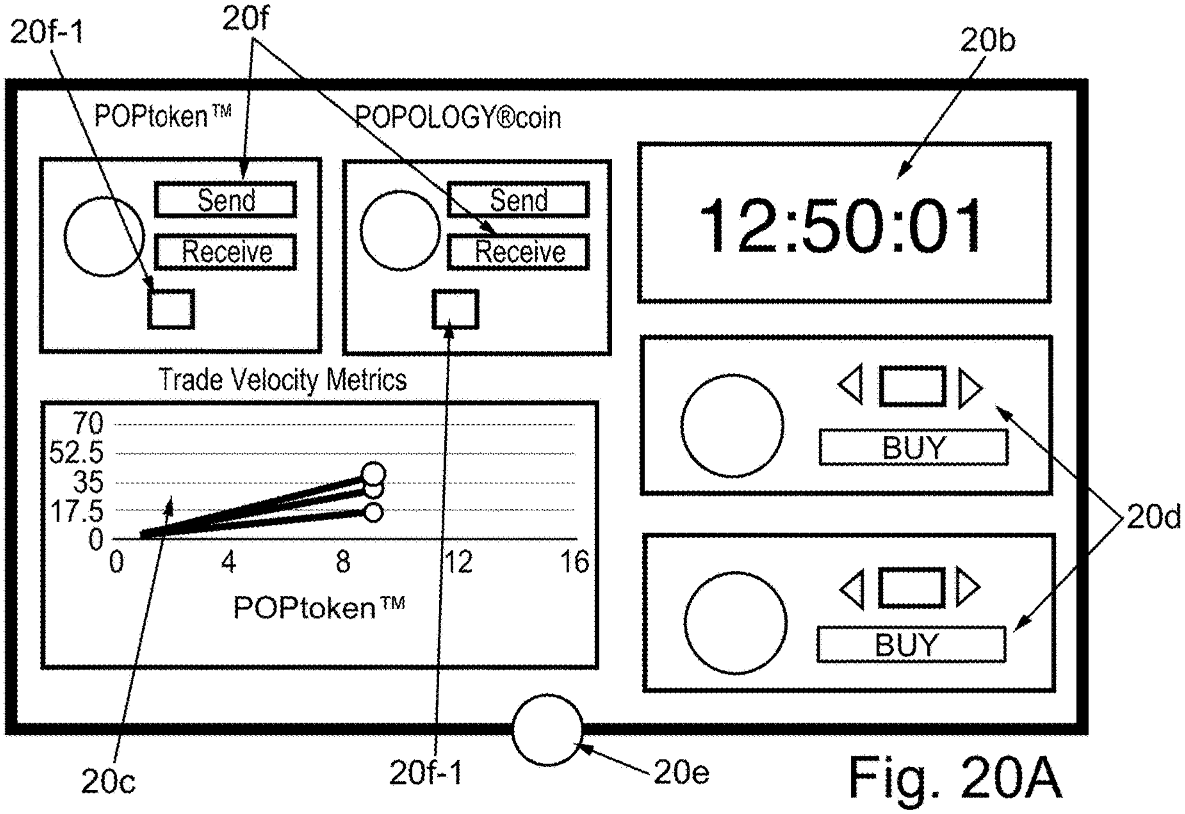
Fig. 20A

Fig. 21
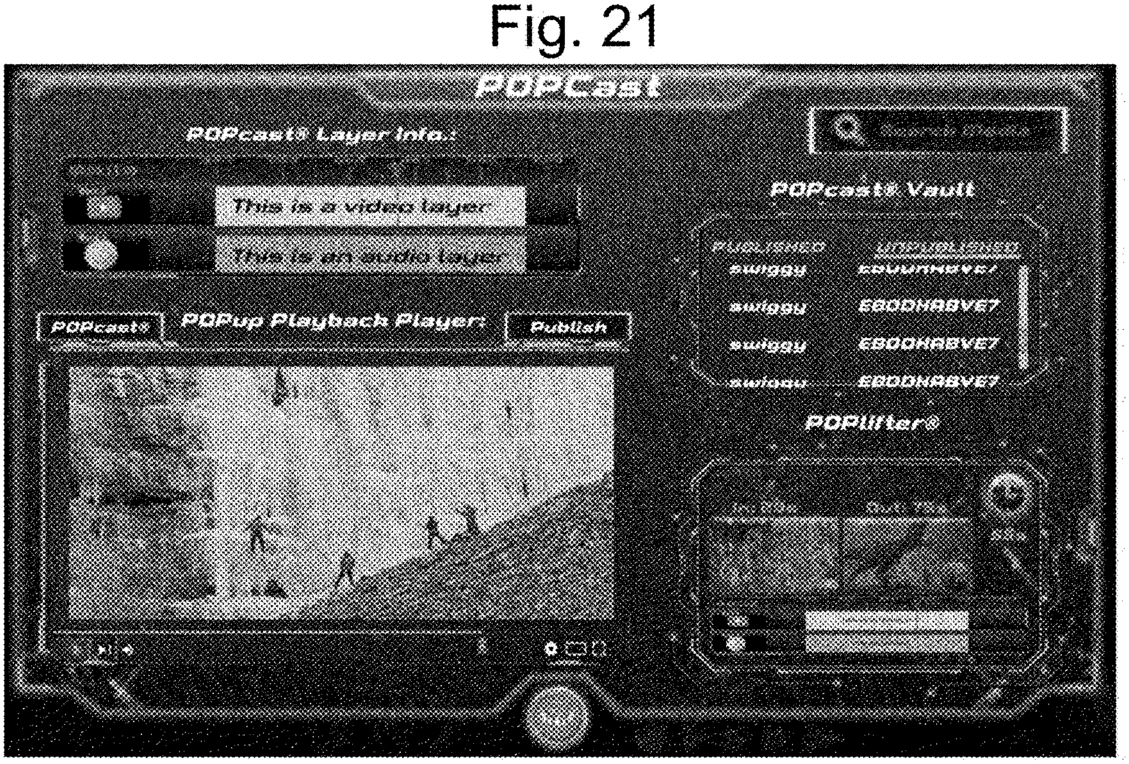
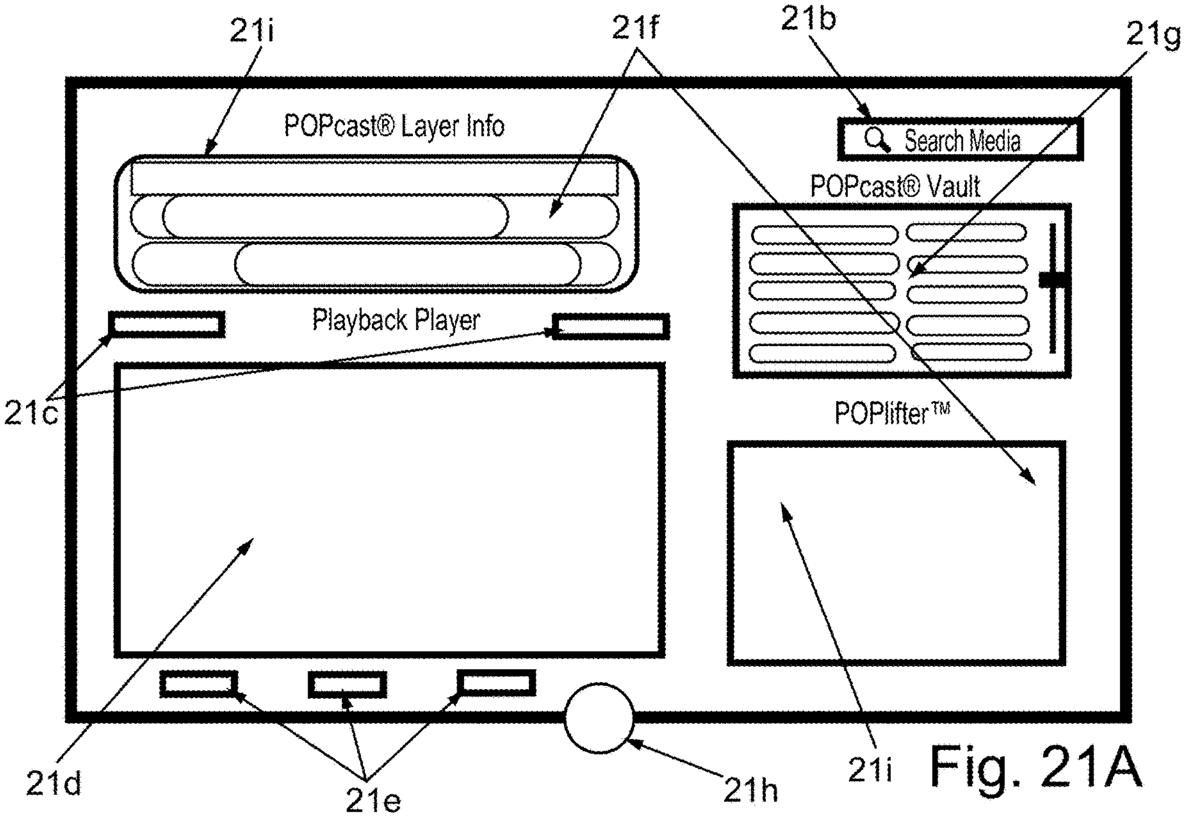
Fig. 21A

Fig. 22
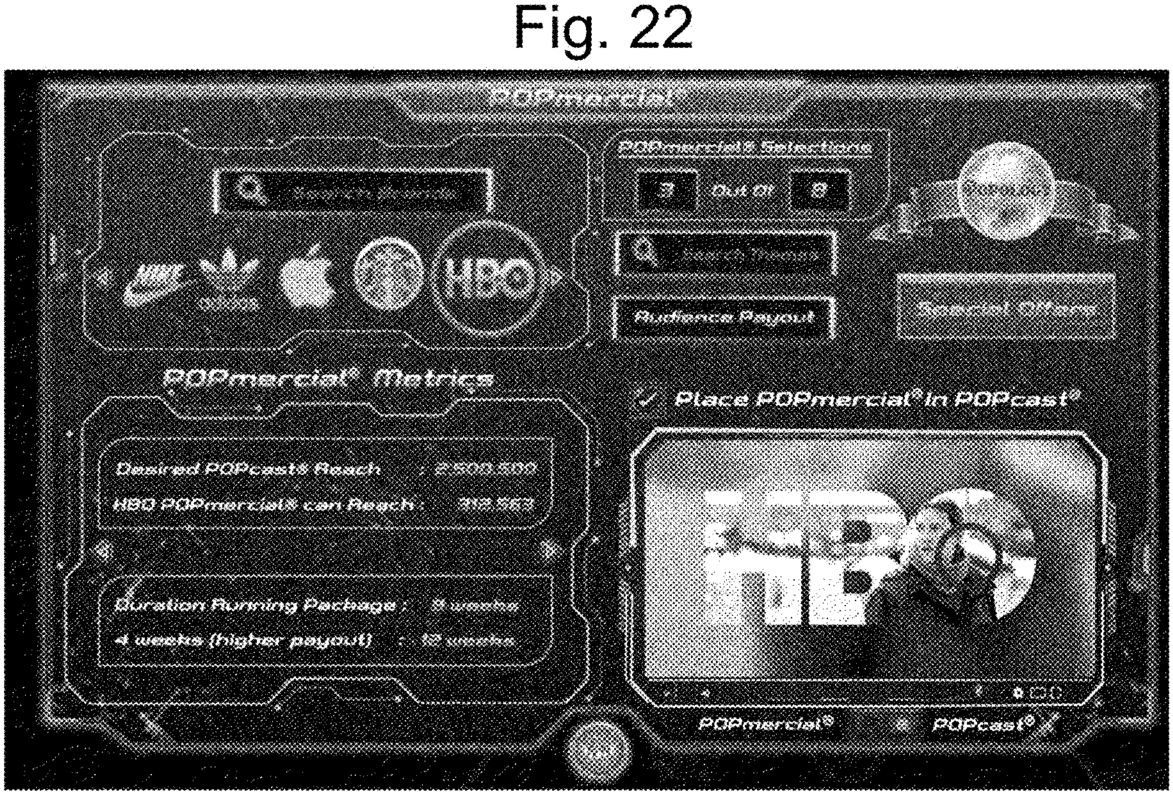
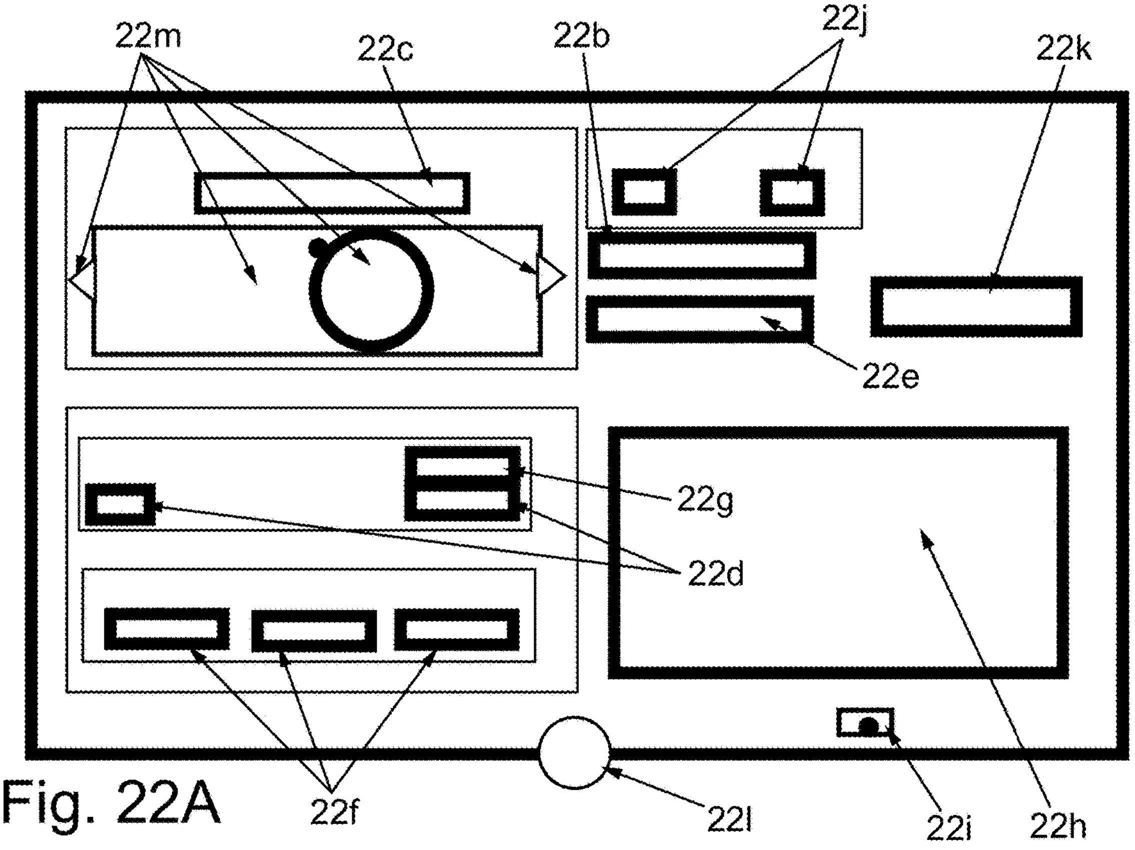
Fig. 22A

Fig. 23
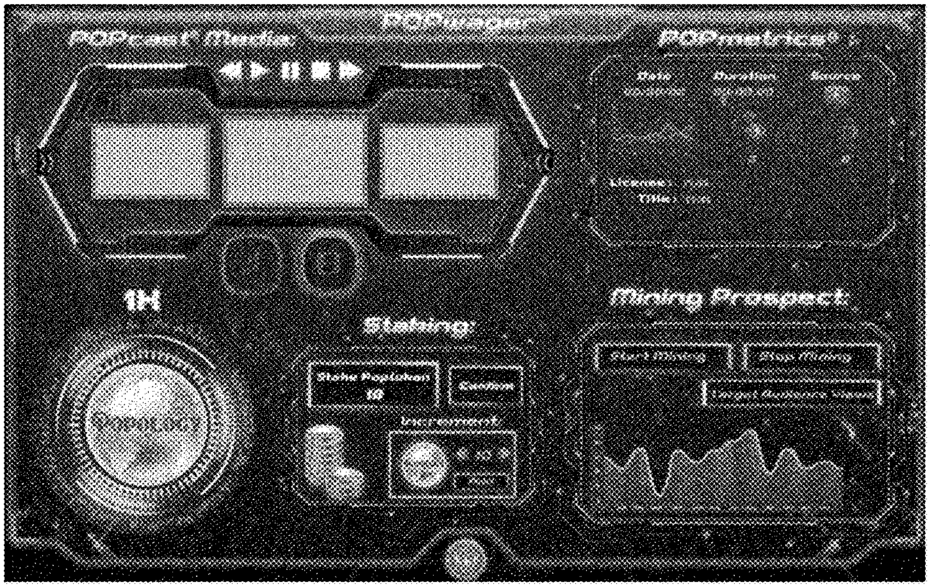
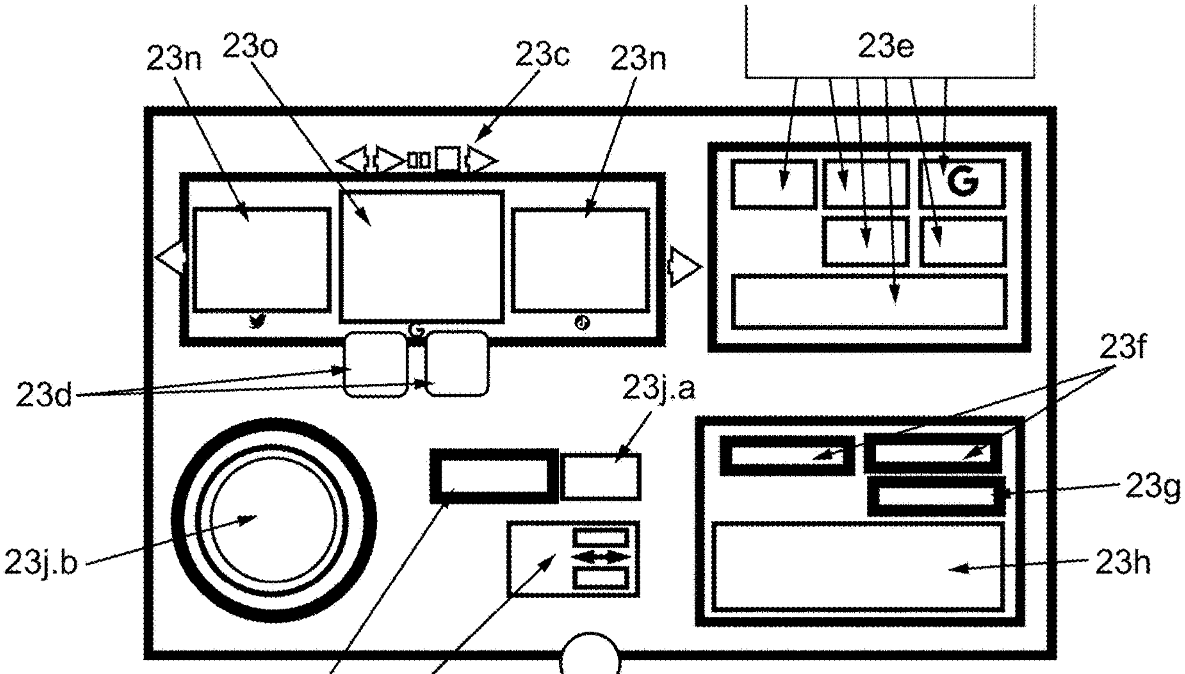
Fig. 23A
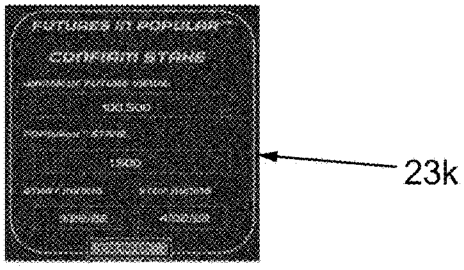
Fig. 23B

AGGREGATION, ORGANIZATION, BRANDING, STAKE AND MINING OF IMAGE, VIDEO AND DIGITAL RIGHTS

RELATED APPLICATIONS AND FIELD OF THE INVENTION

Related Application

This application is a by-pass continuation application of PCT/US2023/81111, filed 27 Nov. 2023 with claims amended under Article 19(1) that were submitted 23 Aug. 2024.

FIELD OF INVENTION

The present invention generally relates to the organization and aggregation of image, video and digital rights data and assets acquired from a plurality of sources that may include various API components, a sponsorship or brand element and a stake and/or mining rewards for a user. These digital rights may be blockchain ledgered for appropriate reimbursement as non-fungible tokens ("NFTs") in recognition of fair use reporting.

BACKGROUND

The current internet paradigm, termed Web 2.0, is defined by the prevalence of user-generated content and enhanced end-user interactivity aggregated onto Internet platforms. Accessibility of content is mediated by search engines and software systems managing the process of locating content on the basis of proprietary indexing algorithms. Single users generally maintain the usage of a single preferred search engine despite their expansion in count, including Google, Yahoo, Yandex, Bing or DuckDuckGo. Differences in algorithms lead to distinctions in content discovery, which may impose the use of several alternative search operations or the use of a meta-search engines capable of aggregating multiple sets of results into a singular curated set. Meta-engines tend to differ in terms of breadth of search-engine integrations, with limitations being specific to the chosen meta-search provider: DogPile.com combines results from Google, Yahoo, Ask and Live; Surfwax gathers results from Ask.com, About.com, Entireweb, Business.com, Gigablast, Wisenut, ODP; while Clusty may access Ask.com, Gigablast, Live, NY Times, ODP, Shopzilla and Yahoo. Thus, the limiting factor arises from the implication that vetting headlines impose an additional time commitment.

An additional layer of risk is imposed by the novel patterns of data gathering from the platforms. The increasing user sensitivity to the phenomenon, combined with slow uptake or extension of legal solutions such as General Data Protection Regulation (GDPR), Personal Data Protection Law (PDPL), or various sets of local laws and regulations such as California's Consumer Privacy Act (CCPA), renders lack of privacy to be an increasingly pivotal determinant of user behavior online especially given the psychological sense of inequity imposed by the profits accrued from the use of the data without tangible rewards given back to the user.

Excessive usage of brand marketing and advertisement tailored on the basis of specialized algorithms able to sift and interpret the data collected from users had been perceived and reported to be generators of distress, discomfort, and forced repetitive cycles as seen in the example of skipping advertisements before a Youtube Video or closing a pop-up banner which loads before an article. Brand retention and relevance in a manner supportive of audience interests is progressively diminished by the user experience.

User Loyalty to a single leading brand search engine may be regarded as a self-imposed limitation to content prioritized by the given algorithms, as a direct implication of their specific set of peculiarities, business interests or internal design priorities and decisions. Considering the extensive yet constantly expanding range of media content created and distributed online, novel manipulation strategies including misinformation campaigns, which have been posing increasingly augmented security risks, as a direct result of the increased comprehension of the vulnerabilities of search algorithms and the mechanics through which they can be abused for propagating messages that appeal to the beliefs and propensities of unaware users. Aggregation of data from multiple sources provide an inherent defense mechanism against this concern, given how unrelated search engines do not experience the same vulnerabilities and are thus able to cancel out malignant or manipulated streams of information.

POPOLOGY facilitates an exclusive user experience built upon custom/self-reported preferences of their preferred social (SM), search (SE), over the top (OTT) and video on demand (VOD) subscription services. These services usually predicate invasive algorithms to user behaviors (online activities) and tracking for internal data use. POPOLOGY sources these aggregated algorithms into refocused efficiency to the users, designed to enhance the functionality of a customized meta-search engine with the addition of a reward mechanism through which aggregated behaviors (online activities) and preferences can be value-locked via megabyte tracking on the blockchain, essentially monetizing and rewarding a user's data in a democratized manner through the issuance of the POPtoken.

The POPOLOGY concept solves the current lack of rewards for content curation due to the dependence of web 2.0 platforms (e.g., Facebook, Instagram, Reddit, Twitter, etc.) on the value curators add in the form of exposure, promotion and viral adoption for the platform's own success, as the value addition is always complementary and potentially higher than the value generated by content creators themselves. Curation is the generalized and primary commodity of online journalizing, posting and reporting. POPOLOGY supports all platforms and enhances the user experience by strengthening curation, and applying a non-competitive, yet still disruptive edge to hub the internet for ease in digital rights tracking. Through the use of Blockchain, digital rights can be preserved and efficiently tracked and considered, thus recovering losses resulting from Digital Rights Piracy. The method involves the use of a private key pair that is platform-specific, with content decryption from digital media work being mediated by the decrypted content key in addition to the curator's requesting fulfillment per the data entry requirements. When content is ledgered on the blockchain these encrypted private keys pair with rewards payments, and reports to copyright holders of content use. Providing an automated backend process for producing Fair Use Reporting, with a calculated crypto rewards payout to all players and fulfilment of copyright owners' digital reports records.

SUMMARY OF THE INVENTION

Systems and immersive methods are provided for internet broadcasting, curations of broadcasts by users, user aggregation and organization of image, video and digital rights data. In an exemplary embodiment, a system for aggregation and organization of media data acquired from a plurality of sources is provided. The system includes a data collection element, a brand commercial (POPmercial) placement for sponsorship element, a stake and mining rewards (Futures In Popular) against placed media element, and a user interface that allows publishing of a unique curated media stream as a first-time-ever NFT broadcast, (POPcast). The development environment is built on UNITY GAME ENGINE/WebGL, C++, MongoDB, ASP.NET Core supporting API calls populating into the immersive workspace which may be a 360 degree spherical workspace, TFS/SVN (Team foundation server/Subversion (version) control system). TFS is an Application Life-cycle Management solution. SVN is source control only. TFS does source control as well as issue tracking, document management, reporting, continuous integration, virtual labs for testing etc.) and Visual Studio 2019, with a staging environment on AWS Server, and Waves Exchange blockchain/crypto service. The data collection element can be configured to receive rewards for the user in merchandising their online (cross platform) behaviors as well. In this behavior, 'digital rights' are appropriately blockchain ledgered for applicable reimbursements and recognition in fair use reporting.

A system for transmission, reception, and accumulation (aggregation) of user selected API key codes is provided to a plurality of image and video content on the internet servicing a media operating system and decentralized digital rights platform invoking fair use reporting and summary reports on metrics of "popular at large," defining true popular in the culture of societies driving from unbranded sources. The POPOLOGY Aggregator redefines the pinpointing for the intensity of SERPs (aka search engine results pages). These SERPs each source different algorithm controls for the ordering and presentation of content, so users see what is most relevant to the platform. These are the pages that Google and other search engines display when you seek information including Content Newsfeeds (aka RSS). This is concise tidbits of content that are distributed on a regular basis that may include hashtags. Started on "X" formerly Twitter, these are keywords that enable readers to search for information on social media using the same word. POPOLOGY combines these customized corporate algorithms to convert their prowesses to a bundled content pipeline that empowers users as commercial grade broadcasters for more robust popularity metrics and data reports.

In one embodiment the following steps are processed: Identify-

Often done entirely by machines, the content is discovered from a variety of established sources based, generally in the form of one or more keywords or phrases. As a result, there's a limited need for human interaction; Select—Choosing the best of the information discovered while eliminating low-quality information and promotions and filters out information that's missing proper attribution or links. This work can be automated; Classify—Place the information into a pre-establish organization such as a list of categories or another method of grouping content; Arrange—Systematically ordering results in an easy-to-understand manner without any tailoring based on product, company, or brand and without additional commentary. Common Arrangements are by publication date or alphabetically by author; Publish—Place the aggregated information on your own or another organization's platforms. Additional commentary or annotation isn't needed. It may include some original text or a link or citation to the original source and may also distinguish between the third party and original content.

The User Interface Section embodiment may have a 360 degree immersive workspace with over 2400 tiles to view with an x, y, z axis navigation. Populating from one keyword search and masking over, for example, 25 aggregated platform APIs into its spherical domain. One POPtoken is withdrawn from users POPwallet for each tile placed in POPcast® timeline.

The intervention Section embodiment allows search result tiles to be dragged and dropped to the POPcast timeline and ledgered onto the POPblock (blockchain). Each tile placement is expensed one POPtoken and may be tracked on a smart contract as well. In another embodiment there may be a console inside the POPsphere that may access all dashboards, prompt media viewing, and may serve as a conference monitor while building a POPcast.

The Response Section embodiment may permit tapping on the tiles to view them on the player, drag and drop them into the POPcast Timeline, and/or stake a POPtoken wager for mining additional POPtoken rewards for correctly forecasting increase of the selected media views in a specified measure of time relating to Futures in Popular to the transaction ledger on the blockchain. Users may be able to create, interact, publish, share and add the security of their content with the POPsphere.

Disruptive Characteristics may include: (1). Customizable aggregation of search engine results through permitting users to select or create their preferred search algorithm. Potential arises for curating one's own multimedia content based on each individual's specific selected interests, creating a unique experience of content discovery and consumption through the special design of the Application Environment/UI/UX, that may consist of a 360° scrollable spherical area lined with 2400 rectangular content windows gathering results from a plurality of and preferably 3 to 25 user selected platforms such as Facebook, Instagram, Daily Motion, Youtube, TikTok, Vimeo, Bing, Yandex and Google etc, named and/or color coded on the POPsphere. The size of the content roster presented at-a-glance permits cross-checking of contrasting content, encouraging objective assessments, and diminishing efficiency of misinformation campaigns, as well as entirely eliminating the echo-chamber effect. (2). A user-oriented income generation mechanism is developed by the introduction within POPcast of a section of the application where users can watch and place commercials (POPmercial) at will in the interest of being paid a portion of the cost of advertising in the form of POPtoken. This introduces extensive gamification, customizable data retention and processing that targets commercials based on user-defined interests for brands where interest is already present, in addition to the seamless integration within the consumed curated content collection; and 3. The Stake and "Green Mining" premise introduces additional rewards through collection of video-related meta-data on a subject such as "true popular" metrics. This enables a unique implementation of proof-of-work (a form of cryptographic proof in which one party proves to others that a certain amount of a specific computational effort has been expended), and a novel mechanism for mining in-app POPtoken whilst assuring value creation through user-provided weightings. A wagering mechanism is introduced to expand the active earning potential on the basis of predicting future video views on a user-defined time frame and with a user-selecting staking amount. An essential target achieved by the aforementioned mechanisms assures a green implementation, devoid of large computational need or energy consumption. The uniquely accessible value of the VIEWS counter participates in the crypto-graphical block generation through as a unique seed contributing as a nonce to the algorithm for consensus generation.

In one embodiment the user may select various API component search engines, which may include combined search engines, meta-data and social media. The selection may be from sites the user regularly uses so the algorithms for these sites may conform to the users preferences and behaviors developed from the users past searches. A result of such uses the user employs unique algorithms based upon the user's selections, further in view of the past user searches. The user may use the results of such selections to develop a POPcast, or stream of content to fabricate a concept, story, description, report, and/or trailer that conveys a particular aggregation of content.

In another embodiment, the user may select various brands and commercials to use in and insert as the user deems appropriate into the POPcast. These brands and/or commercials may be ledgered such that the brand owners are compensated by individuals that view the brands and/or commercials including in the form of POPtoken. The combination of the POPcast with the brands and/or commercials creates a seamless integration of curated content that can be rewarded due to trackable records on the blockchain.

In yet another embodiment a POPcast may be rewarded in the form of wagering POPtoken for the number of views any or all selected videos in the POPcast will receive within a specified timespan. As the wagering becomes more aggressive in the form of amount and timespan to achieve a viewership result, the POPOLOGY algorithms may suitably reward the wagerer in view of the circumstances, namely, the more aggressive the wager the higher the reward. The uniquely accessible value of the VIEWS counter participates in the crypto-graphical block generation through as a unique seed contributing as a nonce to the algorithm for consensus generation.

BRIEF DESCRIPTION OF THE DRAWINGS

FIG. 6 is a Splash Screen Signup or Log In.

FIG. 7A Splash Screen Select "Interests" from Icons. screen, A computer-implemented method comprising users interests in General Interests and associations by popping the moving logos-encased in bubbles to aggregate into your POPOLOGIST profile Dashboard presenting a user interface to confirm selections made before moving on.

FIG. 8A Splash Screen Select "People" from Icons screen is illustrative of a computer-implemented method comprising users interests in Celebrity associations by popping the moving logos incased in bubbles to aggregate into your POPOLOGIST Dashboard presenting a user interface to confirm selections made before moving on.

FIG. 9A Splash Screen Select "Brands" from Logos screen is illustrative of a computer-implemented method comprising users interests in BRAND LOYALTY associations by popping the moving logos incased in bubbles to aggregate into your POPmercial Gallery Dashboard (FIG. 22A) presenting a user interface to confirm selections made before moving on.

FIG. 10A Splash Screen Select "Social Platforms" from Logos screen is illustrative of a computer-implemented method comprising users memberships to aggregate Social Media associations by popping the moving logos incased in bubbles to aggregate into your API LOAD Gallery Dashboard presenting a user interface to confirm selections made before moving on.

FIG. 14 illustrates an embodiment of a POPOLOGY dashboard in accordance with the present invention.

FIG. 14A illustrates an embodiment feature to configure APIs to the 2400 tile POPsphere in accordance with the present invention.

FIG. 14B illustrates an access button to enter a user interface for the POPshere in accordance with the present invention.

FIG. 18 illustrates an exemplary API dashboard for aggregation and organization or a variety of use support systems in accordance with the present invention.

FIG. 18A illustrates the key components in FIG. 18A in accordance with the present invention.

FIG. 20 illustrates an exemplary blockchain dashboard technique for controlling exemplary blockchain ledgering services in accordance with the present invention.

FIG. 20A illustrates send/receive options in accordance with the present invention.

FIG. 21 illustrates an access of exemplary techniques for implementing a video link processing pipeline in accordance with the present invention.

FIG. 21A illustrates an exemplary custom in-point/out-point module in accordance with the present invention.

FIG. 22 exemplary dashboard for placement of advertising campaigns in a streaming POPcast in accordance with the present invention.

FIG. 22A exemplary slider and selector ring element in accordance with the present invention.

FIG. 23 exemplary POPwager dashboard facilitating the "Futures In Popular" feature in accordance with the present invention.

FIG. 23A exemplary slider media tile element with content module 230 and content components 23*n* in accordance with the present invention.

FIG. 23B exemplary wager engagement element in accordance with the present invention.

DETAILED DESCRIPTION OF THE PRESENT INVENTION

Figure 1:
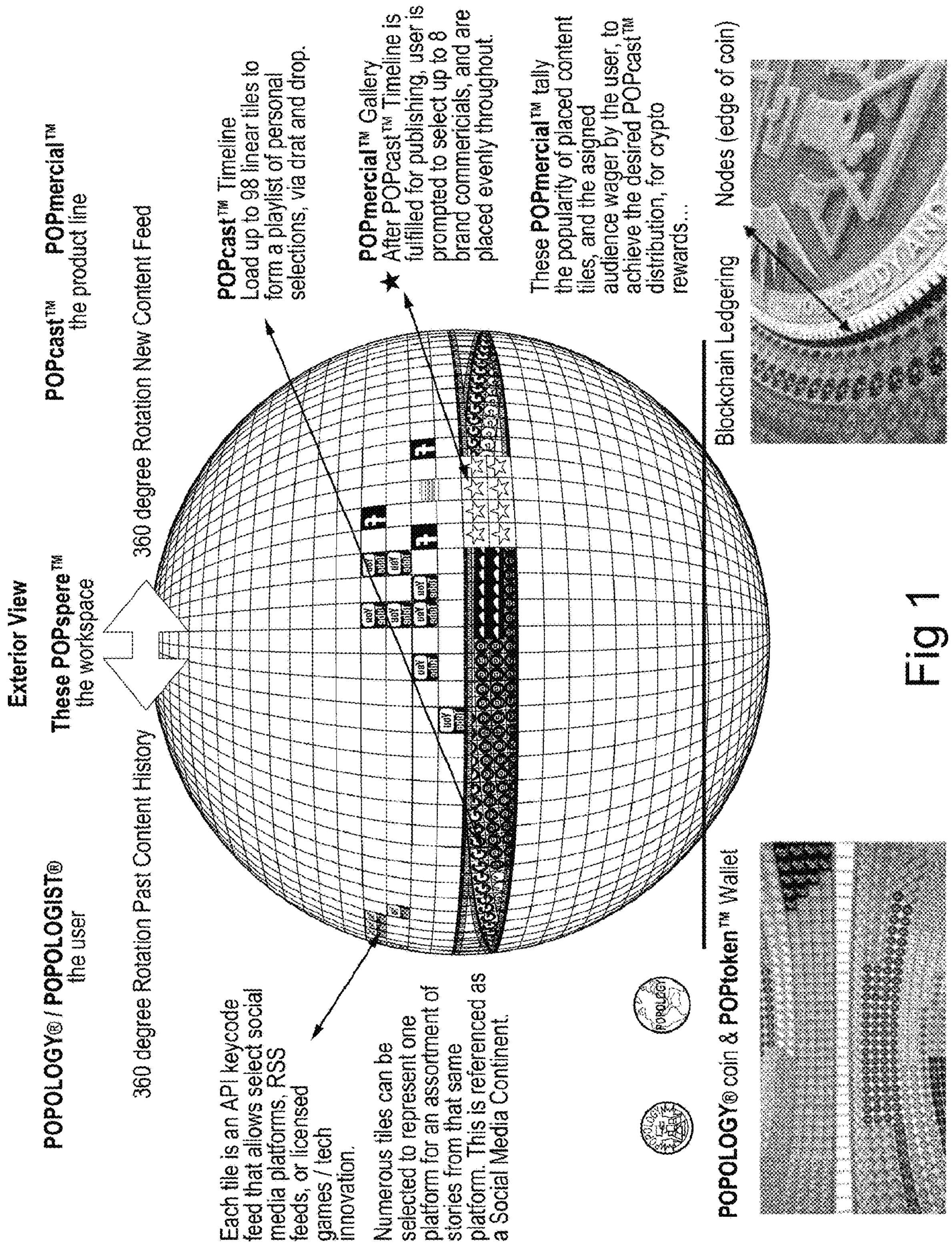
FIG. 1 illustrates the Sphere and FIG. 1A illustrates a representative API tile in the Sphere in accordance with the present invention.

The following is a description of one or more exemplary embodiments of the present invention. POPOLOGY is a digital platform for media rights, intellectual property rights, payments and indexing. Unlike other Social Media platforms, POPOLOGY is designed to reward curators and creators of media content.

To do this, POPOLOGY Networks indexes and computes key metrics designed to measure true popular. These key metrics trace the foundations of democracy, following the ideas that percolate, by and for the people. This index is tabulated using the world's most powerful blockchain technology, to create a shared, secure ledger. This is served to everyone using a POPOLOGY web-based app.

Using the POPOLOGY blockchain ledger, the Key Performance Indicators (KPIs) can be automatically tallied and securely shared. These KPIs can be used to create digital tokens and coins on the POPOLOGY blockchain ledger. The value of these digital tokens and coins will be backed by the media network's ad revenues and trade velocity. This allows POPOLOGY networks to share ad revenue with the artists, players and curators, in exchange for KPIs.

POPOLOGY Networks minted 2 digital currencies: POPtoken and POPOLOGY coin. POPtoken can be used with the Prize Wall, a collection of promoted items that can be delivered directly to the consumer. For tax compliance reasons, POPtoken cannot be directly exchanged for fiat currency, like the US dollar.

POPtoken can be exchanged for POPOLOGYcoin. POPOLOGY coin can be used with the Store Front, a collection of premium promoted items and tickets for live experiences. These items have a value in US dollars, and POPOLOGYcoin exchanges may be subject to gift tax. Unlike POPtoken, POPOLOGYcoin can be exchanged for fiat currency, like the US dollar. This will put POPOLOGYcoin in the same fiat exchange as other crypto to spend on retail sites like Amazon and/or in connection with credit card rewards.

A curator can earn POPtoken by curating content into a POPcast. Simply create a playlist, add brands for POPmercial ad spots, and share with players. When players consume the content and view the POPmercial ad spots, audience POPtoken are distributed to the player, the curator, and the copyright holder.

A curator can earn more POPtoken by predicting the future of popularity of respective videos selected in their POPcast. Wager your POPtoken in "Futures in Popular". If your predicted view count is reached before the prediction time limit, you win POPtoken!

A prospector can earn POPtoken by predicting the popularity of a piece of media. Simply select a piece of media already chosen in your POPcast, see the historical view counts, and make a prediction. Wager your POPtoken in "Futures in Popular". If the predicted view count is reached before the prediction time limit, you win up to 20× POPtoken!

A curator can receive rewards from sponsors with their POPcast Sponsor Wall. The top contributing sponsor appears at the top of the Sponsor Wall. Each sponsor's contribution of US dollars is exchanged for a verified spot in the blockchain ledger, known as an NFT (Non-Fungible Token).

This POPtoken goes into the POPcast curator's digital wallet.

In exchange, the list of NFT sponsors appears on the Sponsor wall for the POPcast. This kind of entry in the POPOLOGY blockchain ledger showcases the power of smart contracts and digital micro-licenses.

Only an NFT Sponsor gets the option to purchase the creation an officially licensed, limited edition trading card. This trading card has the cover art of their sponsored POPcast. It also contains a Bluetooth App Clip sticker as proof of authenticity. Scan the sticker with your phone and see the NFT Sponsor Wall. In this shared secure ledger, you can see when the Collectible Trading Card was commissioned, who commissioned it to be made, and the total number of officially licensed cards like this one. These large cards are 5.63×3.31" in size and look great on a table or shelf of collectibles. Extra-Large cards are 24×36" in size, look great on an award wall, accent table or hallway. The proceeds from these Collected Trading Cards go to the curator of the POPcast. An optional acrylic display case makes a great addition, to showcase your support for the arts.

Looking for a rare limited edition 12" Vinyl LP to showcase? An NFT Sponsor gets the exclusive option to purchase the creation of an officially licensed, limited edition Vinyl Record of the POPcast. This Vinyl record has the cover art of their sponsored POPcast. The sleeve notes include the artists and track information. The record sleeve itself contains a Bluetooth® App Clip sticker as proof of authenticity. Scan the sticker with your phone and see the NFT Sponsor Wall. In this shared secure ledger, you can see when the Collectible Vinyl Record was commissioned, who commissioned it to be made, and the total number of officially licensed Vinyl Records like this one. An optional acrylic display case makes a beautiful addition to your shelf of collectibles. Showcase your support for the arts. The music royalties for each track, and the curator's royalties are all entries in the POPOLOGY blockchain ledger. What used to be an impractical hassle of phone calls and paper contracts, can now be accomplished with a modern digital smart contract for micro-licensed content. All micro-payments in royalties paid. That's the power of the POPOLOGY blockchain ledger.

Are you a popular curator? The most popular curators will get noticed by brands. These brands can interact with these curators using POPOLOGY Networks.

Want the curator to like your product? Send them a promotional gift!

Curators have the power to select which brands are included in their POPcast POPmercial ad gallery of spots. This connection is how your brand can reach audiences in a real authentic way.

Join the Sponsor Wall. Want a curator to take notice? Send them a payment of gratitude. The top sponsor of a POPcast is seen by the Players and the Curator POPOLOGIST.

Commission Collectibles. As a member of the Sponsor Wall, you can purchase officially licensed and verified collectible Trading Cards and Vinyl Records. Fit in museum-quality displays, with a digital certificate of authenticity, verified with a special sticker and the POPOLOGY blockchain ledger.

POPOLOGIST Spotlight. Assemble your crew of popular curators. Put them in the POPOLOGIST Spotlight. These promoted crews of popularity ambassadors help you reach your targeted audience in an authentic way. Percolate fresh thinking with POPOLOGIST talent.

Brand Ambassador Collaborations. Bring your brightest curators into your marketing meetings. Your high value POPOLOGIST Brand Ambassadors will help you refine your messaging strategy for your ad campaigns. Infuse your brand with a natural authenticity that really resonates with your audience.

Grant Talent Towards the POPOLOGY Academy for Media Arts. This organization for the arts and sciences is a 501c3 licensed charity. Dedicated to educating K-12 students in filmmaking, philosophy of storytelling and promotions. The next generation of storytellers will have e-learning modules for confident self-expression. Additional studio facilities are available to teach resident artists to make high-quality media.

Grant Talent Awards. Nominate your favorite talent to the annual POPOLOGY Academy for Media Arts Awards Show. This promoted talent will get a feature profile, art review, and editor's pick. The talent will also receive this year's prize package. Includes a year of grant funds and artist residency.

Disruptive Characteristics

Ability to curate your own meta-search engine formula for video and photo content. We enable a user to populate over 2400 video/image stories per pages (in the round) for any search topic from minimum 3 to maximum 25 user platforms selected (aggregated) by the user. The POPsphere automating a unique configuration of trusted search engines and/or social platforms as an immersive content browser. User is able to pre-select and cluster individual data pools into color coded tile continents facilitating a unique attribute of search criteria. Which allows a user to control the unique attributes of information. This ostensibly defines and limits misinformation campaigns via sheer volume of aggregation, and levels the playing field of competitive landscape platforms.

Customizable aggregation of search engine results through permitting users to select their preferred search algorithm, which activates the IConfiguration as an interface for Net Core 2.0. The [Configuration interface is injected as dependency in the Controller and then later used throughout the Controller. The IConfiguration interface is used to read Settings and Connection Strings from App Settings into json file. Now when a user with bundled API algorithms is selecting originative content, they are additionally generating a completely unique one-of-a-kind algorithm. Potential arises for curating one's own multimedia content based on each individual's specific selected interests, creating a unique experience of content discovery and consumption through the special design of the Application Environment/

UI/UX, consisting of a 360° scrollable spherical area lined with 2400 rectangular content windows gathering results from 3 to 25 user selected platforms such as Facebook, Instagram, Daily Motion, Vimeo, Youtube, TikTok, and Google etc, named the POPsphere. The size of the content roster presented at-a-glance permits cross-checking of contrasting content, encouraging objective assessments, and diminishing efficiency of mis-information campaigns, as well as entirely eliminating the echo-chamber effect.

POPOLOGY user assembles a POPcast which allows our users to now place numerous of their favorite choices in sponsored brand ads (POPmercial) into their curated media stream, which facilitates automated brand retention and relevance statistics as required gamification of this platform, and rewards the viewing audience with POPtoken.

A user-oriented income generation mechanism is developed by the introduction within the POPcast as a section of the application where users can watch and place commercials (POPmercial) at will, in the interest of being paid a portion of the cost of advertising in the form of POPtoken. This introduces extensive gamification, customizable data retention and processing that targets commercials based on user-defined interests for brands where interest is already present, in addition to the seamless integration within the consumed curated content collection.

Unique Stake and Mining premise that collects data of true popular metrics and enables proof of work for mining in app tokens to prospect correct audience views in a selected duration of time wagered. We can attribute an energy saving "green" premise with our stake and mining process due to the lack of high-volume energy consumption replaced with the "VIEWS" counter of each platform aggregated that satisfies the needed quantum math required for "Proof of work". The missing numbers in this blockchain node requirement are the Future views number and duration of time selected to stake (or proof of work) against. We call this "Futures In Popular', and is truly innovative as a formula for mining our POPtoken. The Stake and "Green Mining" premise introduces additional rewards through collection of data on the subject of "true popular" metrics. This enables a unique implementation of proof-of-work (a form of cryptographic proof in which one party proves to others that a certain amount of a specific computational effort has been expended), and a novel mechanic for mining in app tokens while assuring value creation through user-provided weightings. A wagering mechanism is introduced to expand the active earning potential on the basis of predicting future video views on a user-defined time frame and with a user-selecting staking amount. An essential target achieved by the aforementioned mechanics assures a green implementation, devoid of large computational need or energy consumption. The uniquely accessible value of the VIEWS counter participates in the crypto-graphical block generation through as a unique seed contributing as a nonce to the algorithm for consensus generation.

Figures 1A, 1B, 1D, 1F, 2A:
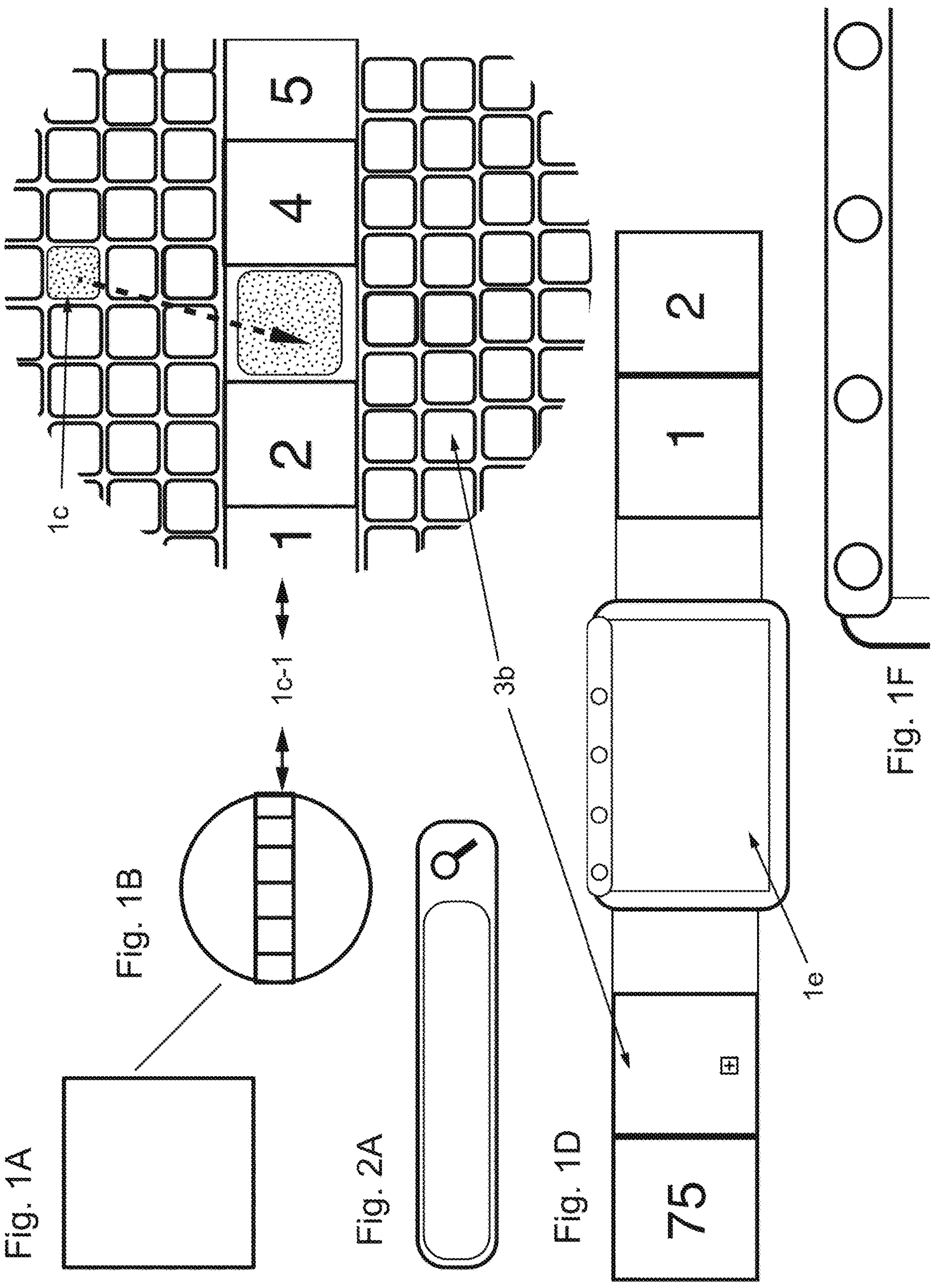
FIG. 1B illustrates a portion of a timeline of representative tiles in accordance with the present invention.
FIG. 1D illustrates a publishable NFT curation of cross platform video and image stories in accordance with the present invention.
FIG. 1F illustrates the top buttons of the internal console in accordance with the present invention.
FIG. 2A illustrates a POP-up Search Bar Feature for cross platform keyword search, also Search Bar feature on POPsphere Console Appliance in accordance with an embodiment of the present invention.

FIG. 1A is an API Aggregation of up to 25 USER Social or Search Browser Platforms Ledgering use behaviors on the POPOLOGY Blockchain.

FIG. 1B is a POPsphere timeline where up to 2400 tiles are populating stores that can be drag and drop tiles 1*c* to a publishable (1*c*-1) POPcast Timeline.

FIG. 1D is a POPcast Timeline with a PUBLISHABLE NFT CURATION of Cross Platform VIDEO and Image Stories. Content is visable only on exclusive player tracked on the blockchain for viewing behaviors-; le illustrates a POPsphere Internal Console to access platform dashboards in accordance with the present invention.

FIG. 1F is a POPsphere Internal Console is used to access platform dashboards. 1*f*._Top buttons which access CREATE, SAVE, PUBLISH, and POPmercial Features.

FIG. 2A (Space Bar+CTRL) prompts POP-up Search Bar Feature for crossplatform keyword search, also Search Bar feature on POPsphere Console Appliance.

Figure 3:
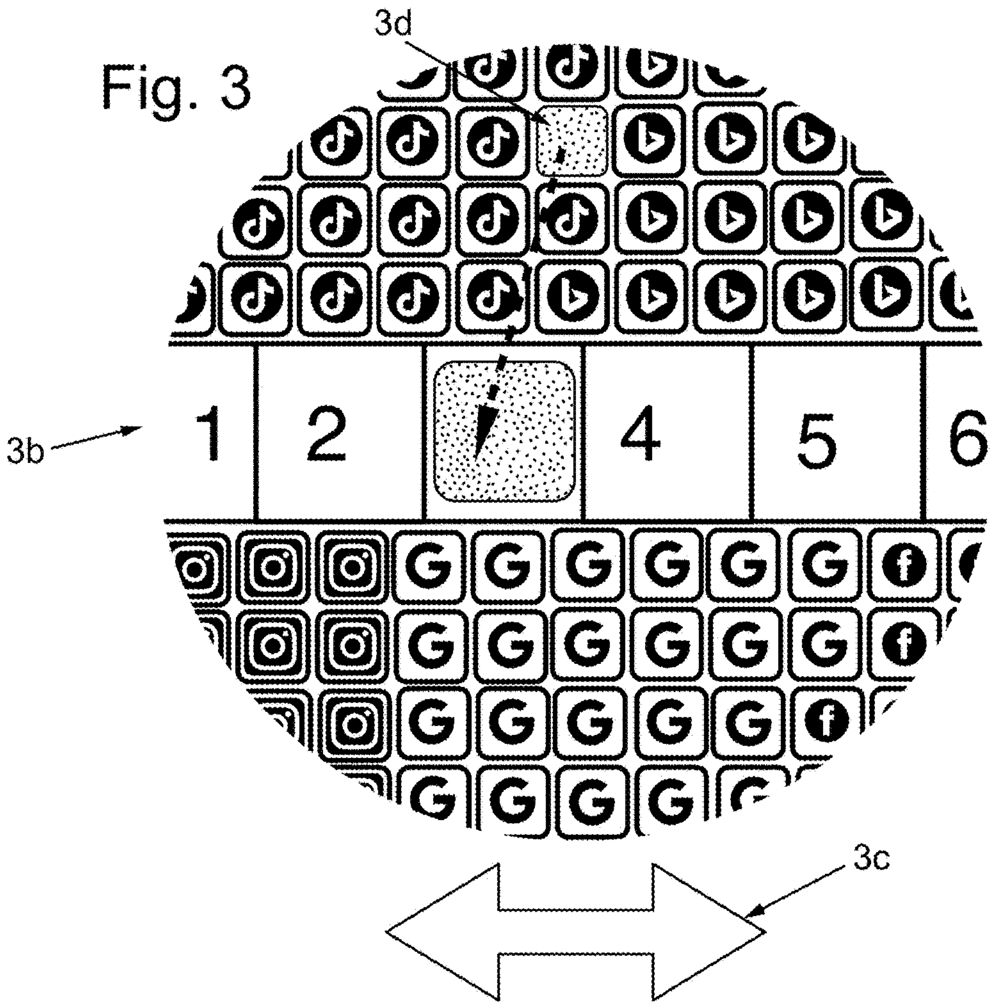
FIG. 3 shows search result tiles (POPsphere) from a few API components, and a curation timeline in accordance with the present invention.
Figure 3A:
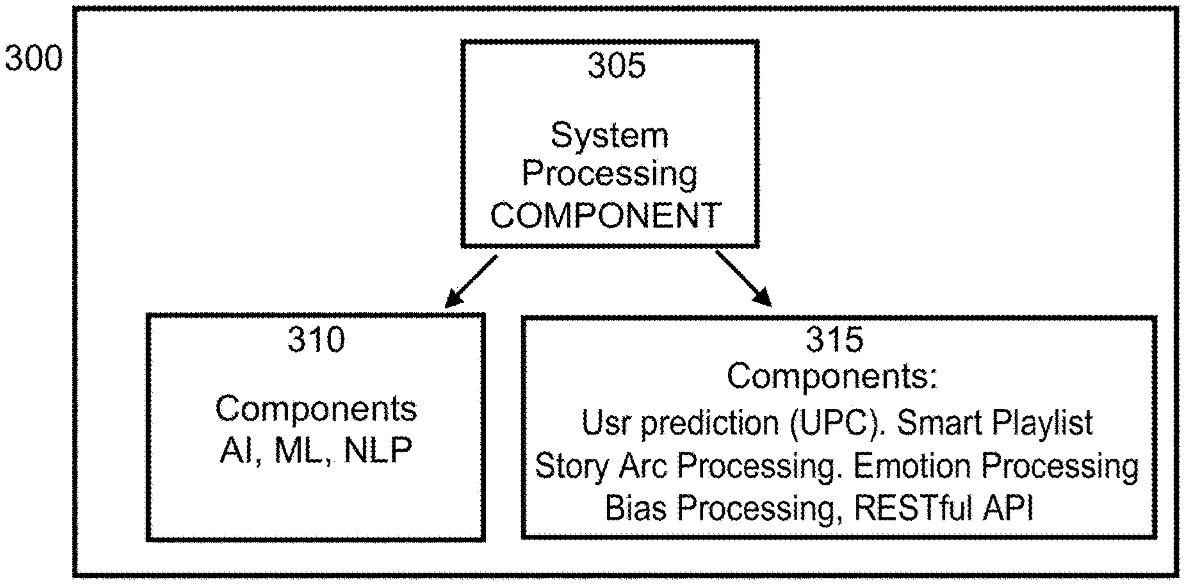
FIG. 3A illustrates three system components in accordance with an embodiment of the present invention.

FIG. 3 shows the POPsphere operatively engaging processing components 300 that may include a system processing component 305 that is programed to control various operations of the system and may include subsystem components 320 including for example, artificial intelligent (AI), machine learning (MN) and natural language processing (NLP) components. Other components 315 are listed and may include, e.g., user prediction, smart playlist/story arc narrative and emotion tone/highlighting components. FIG. 3 also illustrates multiple metaverses that may include the POPsphere 350 and metatverses 360 and up to 360+n all of which may be accessed by the user as more fully described herein. The forgoing components 300 are more fully described hereinafter. In FIG. 3A each Social API aggregated is masked into a drag & droppable story tile. Social API's are populated in groupings as "Social Media Continents" visible by color coded of the same origin of source. Population of singular search query may result into at least up to 25 different API components populating at once. 3*d*. Up to 76 cross-platform individual API tiles can be placed into the publishable POPcast timeline. 3*c*. When the 360 degree POPsphere rotates counter clockwise it repopulates with new content within the "KEYWORD" perimeters. When POPsphere rotates clockwise the tiles repopulate with the history or bread crumbing effect of previous content.

Figure 4A:
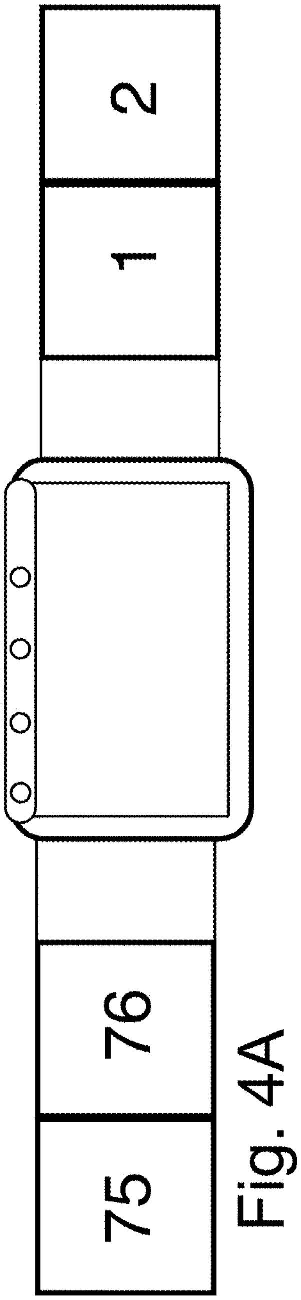
FIG. 4A illustrates an embodiment where there are 76 cross-platform individual tiles in the POPcast timeline in accordance with the present invention.

FIG. 4A illustrates the timeline with Console.

Figure 4B:
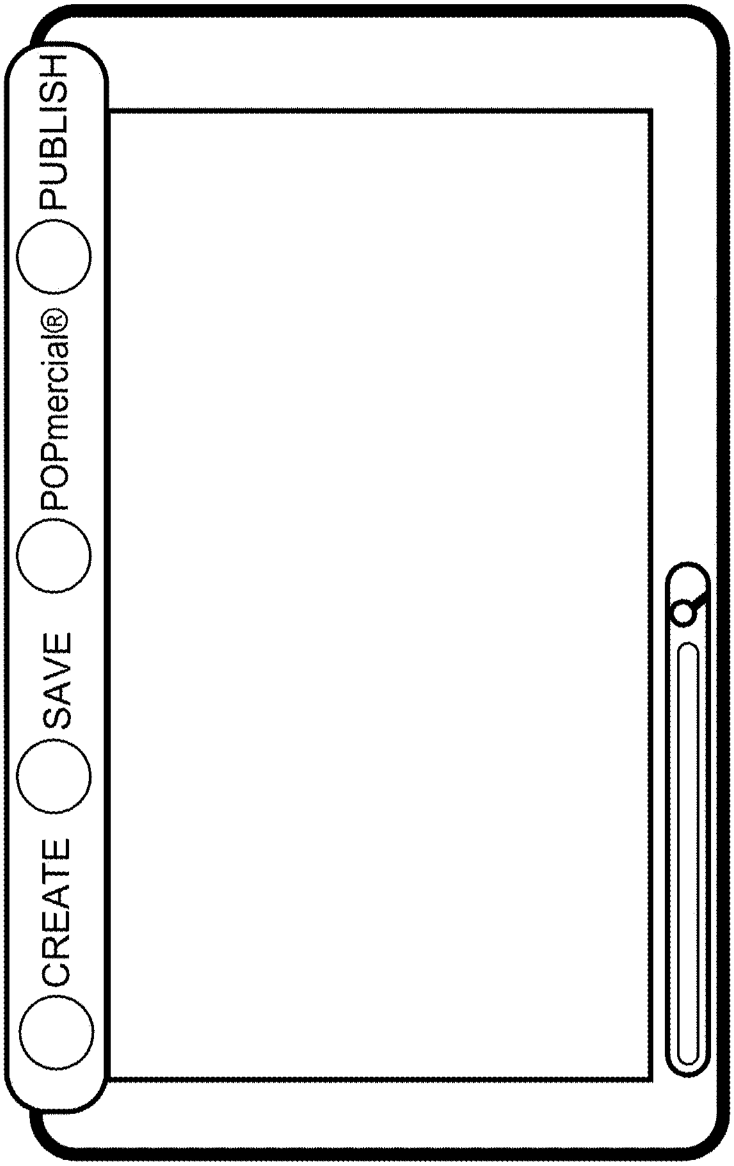
FIG. 4B details the internal POPcast Console for access to feature sets.

FIG. 4B Console displays the CREATE (POPcast) SAVE (POPcast) POPmercial (Sponsorship) PUBLISH (POPcast) Features/Dashboard Access.

Figure 5:
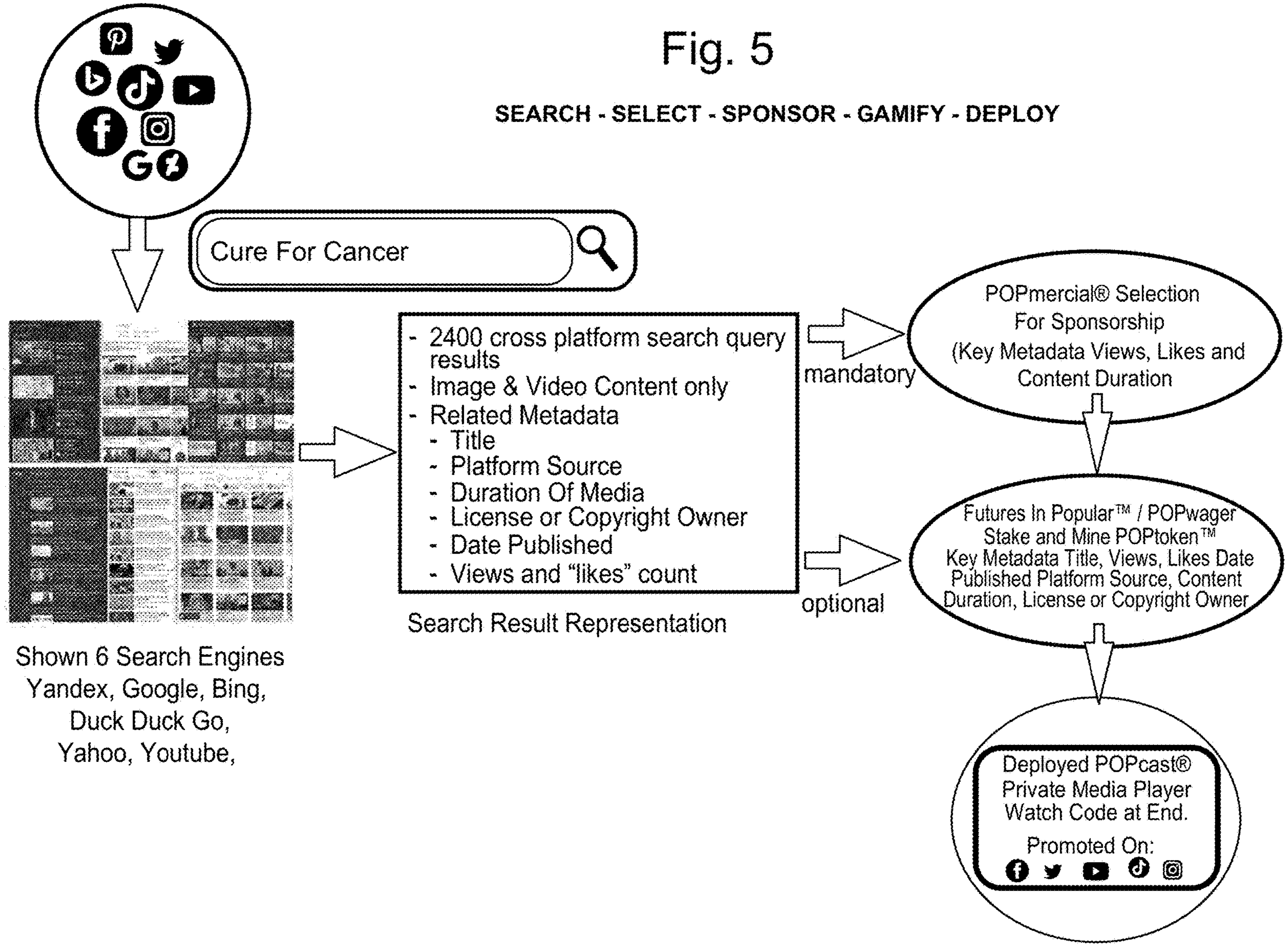
FIG. 5 is a flow diagram illustrating aggregation to POPcast Publish in accordance with the present invention.
Figure 6:
Figure 7A:
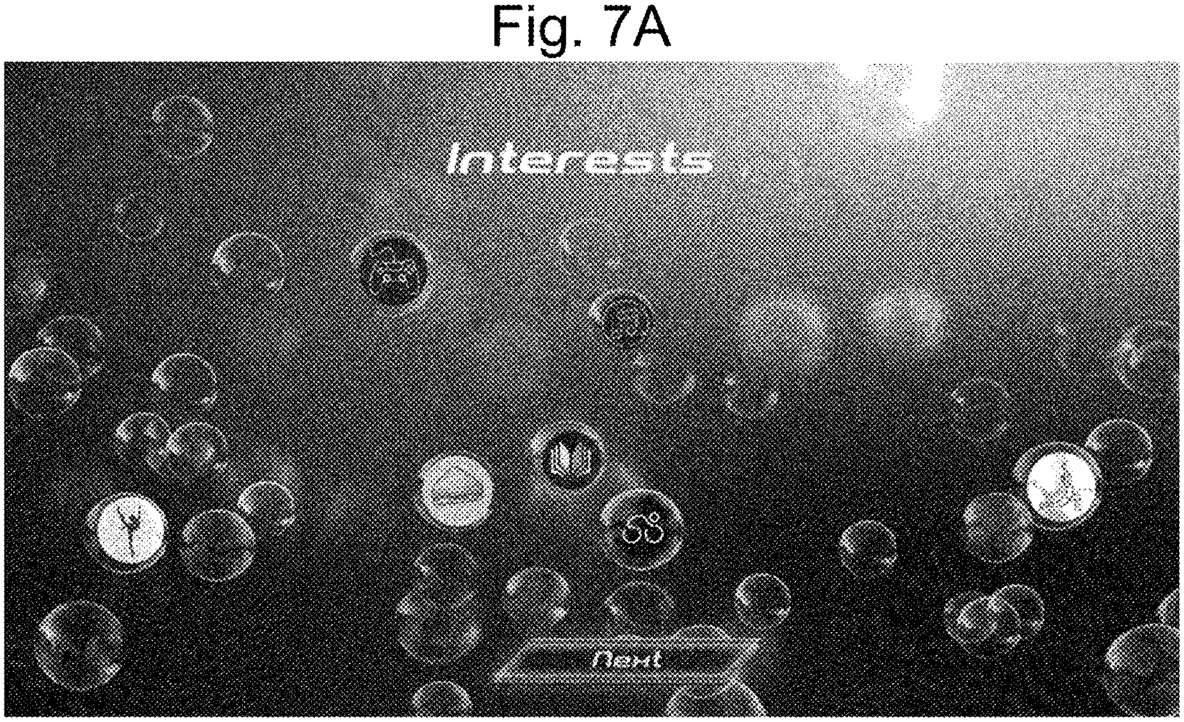
Figure 7B:
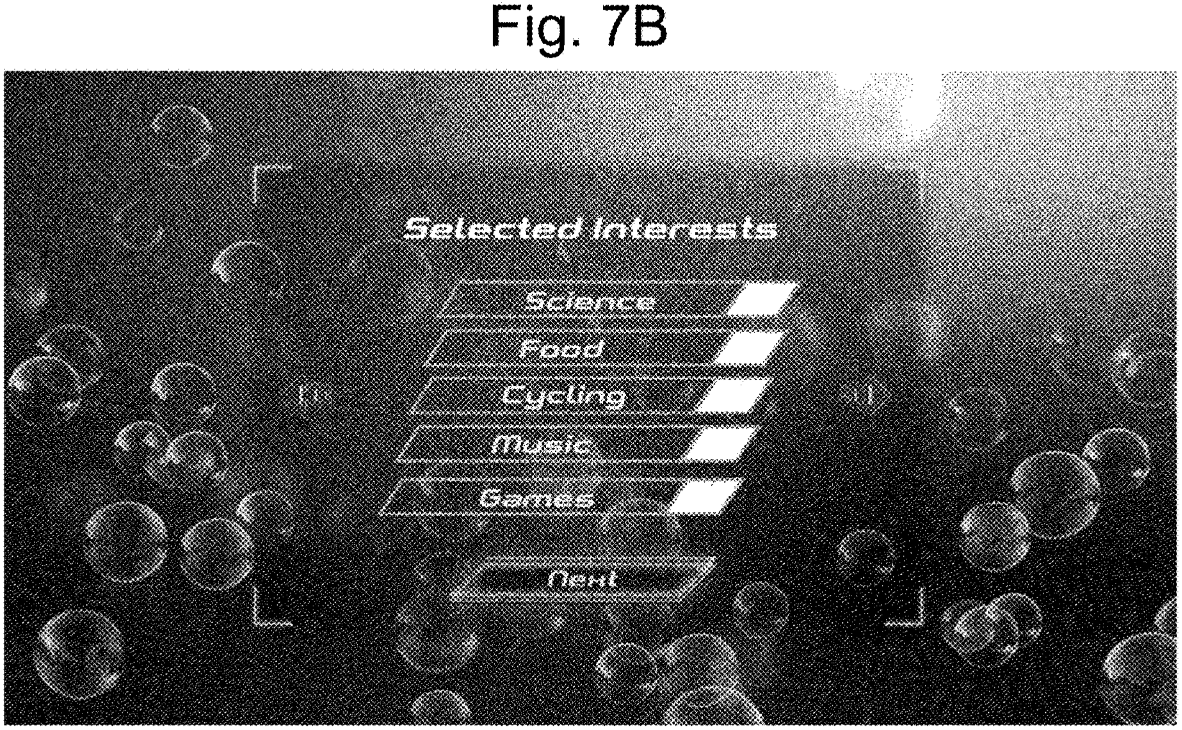
FIG. 7B Splash Screen w/CONFIRM.
Figure 8A:
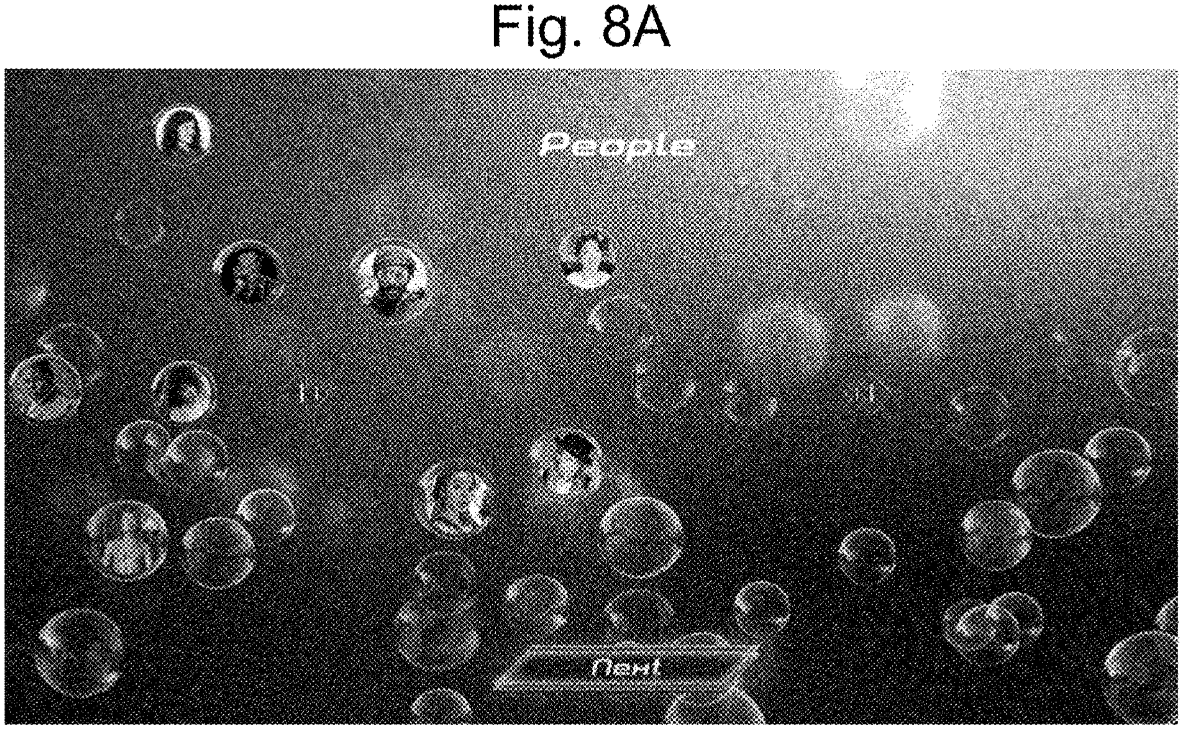
Figure 8B:
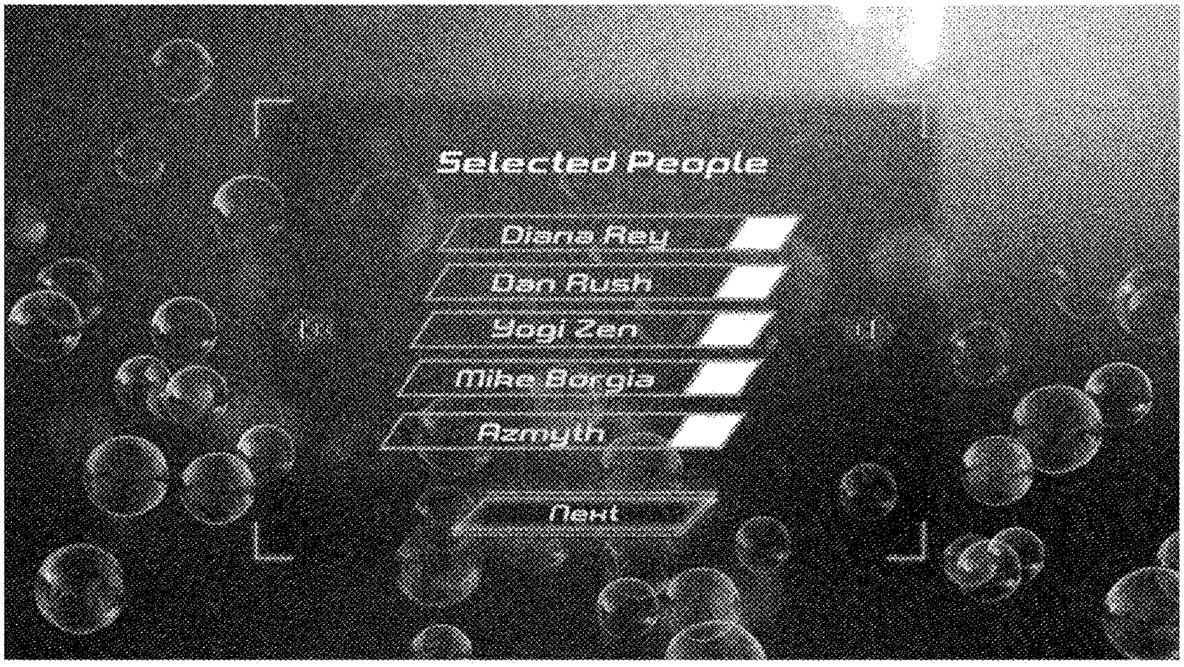
FIG. 8B Splash Screen w/CONFIRM.
Figure 9A:
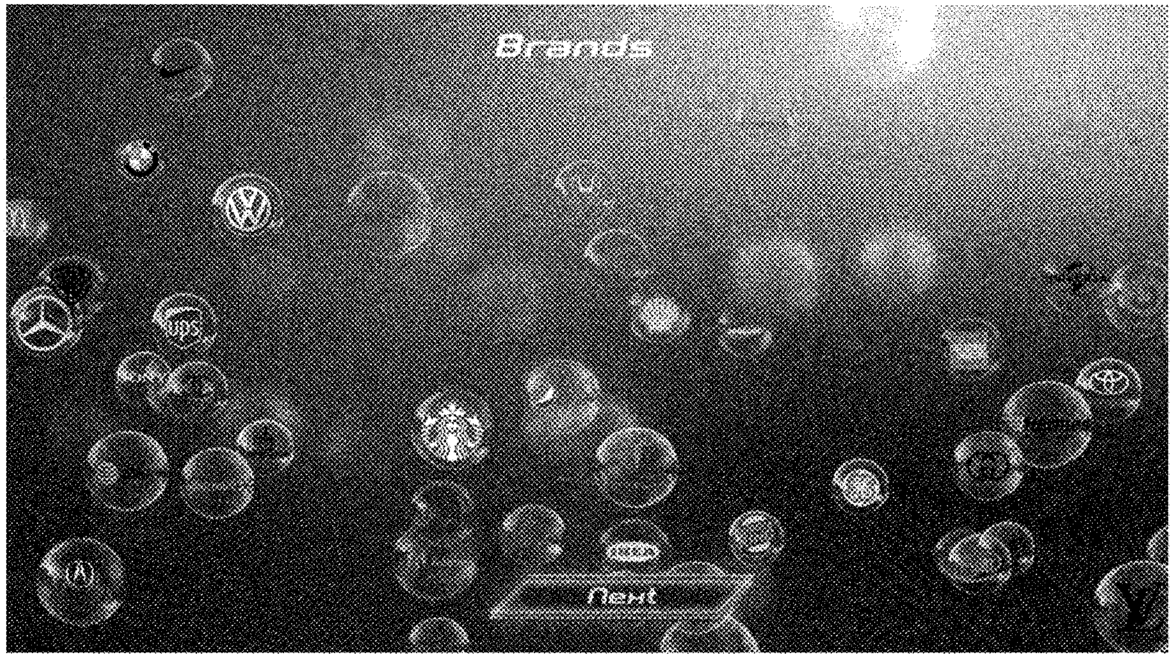
Figure 9B:
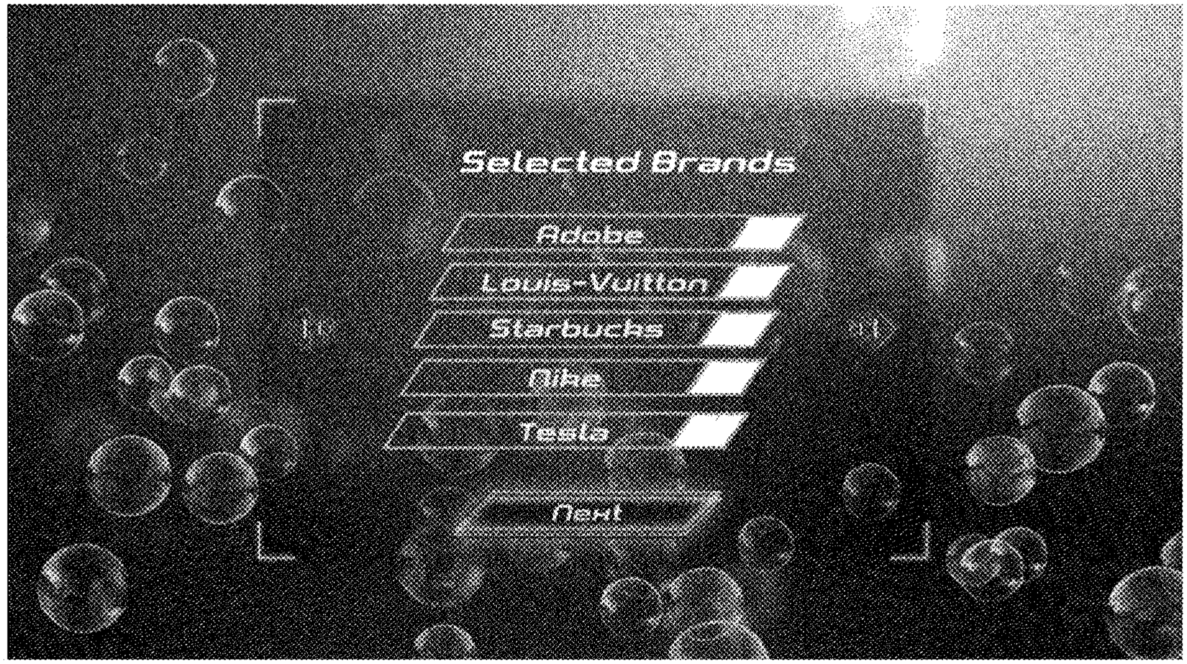
FIG. 9B Splash Screen with CONFIRM.
Figure 10A:
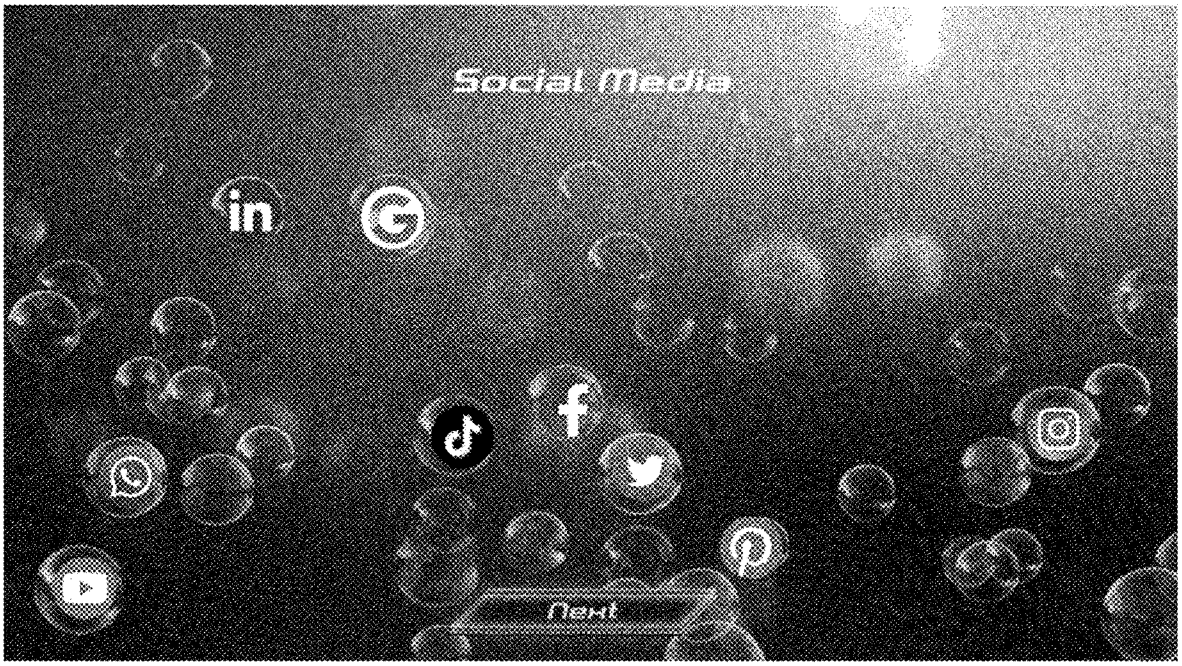
Figure 10B:
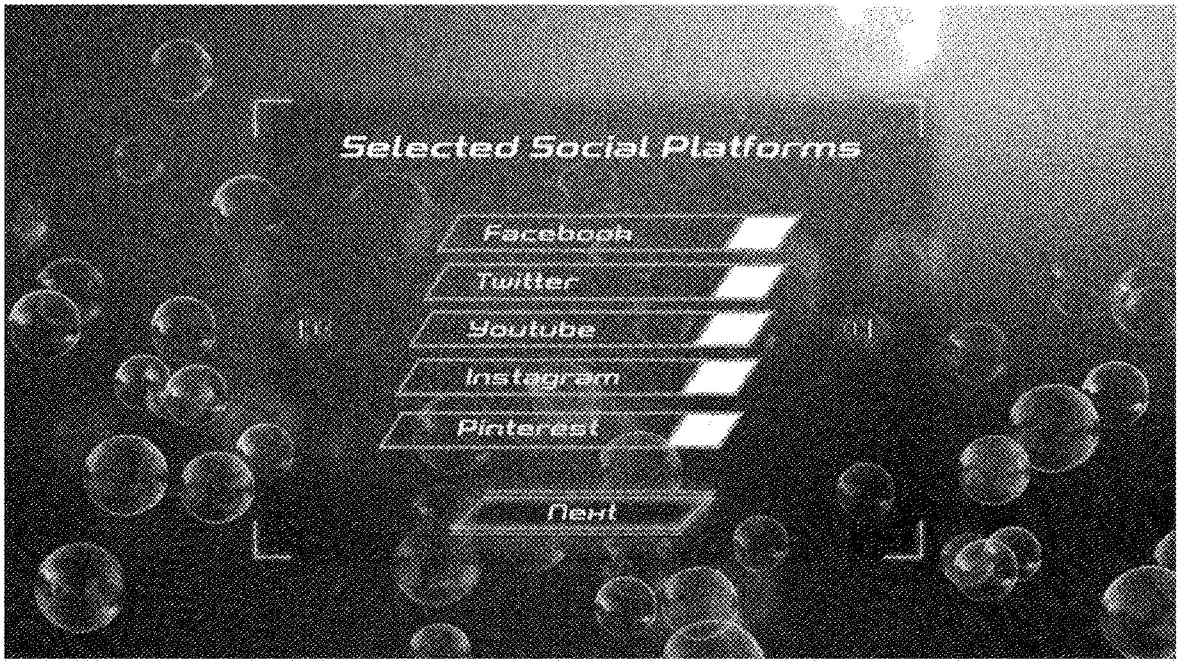
FIG. 10B Splash Screen with CONFIRM.

FIG. 5 Overall Flow Diagram from Aggregation to POPcast Publish are First Time User design plates for data and configuration of profile choices as standard use cases.

Dashboard Descriptions

In 14*m* User Assigns each integrated API Identity on outer POPsphere (that is not grayed out) to a volume of tiles to Populate to the inner POPsphere UI (fig ex: 90 of 2400) then cycle through each API until up to 2400 tiles are fulfilled as prompted. 14*b* Access button element to enter POPsphere UI environment. 14*c*. Access Button element to Personal Profile controls and NFT content minting 14*d*. Access Module to configure API details and settings. 14*e*. Access button element to enter blockchain functionalities of each API behaviors and reports element 14*f*. Access button element to enter digital wallet accounting dashboard 14*g*. Access button element to enter POPcast project vault and POPlifter element. (In & Out points set on any link placed in POPcast) 14*h*. Access button element to enter POPmercial advertising placement dashboard 14*i*. Access button element to enter POPwager Futures In Popular (Stake & Mine Game dashboard) 14*j*. Access button element to enter Audience Dashboard to visualize retention, payouts and access to friends to invite. 14*k*. Access to help screen element 14*l*. Access to POPlounge dashboard screen for business services and other API access use.

Figure 15:
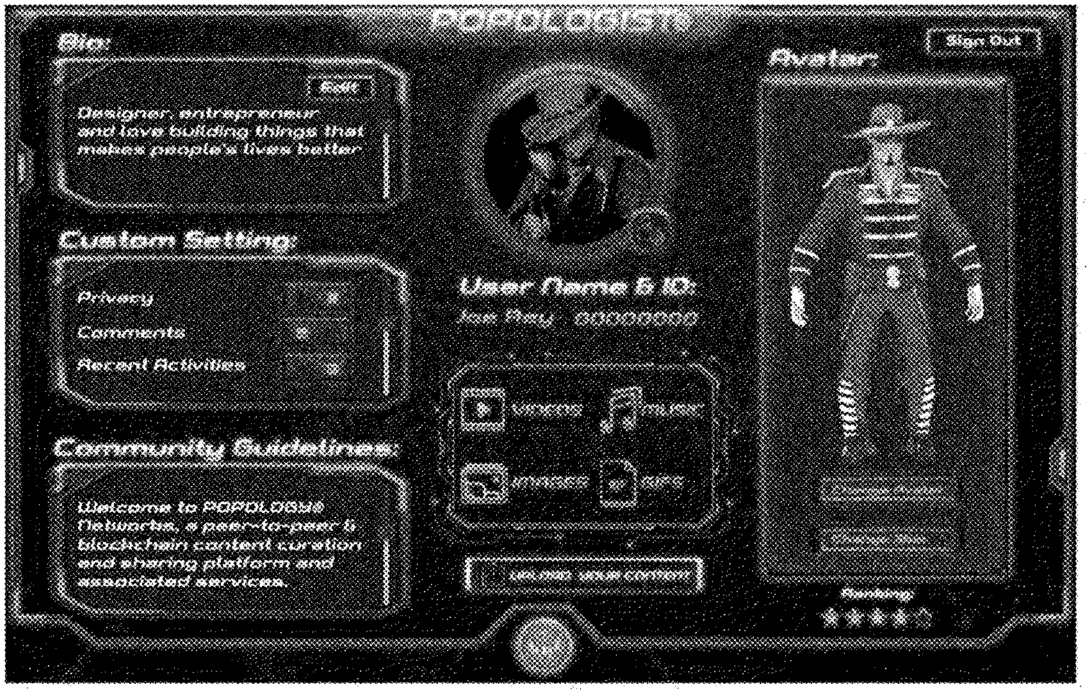
FIG. 15 illustrates a POPOLOGIST profile dashboard in accordance with the present invention.
Figure 15A:
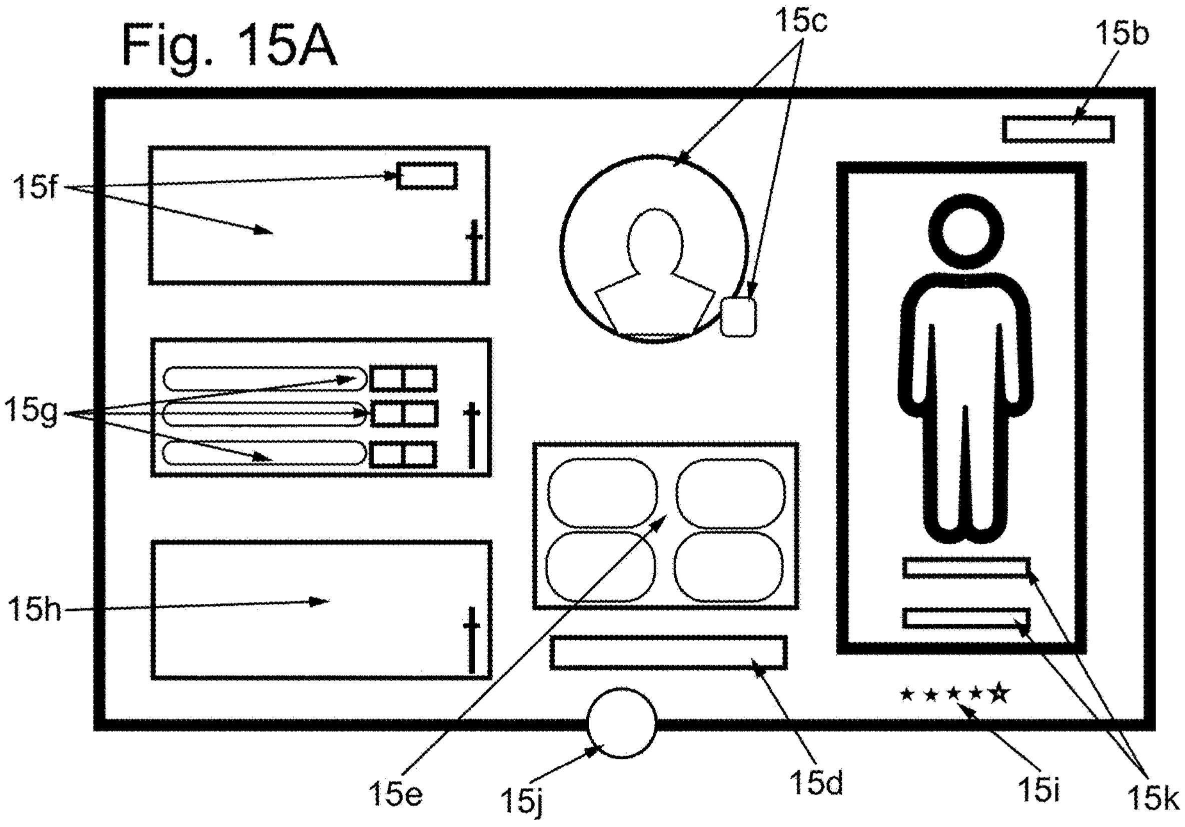
FIG. 15A illustrates an avatar selection and modification module in accordance with the present invention.

FIG. 15_POPOLOGIST Profile Dashboard is illustrating exemplary techniques for FIG. 15A is Avatar Selection and Skin Change module, 15*b*. 15*c* illustrates a profile picture and upload/change element, 15*d* illustrates a personal content upload/change element, 15*e* illustrates an NFT gallery viewer/configure

15*f* illustrates biography text entry/edit test modules 15*g* illustrates settings for custom, privacy and comments 15*h* illustrates community guidelines 15*i* illustrates star ranking platform stat display 15*j* illustrates access to help screen, Platform Logout Element 15*e*, Profile Picture and change pic upload element, 15*d*.

Figure 16:
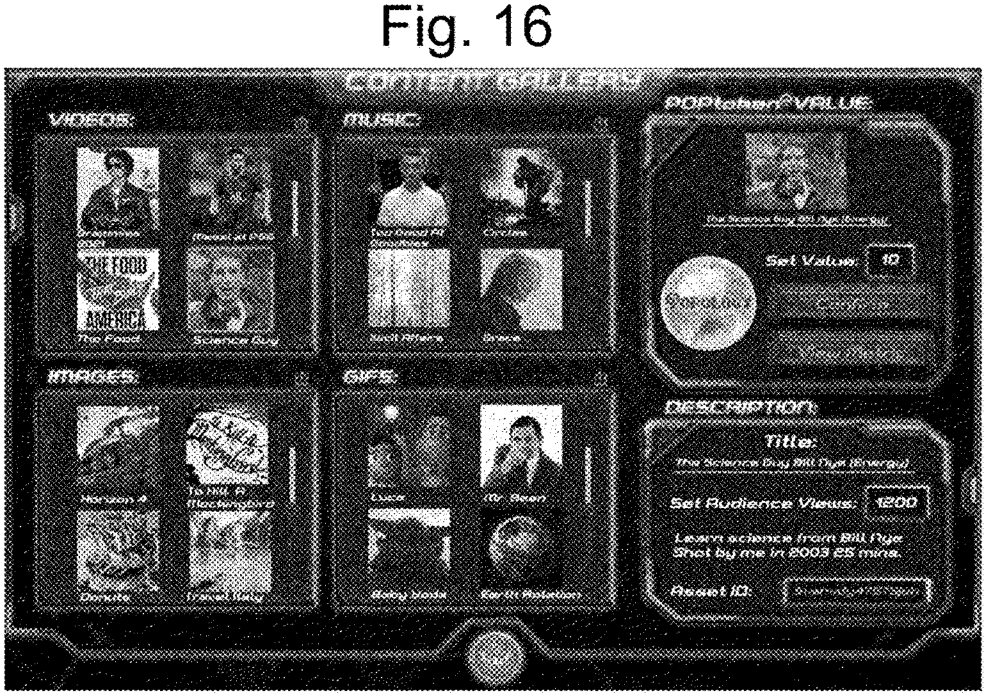
FIG. 16 is a screen shot of a content gallery.
Figure 16A:
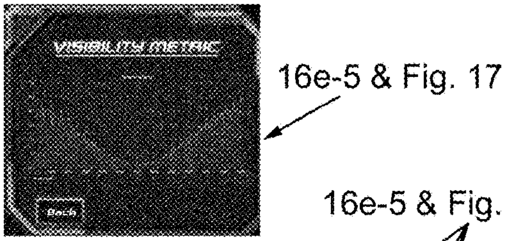
FIG. 16A depicts the visibility metrics.
Figure 16B:
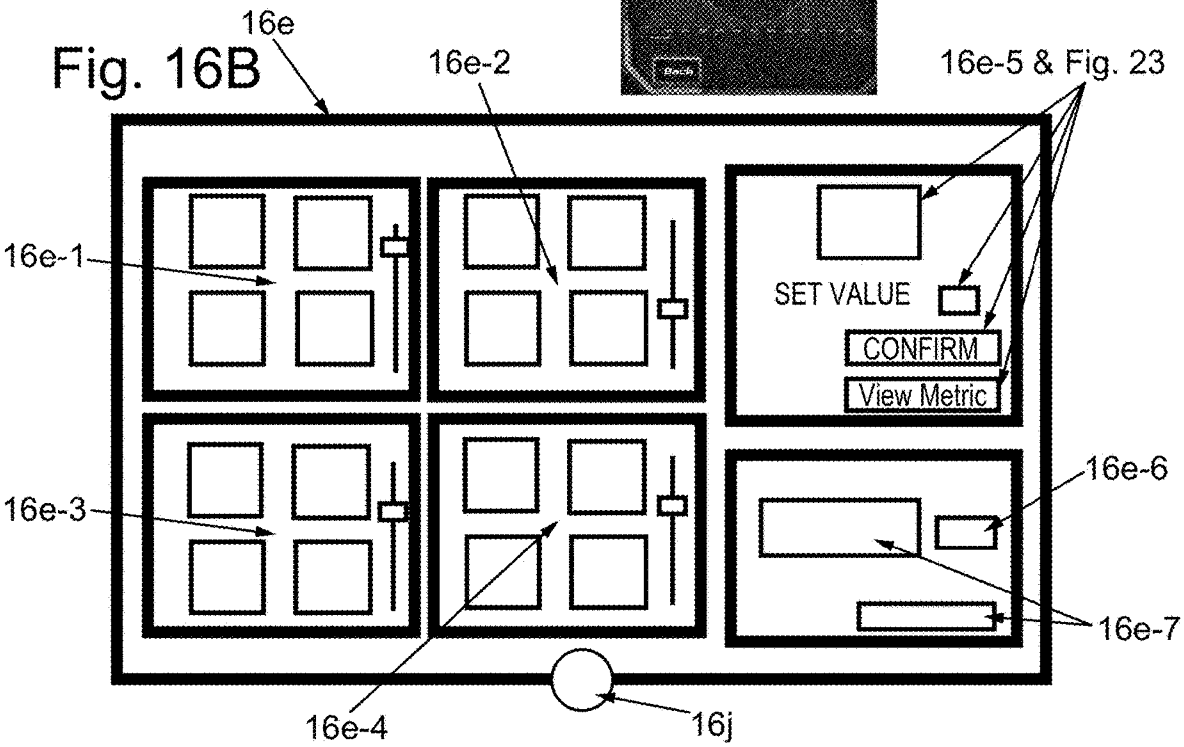
FIG. 16B depicts components of the upload gallery in accordance with the present invention.

FIG. 16_Video, Music, Image and Gif Upload Gallery is a dashboard illustrating Exemplary techniques for POPtoken Assignment of Micro-License Use Payments to other users, and Micro-licensed audience use size authorization, Content Metadata Title, and blockchain asset ID. Access to Help screen.

Personal Content Uploadelement & 16*e* NFT Gallery Viewer screen & Configure element (See Continued Diagram) 16*e*-1. Display module for personal owned videos uploaded successfully and legered on blockchain 16*e*-2. Display module for personal owned music files uploaded successfully uploaded and legered on blockchain 16*e*-3. Display module for personal owned png or jpeg images uploaded successfully and legered on blockchain 16*e*-4. Display module for personal owned gifs uploaded successfully uploaded and legered on blockchain 16*e*-5. Display module for selected content file to set POPtoken value, Confirm Micro-License payment and "VIEW Performance Metric" graph 16*e*-6. User Display and enter value for POPtoken royalty payment for "AUDIENCE VIEWS size per Micro-Licensed assignment terms in other users POPcast use. 16*e*-7 Displays Tittle of Content, and Blockchain Asset ID TX code. 15*f*-iography Text Entry Boxes element & edit test module, 15*g*. Custom Settings Privacy settings, comments, recent activities etc. on/off element, 15*h* Community Guidelines Sign-off element 15*i*. Star Ranking Platform Stat display (5-star rating) 15*j*. Access to Help screen.

Figure 17:
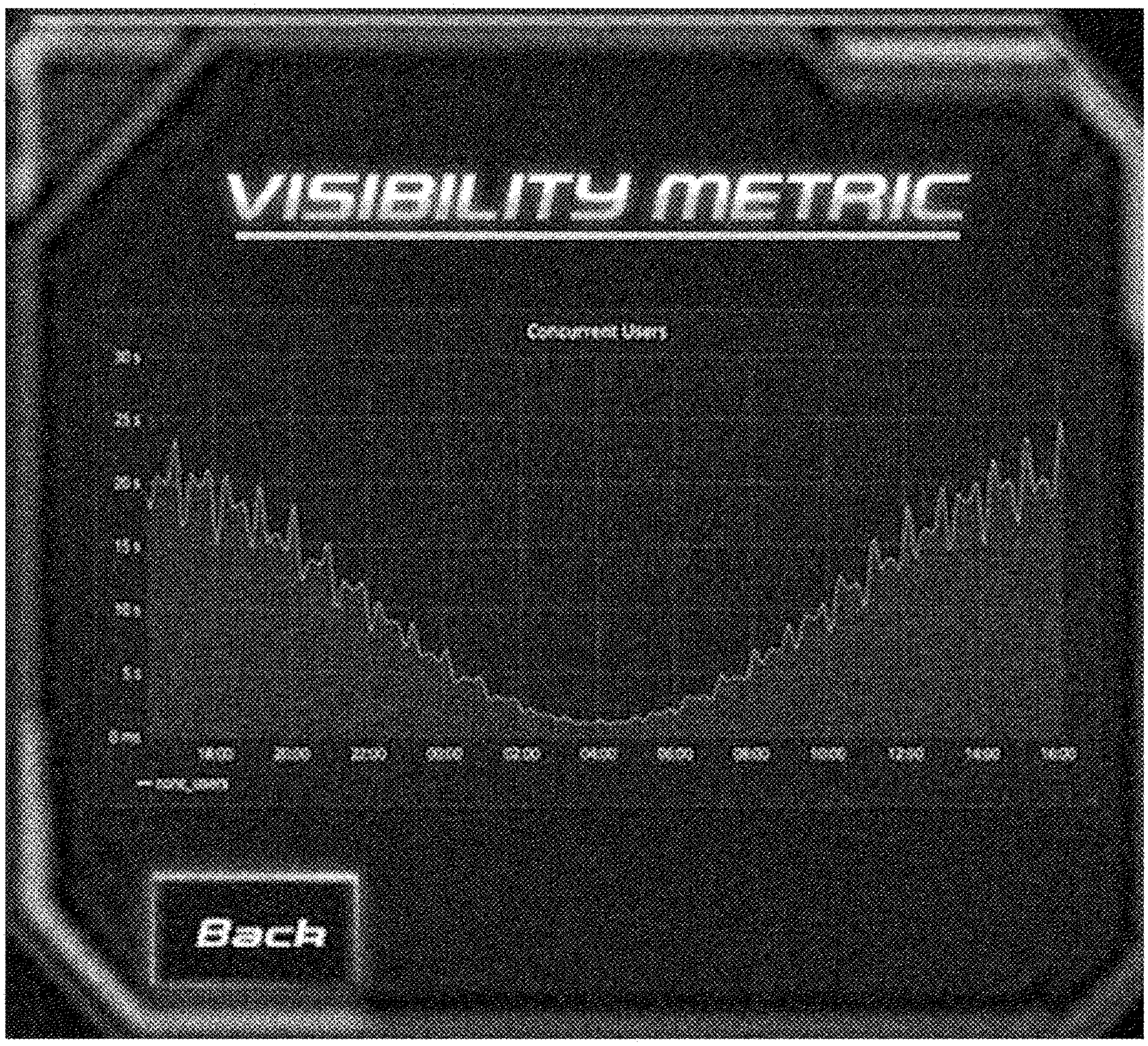
FIG. 17 illustrates exemplary statistics for desired content in use on blockchain licensed performance in accordance with the present invention.

FIG. 17_Visibilty Metric is a sub and extension dashboard illustrating exemplary techniques for statistics displayed for desired content selected in use on blockchainmicro-licensed performance. Back button element included.

FIG. 18_API LOAD shows, for the purpose of illustration and not limitation an API dashboard of an exemplary system for aggregation and organization of a variety of business service, social media, gaming or other service platforms organized as data support system from a plurality of integrated APIs onboarded for a variety of use cases, including and not limited to user data reports, content ledgering and reports, digital rights ledgering and reporting, exemplary techniques for embodiments of the disclosed subject matter. 18*a*. Illustrates an exemplary system attaching, detaching, or searching API's to the platform user ecosphere. 18*b* Catalogue of attached APIs display in slider element to view and organize by type all aggregated platforms of subscriptions. 18*c* illustrates access to a help screen in accordance with the present invention. 18*d* illustrates categorical access modules to themes in API integrations and 18*e* Access to help screen.

Figure 19:
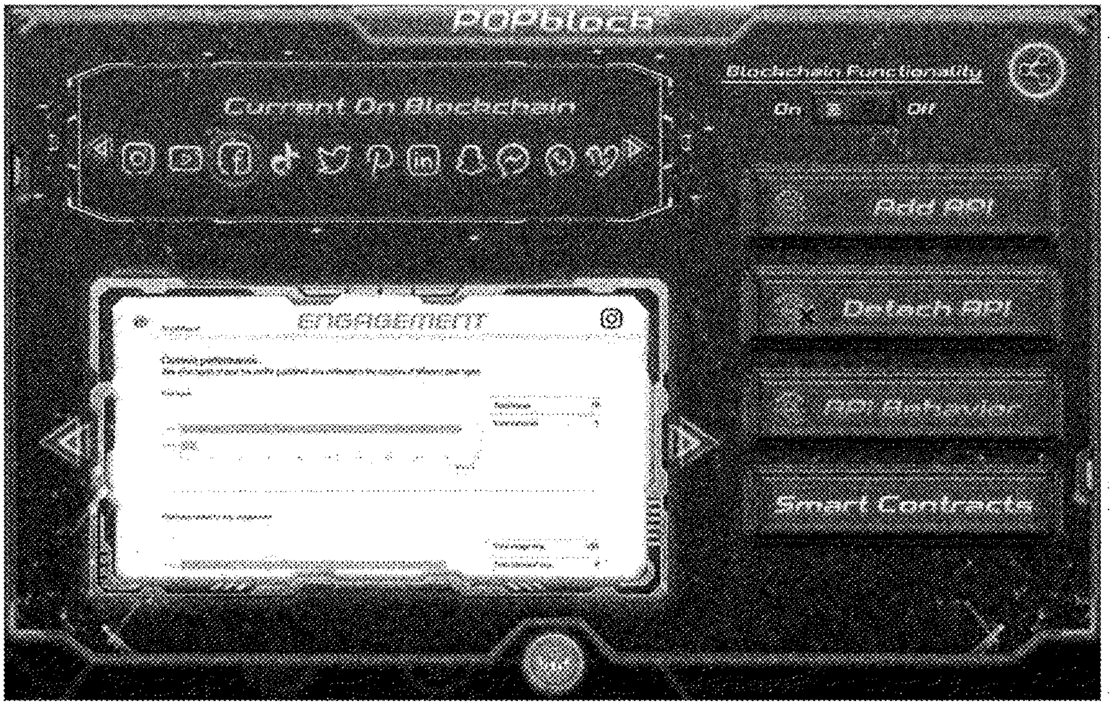
FIG. 19 illustrates an exemplary dashboard for controlling features of the blockchain ledgering service in accordance with the present invention.

FIG. 19_POPblock is a dashboard illustrating exemplary techniques for controlling features of the blockchain ledgering service, including and not limited to overall on/off element, display of "current API's on the Blockchain integrated element, add API element, detach API element, API Behavior reports including and not limited to selected Social Media engagement report, selected social media insights and impressions report element, and a share option to publish reports to email or other. Access to help screen is also provided including and not limited to 19*a*, display of "current API's on the Blockchain integrated with selector ring and scroll slider element, 19*b* overall on off blockchain switch element, 19*c*-add API element, 21*d* detach API element, 19*e* API Behavior reports including and not limited to 19*f* & 19*g* selected Social Media engagement report, selected social media insights and impressions report element, 19*h*_Additionally a Smart Contracts function that displays a report of open and fulfilled smart contracts scroll through report and a 19*i*_share option to publish reports to email or other. 19*j* _ is access to Help Screen element.

FIG. 20_POPwallet is a dashboard illustrating exemplary techniques for controlling accounting of the blockchain POPOLOGY coin and POPtoken cryptography ledgering service, including and not limited to 23*a*_Send, receive and (20*f*-1) current volume element for two branded coin creations, 20*b*_*a* countdown clock of 24 hours until next reboot of 100 POPtoken to use or lose within 24 hours. 20*c*_Additionally an onboard trade velocity metrics screen supporting branded TOKENOMICS schedule as element to advise on crypto use case values. 20*d*_Module available to increment and buy additional POPtoken and POPOLOGYcoin 20*e*_Access to help screen.

FIG. 21_POPcast is a dashboard illustrating exemplary techniques for implementing a video link processing pipeline, in accordance to the previously placed media tiles in the POPcast timeline.

FIG. 21A_The media link can have custom "IN-POINT" and OUT-Points" set in the POPlifter module. 21*b*_A visible layer element assembles audio layers over preexisting audio of the video link with some simple filters and text titles added. Additionally, the POPlifter is a fee of 1 POPtoken per 10 seconds. 21*c*_Switcher element between POPcast and Publish Lifted media Clip 21*d*_Playback Player for preview of lifted "in and out" points of the URL link. 21*e*_Ability to Draft, SAVE, and or select neighboring selected clip in the POPcast 21*g*_A vault of unpublished or past published POPcast element is positioned on this dashboard as well, effectively restoring or re-publishing any POPcast assembly as a project to return to. 21*b*_Search Media from specific add media from POPcast 21*h*_Access to help screen element.

FIG. 22_POPmercial is a dashboard illustrating exemplary techniques for viewing and placing numerous Advertising campaigns in a streaming POPcast curated by platform users.

FIG. 22A Brands are aggregated from first time user experience data. Slider function & Selector Ring element. 22*b*. Search Brands Element 22*c*. Spots may be filtered according to a number of advertising conditions, fields, pricing, or tagged themes evolved overtime. Recommendations may be provided other than specific campaigns, and 22*d* this ad placement system provides user with the MEDIA BUY of the spot placed in a POPcast. Onboard options to improve existing campaigns and parameters required for a complete campaign. Campaigns may be scored or ranked according to pricing, 22*e*. Audience Payout in crypto, sentiment, intent, location, time decay, or the extent of reach. 22*f*. Each spot carries a duration and correlating audience payout packages of 4 week, 8 weeks, or 12 weeks for the user to engage and deploy. 22*g*. Several spots paired together assemble a desired POPcast reach assembled metric automated by system by calculating all media views total and dividing by 20%. 22*h*. Onboard POPmercial Media Player to view selections of spots, 22*i*. POPcast playback switch element 22*j*.Automated POPmercial Spot Counter element 22*k*. Search Special Offers 221 Access Help Screen element FIG. 23. POPwager is a dashboard illustrating exemplary techniques for viewing and placing proof of stake POPtoken from POPwallet holdings in an effort to mine POPtoken for guessing the projected future views of any selected content in the curated POPcast timeline already sponsored. (Futures In Popular) 23*n* facilitates a slider media function displaying 3 POPcast selected tiles at once. 23*b*. The center tile engages the POPwager gamified functions to create a smart contract stake & wager to mine token 23*c*. This media can be played back via the controls element above in the center of slider module. 23*d* POPcast has two layer controls, audio only and Video & audio in main layer. 23*e*. In the POPmetrics element relevant meta data is bound with URL source and packaged into DATE, Duration of Media, Platform Source, Views, Likes, License Owner, and Video Title to inform user of media stats. 23*f*. User selects Mining Prospect Start and Stop dates from drop down calendar module, and 23*g*. enters a value of their estimated guess on increase of media views in the calendar dates selected. 23*h*. Based on the wager and dates selected of the increased "FUTURES IN POPULAR" for the media a graph illustrates the MINING RETURN Calculator element via ever-evolving Algorithm of these values. 23*i*. The staking module allows a selection of POPtoken values in selected increments of 1, 5,10, 100, and, then confirms STAKE AMOUNT 23*j.a* via the element provided. 23*j.b* User hits the big round "SMASH" button to increase the wager 23*k*. Dialogue Box prompts another confirm to withdraw the POPtoken from POPwallet. 23*l* STAKE AMOUNT DISPLAY element 23*m* Access to help screen element.

Figure 24:
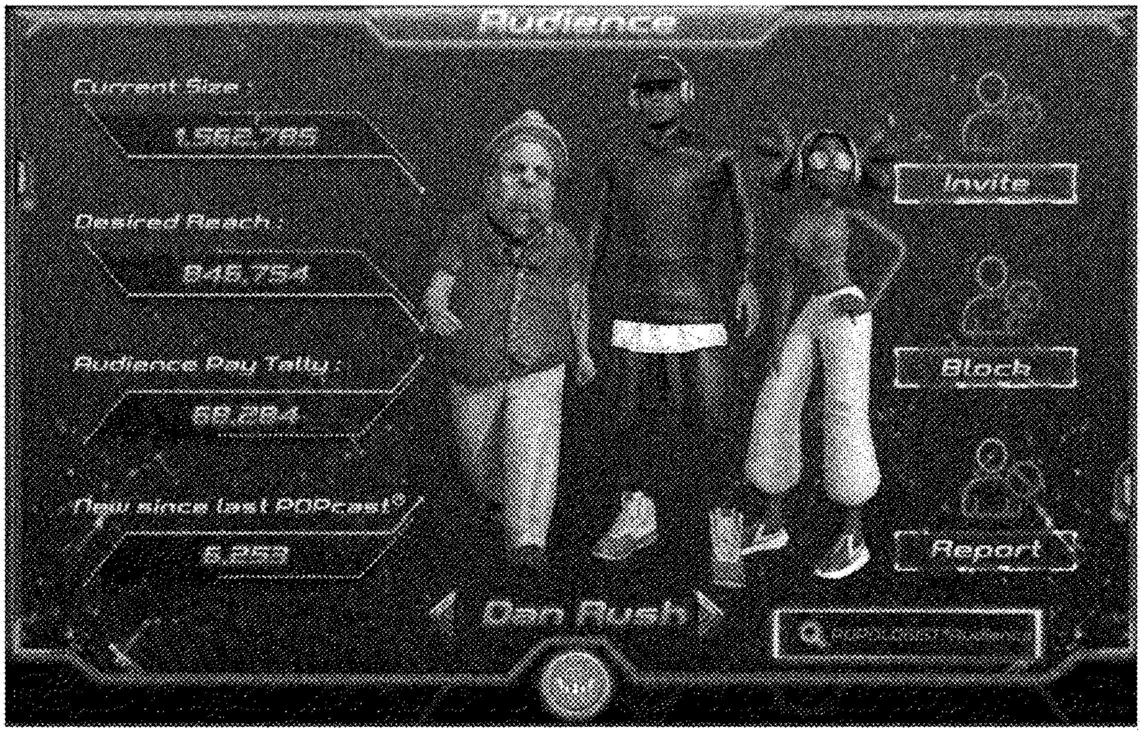
FIG. 24 exemplary audience dashboard in accordance with the present invention.

FIG. 24 Audience is a dashboard illustrating exemplary techniques for viewing audience metrics on the POPOLOGY Platform.

Figure 24A:
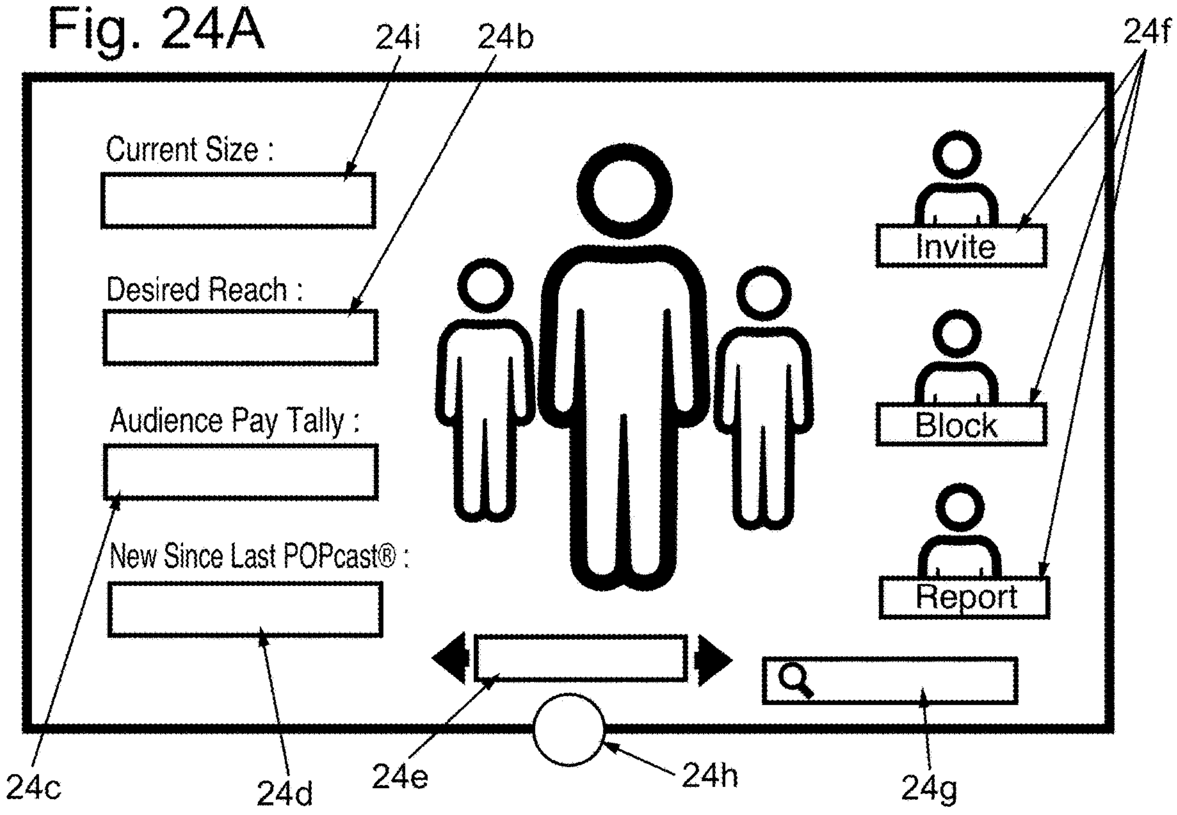
FIG. 24A exemplary audience size window in accordance with the present invention.
Figure 25:
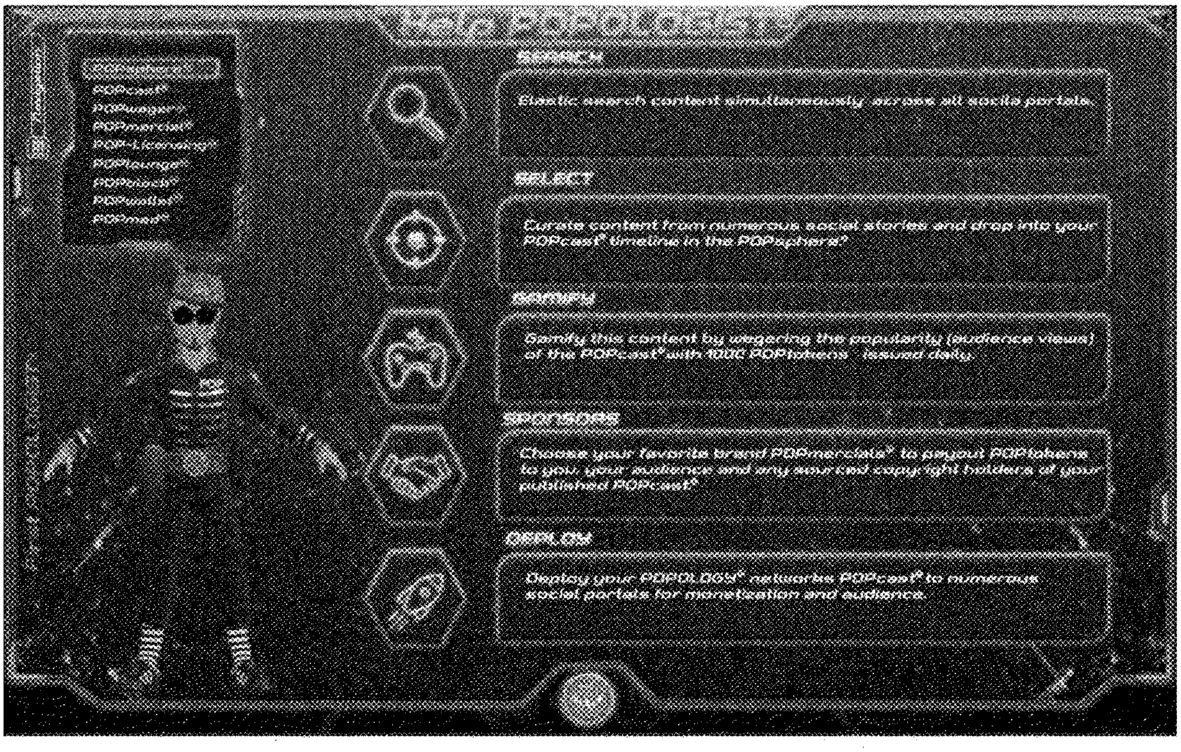
FIG. 25 help screen—exemplary block diagram for aggregation/organization of multimedia data support systems in accordance with the present invention.

FIG. 24A_Dashboard facilitates a tabulation of total audience served in cumulated POPcast deployed, 24*b* a Desired Audience Reach for increased audience (Rewarded for meeting legered goal) 24*c*_*a* Combined total of POPtoken payouts rewarded to the audience. 24*d*_Tabulationof new Audience members from last POPcast deployed, 24*e* Additionally an element of user ranking stats, and popularity visualizing member avatars facilitates user relationships and influencer retention. 24*f*_Modules that include audience relations to INVITE, BLOCK and REPORT elements. 24*g* Search for platform users by USERNAME or POPOLOGIST Handle 24*h*_Access to help screen element FIG. 25_Help Screen shows, for the purpose of illustration and not limitation a block diagram of an exemplary system for aggregation and organization of multimedia data support systems from a plurality of navigated feature set and platformed sources.

Figure 25A:
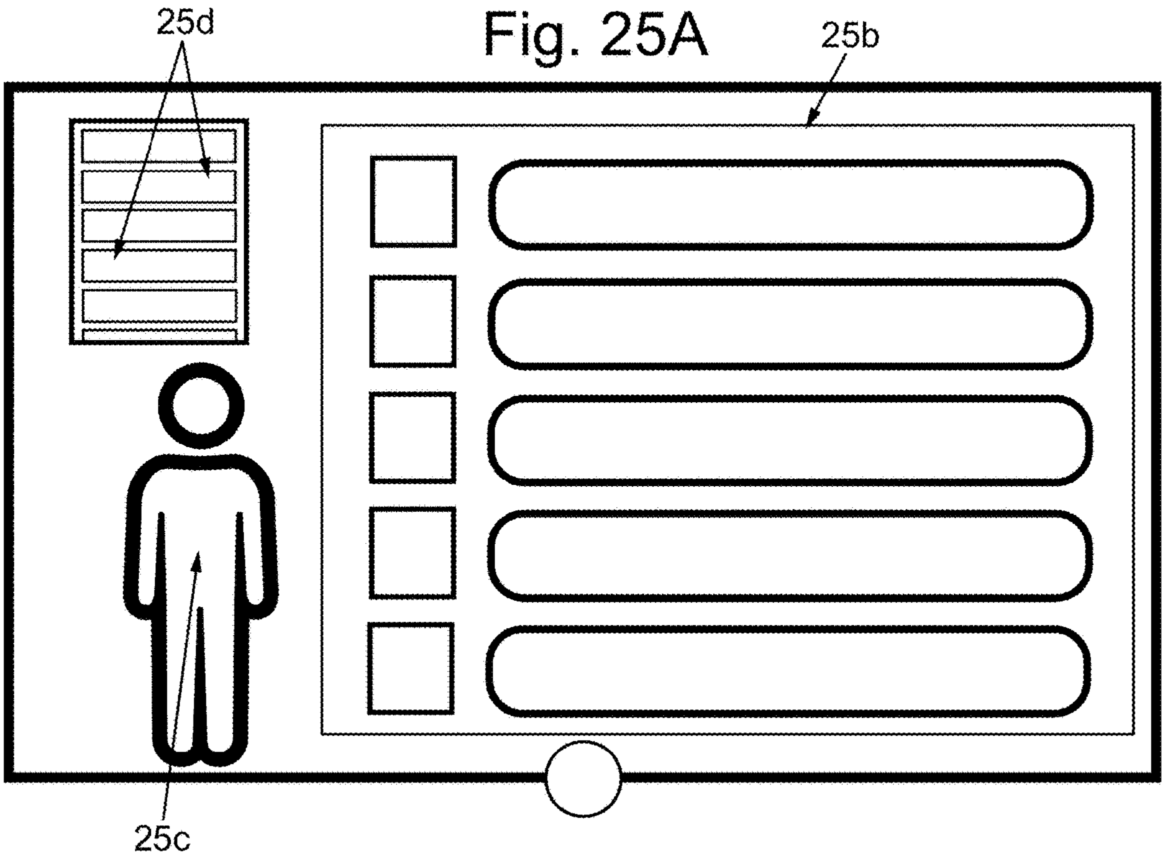
FIG. 25A exemplary navigation portals in accordance with the present invention.

FIG. 25A_Navigation of overall support to access tutorials on and for the website, and each of its essential media product line portals. 25*b*_Features Help Instructions for each functionality as prompted in display stage 25*d*_ "HELP AVATAR?" gestures 25*c* as animation prompts to illustrate interactive response from user.

Figure 26:
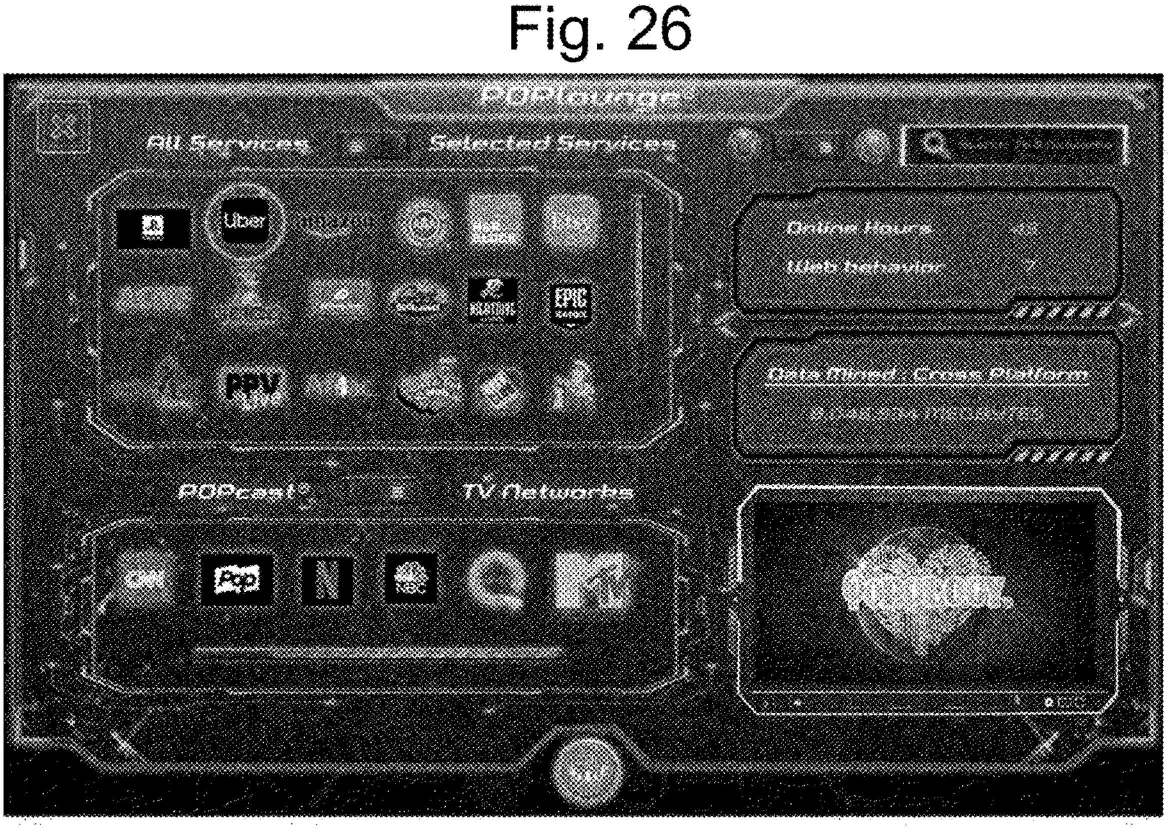
FIG. 26 exemplary POPlounge dashboard for aggregation/organization in accordance with the present invention.

POPlounge Dashboard FIG. 26 illustrates an exemplary system for aggregation and organization.

Figure 26A:
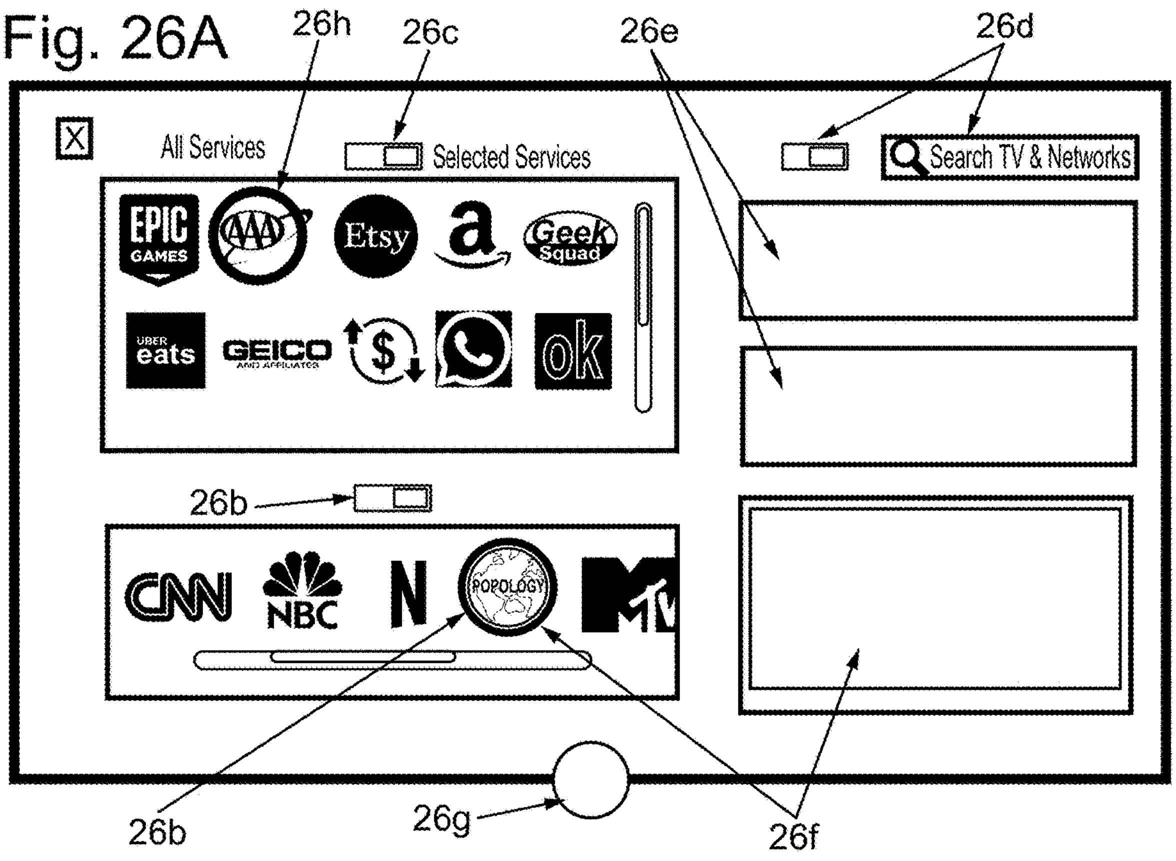
FIG. 26A display of exemplary business API services via selector ring element in accordance with the present invention.

FIG. 26A_business API services displayed for active use as restFUL APIs. with a selector ring element 26*b* Additionally a calculated Data Mining element counted in megabytes for rewards to user, 26*c*_Switcher element between ALL SERVICES or SELECT SERVICES in use case, 26*d*_Search and switch element between TV Shows or feature films 26*f* an Onboard media player that enables NETFLIX, HULU, or any streaming V.O.D. service or TV network viewable for data mining rewards inside of the web app. 26*b*_switcher element from viewing POPcast Content of other members or TV Networks subscribed by APIs Integrated including switch between TV shows 26*c* and feature films 26*d*. 26*e*-display of exemplary record keeping of online hours used and data merchandised from plurality of API services measured in megabytes for issued rewards in POPtoken. 26*f* exemplary onboard media player for enabling streaming VOD or TV network viewable for data mining rewards inside web app and 26*g* Access to help screen.

Figure 27:
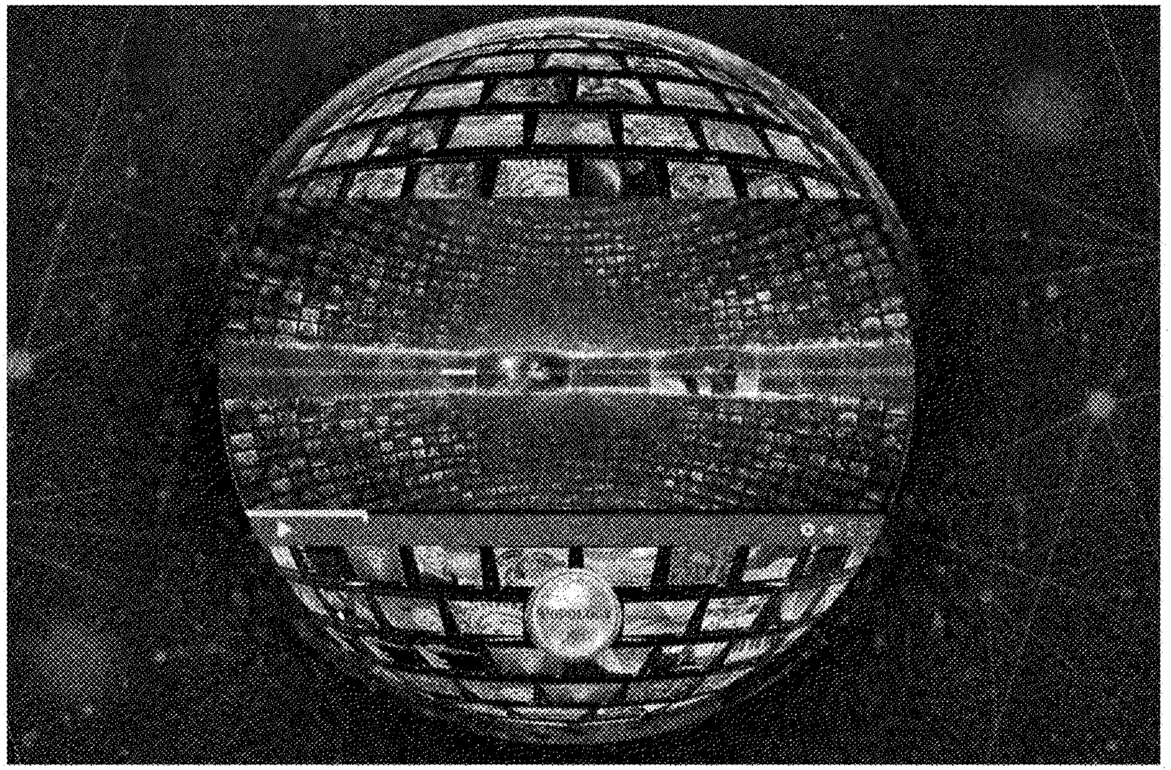
FIG. 27 POPcast media player with exemplary viewing techniques in accordance with the present invention.
Figure 27A:
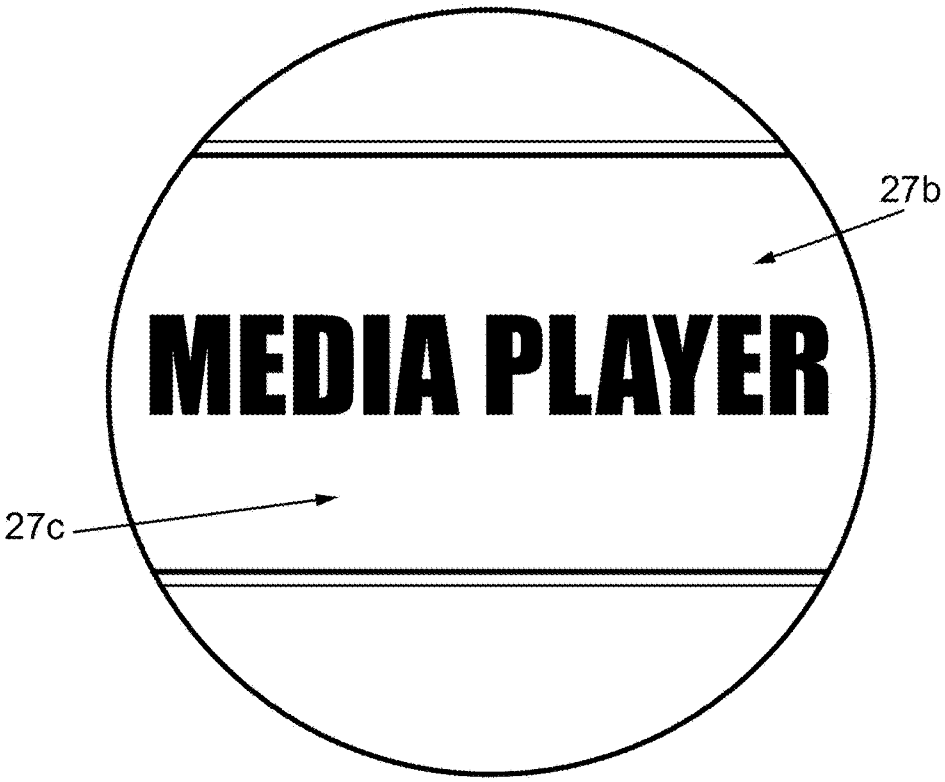
FIG. 27A exemplary non-scrubbable media player for user POPcast with POPmercial in accordance with the present invention.

FIG. 27_POPcast Player is a custom link POPOLOGY Networks POPcast media player illustrating exemplary techniques for viewing a FIG. 27A_POPcast created by our users and deployed with a non-scrubbable media player (accessible by a link), delivering the entirety of the POPcast with POPmercial sponsors timed each 15 minutes for brand recognition, after which, Each POPcast delivers a watch code 27*b* at the end for audience to redeem on POPOLOGY Networks as a new user.

Figure 28:
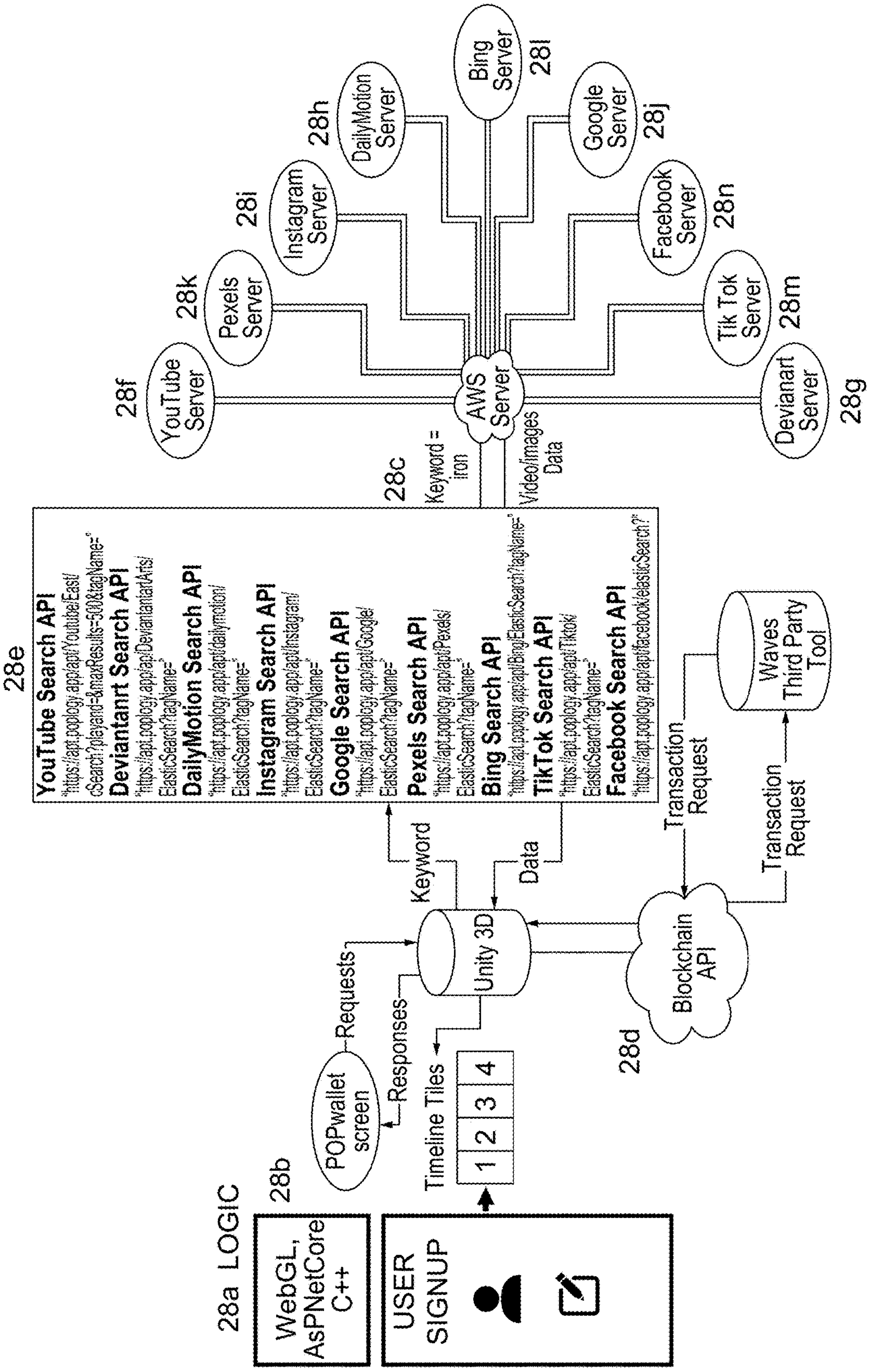
FIG. 28 exemplary LOGIC in a dashboard of an exemplary system for aggregation and organization.

The embodiment in FIG. 28 presents an exemplary system built in Unity and C++ for the aggregation and integration of social media and search browser memberships to establish a unique meta-search engine to activate the API collection and calls the response from the API to feed keyword search query. (28*a*) is the frontend interface developed in WebGL & UnityGame Engine with the backend code design in AspNetCore MongoDB and C++. This embodiment (28*b*) generates a smart contract protocol for assigning 1 POPtoken per media tile (in the POPsphere) placed in the POPcast timeline (FIG. 3; 3*b*) issuable into the POPwallet (FIG. 20; 20*f*-1) after publishing. The 34 party blockchain wallet (waves.exchange) is a digital wallet (that allows users to store and manage their custom crypto creation (POPOLOGYcoin, and POPtoken) allotments. Blockchain API tracks (28*d*) and ledgers behaviors of all integrated platforms for the issuance in Smart Contract Protocols to deploy, or mine POPtoken for actions successfully accomplished. Blockchain is a system of recording information in a way that makes it difficult or impossible to change, hack, or cheat the system. A blockchain is essentially a digital ledger of transactions that is duplicated and distributed across the entire network of computer systems on the blockchain.

Search API Clusters of 28*e* make the calls from a keyword search/data type to pull the particular variables (data) during the process when a search request is activated (28*e*) for a tag keyword/data attribute. (28*c*) uses the Newtonsoft. Json. Ling for the API will call for namespace that provides classes that are used to implement LINQ to JSON. Classes. Class, Description. Public class, Extensions. i.e (//var client=new RestClient ("hitps://aimeo-.com/categories." which is incorporated herein by this reference) in 28*c* represents a Keyword/Video or Image search pipeline to pull from specific API servers as identified (28*f*, 28*g*, 28*k*, 28*i*, 28*n*, 28*h*, 28*j*), 28*l*, 28*n*, 28*m*) and integrated to provide the data. A Bundled API Algorithm may be established when a user selects (integrates) a specific set of API calls (social platforms) to the POPOLOGY platform and the controllers are activated to generate a unique algorithm request for that data type search and a value data set that can be merchandised commercially.

Figure 11:
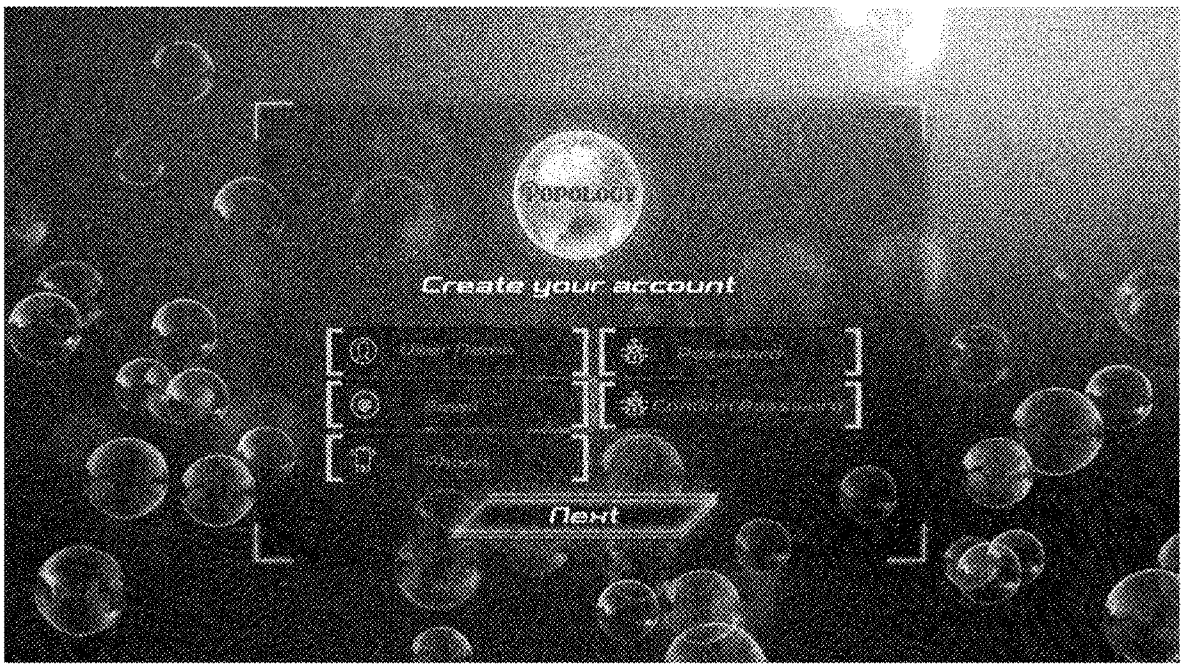
FIG. 11 Splash Screen illustrates USER INTAKE DATA/Personal Info is illustrative of a computer-implemented method digesting personal user data, email, phone number, password, and username.
Figure 12:
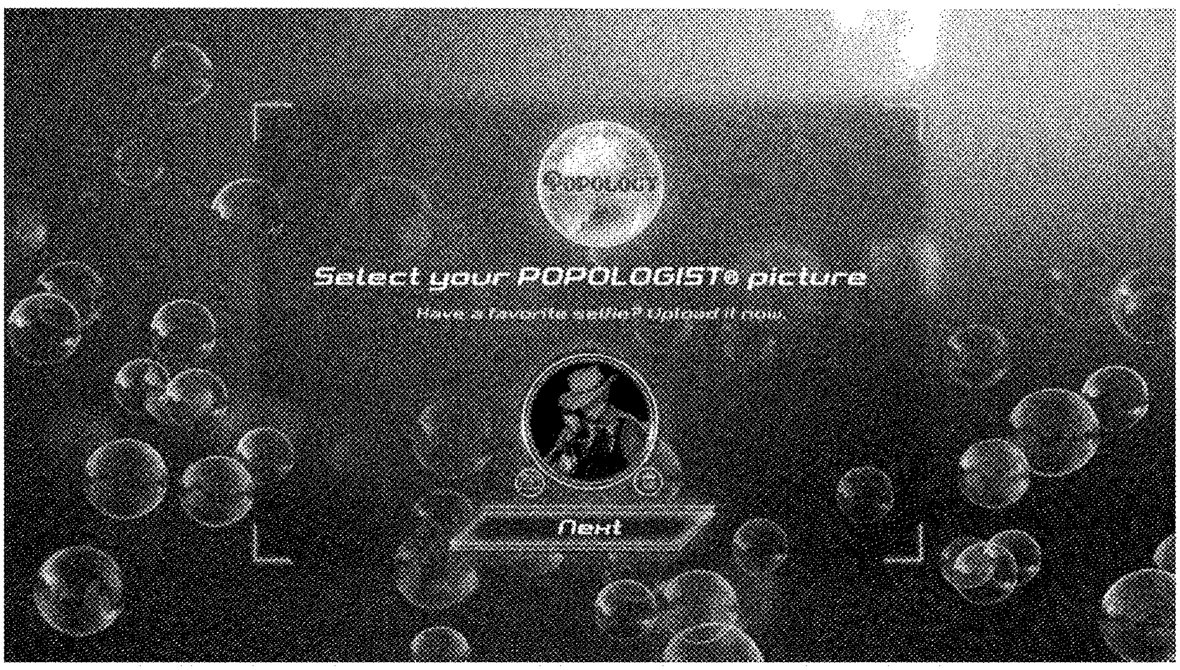
FIG. 12 Splash Screen Select Personal Profile Picture is illustrative of a computer-implemented method for uploading a selected profile jpeg or png for platform identification displays.
Figure 13:
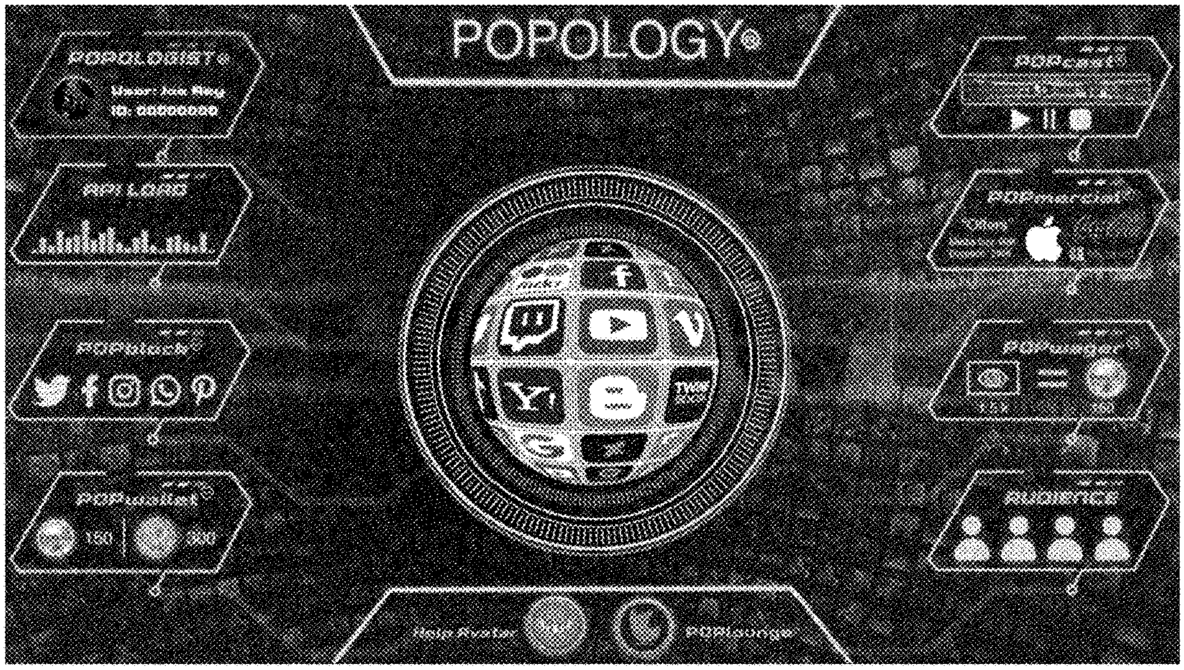
FIG. 13 is illustrative of a 5 second Intro Animation of Main User Dashboard that provides introduction of the main dashboard and all sub dashboards supporting all features and web-app modules.
Figure 29:
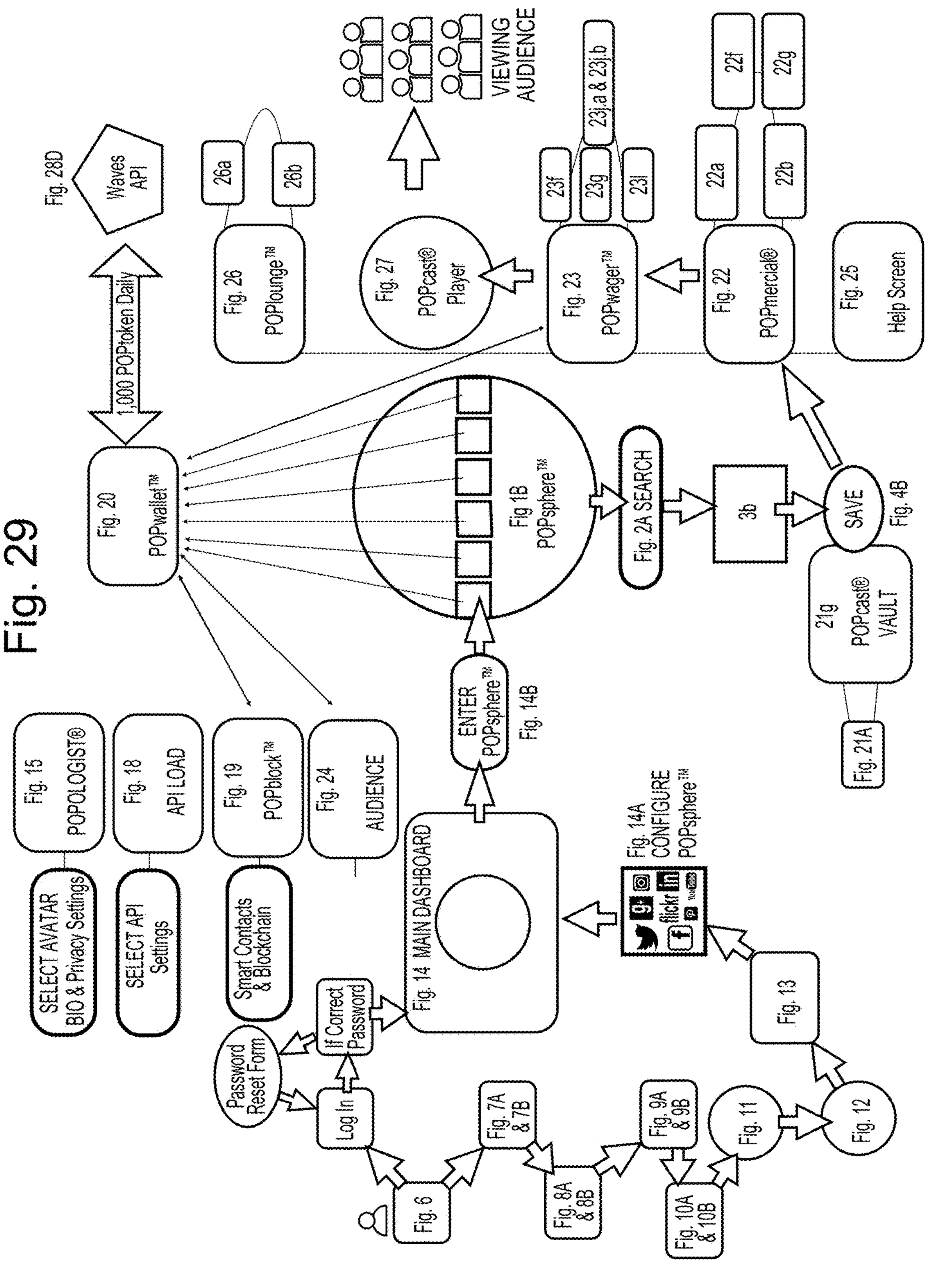
FIG. 29_exemplary overall Import and flow of Digital Rights in an immersive 360-degree workspace of an exemplary system for aggregation and organization of digital rights and APIs that source them.

FIG. 29 is an exemplary system for ingesting and aggregating social platforms allowing for user to create a streaming media curation. In the Overall POPOLOGY USER Flow Description a User may select to sign-up as First Time User or log-in as return member. First Time Users Sign-Up via a series of Splash Screens that collect their "Interests", Iconic "People", "Brands" and "Social Media" accounts by popping floating bubbles with the relevant icons inside each. FIG. 6 through 10B (NOTE: Current state user must pop the bubbles of social platforms which triggers the selected API/IP addresses then allows that user activate those social platforms to allow those platforms to be displayed in configure module (FIG. 14A)). In one embodiment User may select 3 or more social search platforms and if only 2 are chosen, a warning of limited return search criteria will prompt user to select one or more APIs or user can't move forward. In another embodiment, User may select 3 or more search engine or social platforms and if the system detects a limited return search criteria a warning of limited search criteria will be displayed allowing User to revise his search platform selection. In yet another embodiment, a tutorial will suggest User to select at least two competing search engines and three social media platforms to form the complete social platform. One embodiment may allow non-subscription users to integrate up to 5 social platforms whereas paid subscription Users may aggregate up to 25 social platforms. FIG. 11 illustrates a User Intake form providing for email, user password, phone number, and chosen Username, User may also select and upload Profile Pic FIG. 12. In an embodiment, a 5 second animation presents User with a tutorial on a Main Dashboard (FIG. 13). Users are required to configure each API integrated to the POPsphere workspace. The User dictates the API tile count within a 2400 total tile count that each API will populate. These API configurations will be denoted by color coded Social Media Continents as tile clusters. If 10 platforms are integrated, Each API may populate 240 tiles, or User may adjust for more content tiles, and less to other APIs. FIG. 14A Current state user must pop the bubbles of social platforms which triggers the selected API/IP addresses and then allows that user to activate those social platforms to allow those platforms to be displayed in configure module FIG. 14A. It may also be possible for a user to select their memberships to search engines, social media accounts "Interests", Iconic "People" and "Brands" as well as to sign up for new memberships to various search engines, social media accounts and the like should the user want to increase the number of accounts they want to activate.

User may now visit dashboards, starting with POPOLOGIST and include personal profile settings, bio, upload content to NFT gallery (FIG. 15A; 15*d*, 15*e*) and other customizable features (FIG. 15).

User may organize settings of APIs (FIG. 18) and in integrate additional APIs (18*a*) or detach APIs (18*b*).

Figure 19A:
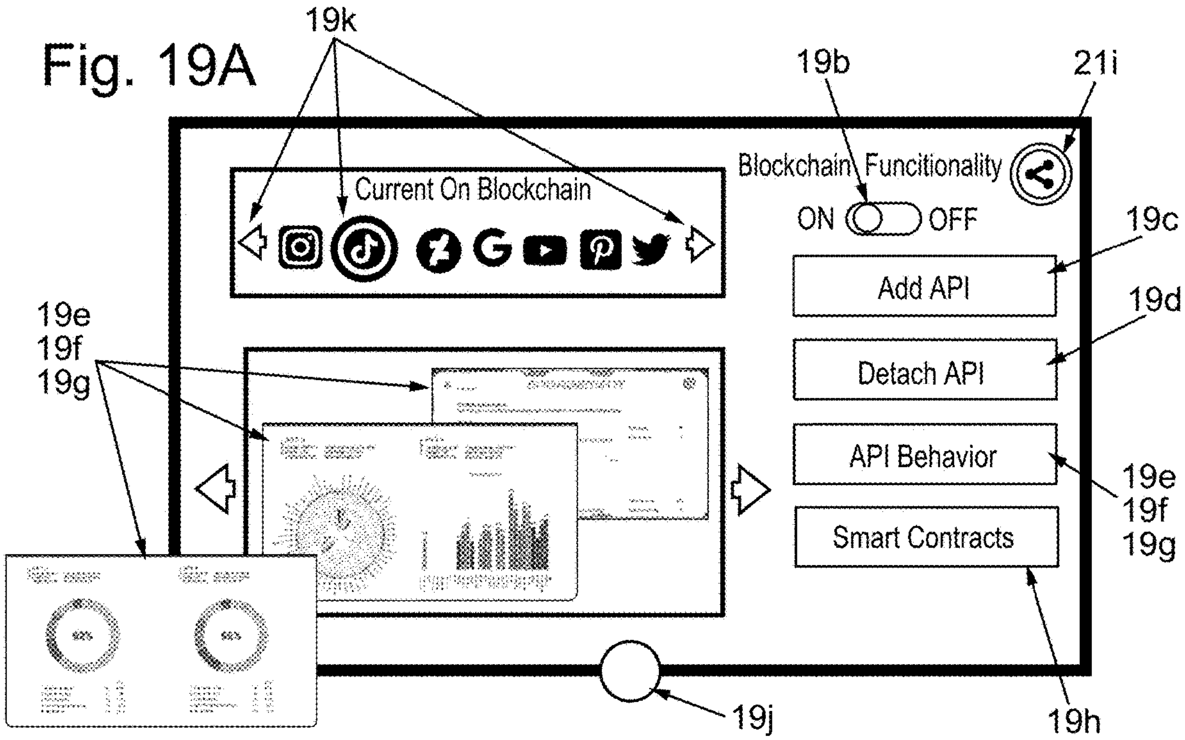
FIG. 19A illustrates blockchain functionality in accordance with the present invention.

User access to POPblock dashboard for reviewing smart contracts (FIG. 19A; 19*h*), API Behavior reports (19*e*, 19*f*, 19*g*), turn on/off blockchain (19*b*) feature Detach or Add APIs (19*c* & 19*d*). For user to financially benefit and acquire POPtokens and/or POPcoins, the user must turn on the blockchain feature. If the blockchain feature is turned off, the financial benefits are directed to the "house;" the POPOLOGY site owners.

An embodiment may include a User Dashboard for Audience/Friends on platform (FIG. 24). Users may (FIG. 24A) track Audience size (24*b*), Audience Pay Tally (24*c*) and standard Invite, Block, and Report user functions (24*f*).

User may enter the POPsphere workspace to build a POPcast (FIG. 14B) Environment built in Unity Game Engine sourcing MongoDB C # and ASP.net Inside the POPsphere, User presses control+Space bar for search bar activation, types preferred keyword and press enter (FIG. 2A & FIG. 4B). After keyword population of tiles, user may drag and drop any tile (up to 76) into the POPcast timeline. User may double click on the media brought into the POPcast timeline to view content (in full screen view) to confirm media selection. (FIG. 3, 3*b*). When User is satisfied with POPcast stream media selections, User may press the SAVE button in the onboard CONSOLE (FIG. 1F). User may then be prompted to NAME POPcast, SAVE to vault (FIG. 4B) or move on to add POPmercial Sponsors (FIG. 1).

```
using Microsoft.Extensions.Configuration;
using Microsoft.Extensions.Options;
using MongoDB.Driver;
using POPOLOGY_MDEE_Model;
```

User may now be able to select POPmercial brand sponsored commercials and insert same into their POPcast from the spots gallery dashboard (FIG. 22A; 22*m*). Each piece of media selected in the POPcast is tabulated by their individual views count from their respective platform, and this value is divided by 20%. This is the "DESIRED POPcast REACH" metric (22*g*). User may select themes from drop down menu of the type of POPmercial they want to include (22*b*) User can select the DURATION of POPmercial media buy for 4 weeks, 8 weeks, or 12 weeks. (22*f*) The shorter duration the higher the POPmercial POPtoken payout to the viewing Audience (22*e*). User may now PUBLISH POPcast when all the Automated POPmercial Count is fulfilled (22*j*). This capability is driven by the following:

"mongoDB.Bson. Serialization. Attributes" calls for the collection of classes of the POPcast®

ADbrands which will verify against the Bson type classes under

"BsonRepresentation (BsonType.ObjectId)".

POPcast AdBrand. User can now earn "PROOF OF WORK" rewards in POPtoken by visiting the "FUTURES IN POPULAR" POPwager dashboard (FIG. 23A). User may select the duration of wager via the drop-down calendar module (23*f*) by selecting the start and stop mining dates. User may then input the 23*o*) which content may be viewed in module components 23*n*. User may next press the yellow Smash Button (23*j.b*) to increase the POPtoken wager value withdrawn from their POPwallet sum (FIG. 23). When the POPtoken amount is what User wants to wager (23*k*), User presses confirm.

Media Metrics, and Proof of Work is ledgered on the POPblock dashboard as a smart contract (19*h*). User may WAGER only Videos that are in a PUBLISHED POPcast with POPmercial Sponsors attached. "mongoDB.Bson. Serialization.Attributes" calls for the collection of classes of the multi-media sequence which then pulls which will verify against the Bson type classes under "BsonRepresentation (BsonType.ObjectId)".

MultiMediaSequence

User is recommended to share the finished POPcast link provided by automated process (FIG. 21A, 21*g* & FIG. 27) with his friends and family so watchers can earn POPtoken rewards as per the combined POPmercial payout (FIG. 22A, 22*e*) tallies. The media player may apply WebGL, AEP extension that opens WebGL capabilities. (An AEP file is a video project created by Adobe After Effects, a special effects video editing application. It contains one or more compositions, which are a collection of layers that may include video footage, audio tracks, images, text, and shapes that make up special effects.) Audience may redeem the automated watch code at the end of the POPcast stream (FIG. 27A, 27*b*) which is redeemable only at Wwww.popology.app.

User may visit the POPlounge dashboard to watch other POPcast content (FIG. 26A, 26*b*) of his peers for rewards, or watch his NETFLIX, HULU or other VOD content service for data rewards. User may also watch television (26*d*) from any of their trusted providers through the POPlounge for added data rewards credits. User can also access the POPOLOGY Megaverse 3*d* Metaverse portal from here as well and tour the landscapes with their 3*d* Avatar (FIG. 15A).

POPwallet is the digital wallet control for POPtoken and Premium POPOLOGYcoin. (FIG. 20) Users receive 100 POPtoken at the beginning of each market day, (20*f*) and is only replenished what they use from the 100 POPtoken issued on a 24 hour timed clock (20*b*.) One POPOLOGY coin equals 100 POPtoken. Additional amounts can be added to each crypto token hold. It relies on Blockchain technology (waves.exchange API) for its rights-managed payouts on Distributed Ledger Technology (DLT).

Users have access to HELP SCREEN instructions (FIG. 25) via navigation in all dashboards, on all screens (14*k*, 15*j*, 16*j*, 18*c*, 19*j*, 20*e*, 21*h*, 22*l*, 23*m*, 24*h*, 26*g*).

Figure 30:
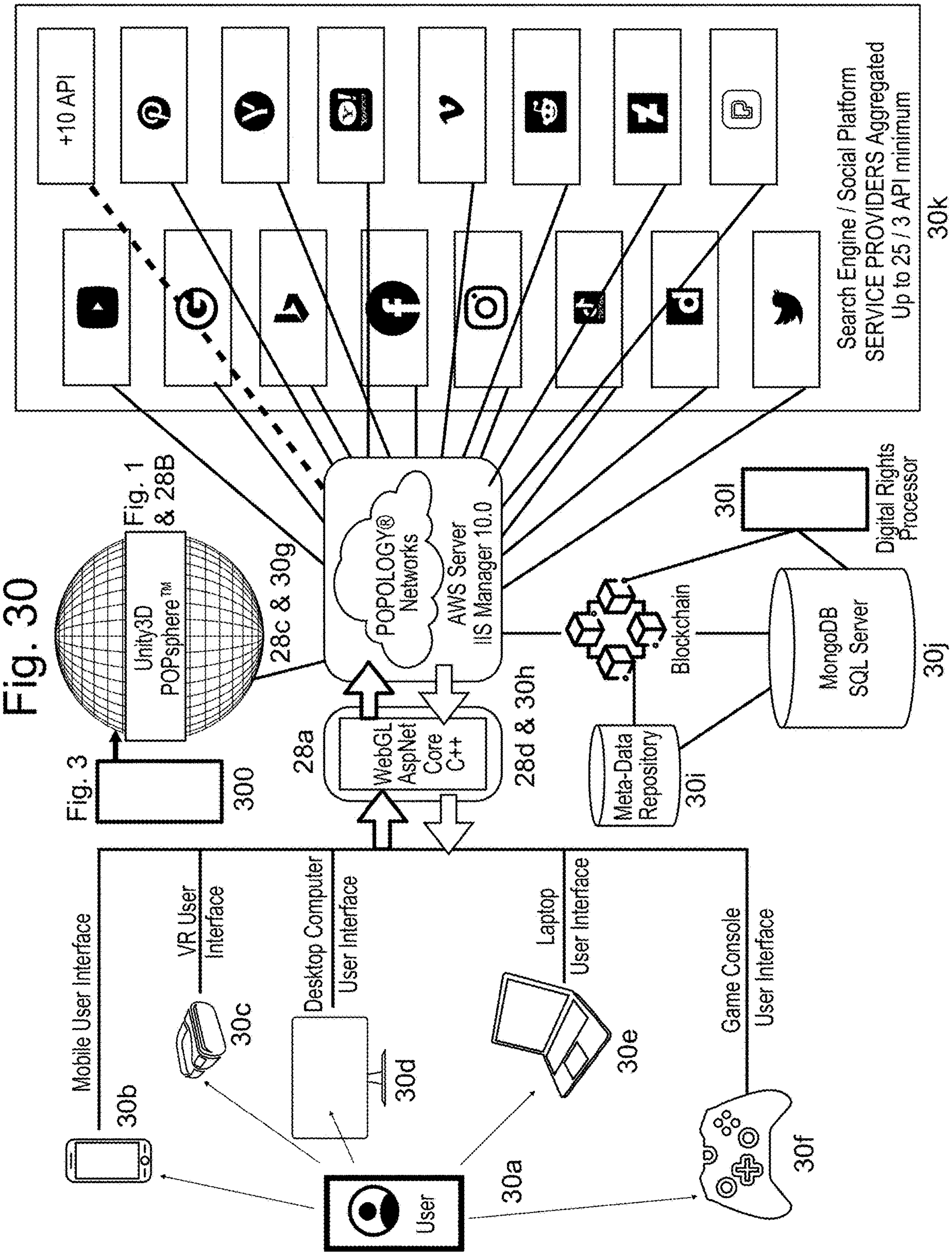
FIG. 30 represents an overview of the system of the components of the present invention.

Inner Workings Formula of FIG. 30. The POPOLOGY Networks platform is a Unity Game engine project formatted in-WebGL which (28*a*, 28*b*, & FIG. 1) delivers an immersive and 3D user interface/workspace providing functions of content population in web-linked digital rights assets from a pluralization of aggregated sources, up to 25 APIs and as little as 3 APIs are required to join the POPOLOGY Networks platform (30*k*).

This content ingestion process is masked inside of a framework of fetch components designed in ASP.net on AWS servers, that additionally generate URL calls to these aggregated sources and related servers via keyword searches, enabled by IIS Manager (30*g*).

This system architecture then parses the ingested content into visible media thumbnails to be imported (or populated) onto the POPsphere tiles, and if content is selected by user, the related meta-data is parsed to the appropriate dashboards after being assembled by MONGOdb (30*j*) and filtered from our meta-Data repository.

When the content is selected to the POPcast timeline from the POPsphere wall, the content is required to render onto our server (28*c* & 30*g*) additionally ledgering its platform origin, content title, duration of time of the content, license owner and other relevant data to the meta-data repository (30*i*).

Each and every behavior is also recorded and tracked onto the blockchain (28*d* & 30*h*) for rewards and smart contract assignments visible in the POPblock dashboard.

Software Menu & Described Use Purpose. WebGL is a JavaScript API for rendering interactive 2D and 3D graphics within any compatible web browser without the use of plug-ins. WebGL is fully integrated with other web standards, allowing GPU-accelerated usage of physics and image processing and effects as part of the web page canvas. ASP.NET Core is the open-source and cross-platform version of ASP.NET, a popular web development framework for building web apps on the.NET platform.

C++ is one of the world's most popular programming languages. C++ can be found in today's operating systems, Graphical User Interfaces, and embedded systems. C++ is a general-purpose programming language. IIS Manager/web administrators to modify website options, such as default pages, error pages, logging settings, security settings, and performance optimizations. IIS can serve both standard HTML webpages and dynamic webpages, such as ASP.NET applications and PHP pages.

Descriptor for POPmercial Advertising, The POPOLOGY Networks novel approach to advertisers and our users simultaneously is the gamified and intentional approach to "AD RETENTION". Most all other social or search engine platforms traditionally clutter pages or insert commercial media in skippable segments or banners for the user to potentially interact. The reality here is brand retention is minimal and has a reputation of being invasive and annoying. POPOLOGY has taken this into consideration and applied a unique gaming premise that reinvents a role in which the user selects the brands they desire to identify supporting in their already curated POPcast media stream. First the user watches numerous spots from selected brands (in our POPmercial Gallery) and fulfill placement of the required number of POPmercial Adverts for the desired POPcast audience reach. The number of spots to select is automated and calculated by the length of the users total curated POPcast stream. Each spot is placed in 15 min intervals. If a POPcast is less than 15 min then a POPmercial spot is calculated to be placed between each tile in the POPcast posted. Minimum 3 tiles make up a POPcast.

These adverts were placed into the POPmercial Gallery by the brand client for user placement at an average rate of $5 per 1,000 eyes. These spots are meta-tagged by our team incorporating various relevant themes, celebrity spokesperson and search criteria by keywords. They also each carry a POPtoken crypto payout reward for each viewing audience member of the total published POPcast which users are presented with. This POPcast is published as a sharable and promoted link in its own media player, with a non-scrubbable and removed fast forward controls, only pause or rewind, due to a custom watch code at the end of each POPcast for viewing audience members to redeem. This placement premise by the user initiates a care for the brands selected, and the viewers are aware of this "RELEVANT TO THE CREATOR" brand loyalty/brand endorsements that additionally reward the viewing audience to watch.

Monetization & Tokenomics Formula: Brand or Corp Direct client submit the spots intended to be accepted as a POPmercial collection, they also select the audience size and the window of time suggested for advertisement to run, (4 weeks, 8 weeks or 12 weeks.

On average $5 per 1,000 eyes in a 10 day cycle.

$5 per 1,000 is the formula we will start with . . . also consider 1,000 POPtoken=one $5 POPOLOGYcoin Spot #1 Tokenomic Sample $8,102.90 equals a reach of 1,620,580

We put $4,051.45 in the bank as our earnings.

$4,051.45 is left minus (18%) $729.26 for 2 Royalty Micro-Payments and Operation fees (1% of the 18% assigned as AICP Micro-payment & 10% of 18% #=Placement Royalty to Producer of record)=$80.21 Placement Royalty Paid (Leaving $649.00 in operations including Gamified bonus in POPtoken to Audience.

Now $3,322.19 to pay audience in POPtoken.

664.438 is the volume in POPtokens dispersed to 1,620,580 viewing audience members is paid 2.439 POPtoken each.

Spot #2 1 Tokenomic Sample $5,000 equals reach of 1 million people $2500 in the bank for us.

$2500 minus 18% for 2 Royalty Micro-Payments and Operation fees equals $2,050 left to pay 1 million people 410,000 POPtoken volume divided by one million people equals 2.439 POPtoken each paid out to each audience member.

Spot #3 1 Tokenomic Sample $6,500 equals a reach of 1,300,000

$3,250.00 in the bank $3,250.00 left minus 18% is $585 for 2 Royalty Micro-Payments and Operation fees Now $2,665.00 to pay audience in POPtoken.

533,000 is the volume in POPtoken dispersed to 1,300,000 viewing audience members is 2.439 POPtoken each.

POPOLOGY® Fair Use Structure: Navigating Utility and Innovation in the Digital Age. POPOLOGY®'s approach to "Fair Use" and its unique "Non-Infringement Structure" stands as a testament to a commitment to utility, innovation, and adherence to the law. As an Online Service Provider (OSP), the platform was designed to ensure the preservation and protection of creative expression while fostering a space for community interaction and learning:

1. POPOLOGY®8's meta-search engine operates on a distinctive premise. Instead of copying and storing actual videos, it intelligently retrieves links to content results—videos, articles, and more—directly from the web;
2. The inventions APIs generate third party use charges for permission quotas to use the APIs to search, retrieve, and display information from aggregated assets. By engaging in these mutually beneficial partnerships, legal standards are adhered to and contributions to the sustainable growth of content providers and creators are made;
3. The POPsphere includes a gallery of advertisements where brands and their agencies have willingly entered into agreements to showcase their video advertisements. These are full copies of the ads, including trailers and promotional materials, for which POPOLOGY® has obtained explicit permission. This unique approach benefits both advertisers, who gain exposure, and users, who enjoy relevant and engaging content;

4. The present invention promotes user-generated content as a means of creative expression. Users are encouraged to upload their original works, provided they confirm that these creations are entirely their own and not copied from others. While this does not eliminate the possibility of infringement, it underscores the platforms dedication to responsible content sharing; and
5. The platform may be enrolled in the Digital Millennium Copyright Act (DMCA) Safe Harbor program. This enrollment is not just a legal requirement; it the protection of the rights of content creators and fostering an environment where innovation thrives. By adhering to the DMCA Safe Harbor guidelines, copyright infringement claims are properly addressed while continuing to support the sharing of knowledge and culture.

The invention's groundbreaking approach includes a personalized and user assembled metasearch engine, an inventive technological concept in the digital landscape. Unlike traditional search engines that copy and store content, the inventive metasearch engine operates on a unique principle. It does not duplicate the actual videos or content but smartly retrieves native links to the content from the web. This innovative approach aligns with legal standards while allowing provision of an efficient and legally sound service.

The inventive platform introduces a groundbreaking utility that empowers users to drag and drop populated assets in the sphere directly into a timeline component that allows curation of a broadcast. What sets this apart is the use of integration into a Distributed Ledger Technology (DLT), specifically blockchain, as a Digital Rights Management (DRM) solution with component digital rights processor 301 as follows: when a user incorporates an asset into the broadcast timeline, it undergoes a transformation into part of a decentralized ledger, residing within a 501(*c*)(3) Community. This ledger, is cached and while transitory, serves multiple crucial purposes. One of the primary functions is content matching. The platform in conjunction with digital rights processing component 301 uses this ledger to identify authentic assets and content match them against potential imposters. This not only safeguards the integrity of content but also contributes to effective Digital Rights Management. The blockchain ledger enables the calculation of accurate ranking metrics for genuine popular content. It provides a transparent and tamper-proof record of an asset's popularity across various platforms on the global internet. The DLT blockchain utility may also enlist the public to fine-tune the attribution of credit to assets dispersed across the internet. For example, it may promote a community-driven effort that brings together people from the ecosystem to collaboratively ensure fair recognition and protection of intellectual property. Access to the blockchain records is carefully managed. While anyone within the platform ecosystem may view the blockchain records; copyright owners must be members of the platform. Ethical data management may allow credit to native links of searched content and temporarily caches them as mp4s on platform servers. This facilitates content matching services and contributes to the platform's robust Digital Rights Management feature. In essence, the platform's innovative approach to fair use, combined with the power of blockchain technology, transforms the digital landscape. It ensures content creators receive the credit they deserve while providing users with a dynamic and legally compliant platform for content sharing.

The platform introduces a revolutionary system and method for constructing a personalized and user-assembled meta-search engine. This system comprises a computational unit (referred to as the system processing component 305) that adeptly controls the overall system and retrieves, processes, and presents data. It further incorporates a diverse array of separate components, encompassing search engines, social media interfaces, and utility APIs, which operate collectively as an integrated algorithm, harmoniously facilitating data flow and interaction. The algorithm retrieves extensive streaming media search results from a minimum of three distinct API sources, including prominent search engines, dynamic social media platforms and versatile utility APIs. These search outcomes are seamlessly amalgamated into a unified Representational State Transfer (RESTful) API via RESTful API component 315, creating a centralized gateway for streamlined access. This API impressively tracks and records user behavior across all integrated APIs, both within and beyond the platform, effectively monitoring user interactions and activities. The system crafts a comprehensive and bundled algorithm that encapsulates the entirety of internet services actively engaged with by the user. Users are empowered to curate and customize content from the amalgamated streaming media search results, enhancing their interaction with the system. Notably, the bundled algorithm enables users to embed sponsored advertisements within a media stream, showcasing its prowess in curating and disseminating content. The final published media stream, comprising curated content and seamlessly integrated advertisements, undergoes a transformation into a blockchain-based non-fungible token (NFT). This unique process secures the content's authenticity, ownership, and traceability through blockchain registration. At its core, this inventive system relies on the bundled algorithm as the linchpin, orchestrating the seamless integration of diverse internet services, empowering user content curation, and safeguarding content through blockchain-based NFT publication.

In the inventive framework of the platform, a transformative process unfolds once the sphere's workspace is populated with a completed search keyword, fetching video thumbnails enriched with pertinent metadata. This metadata includes essential information such as source links to License Holder, Likes, views, duration, and posting date on the native platform, among others. Subsequently, the user gains the ability to seamlessly interact with this meticulously compiled content. The user, as an integral participant in this transformative process, is empowered to engage with this content through a user-friendly interface. Specifically, the user has the option to select and transfer desired content tiles from the sphere into the dynamic and versatile broadcast timeline. Notably, the system may accommodate the inclusion of up to 76 distinct content tiles within a single broadcast—a feature that distinguishes the platform in the digital landscape. The user is afforded the capability to "SAVE" and provide a distinctive title to their meticulously curated broadcast. Once this personalized creation is perfected, it can be seamlessly published to a player that aggregates media from all selected sources. Importantly, the native link to the content is maintained and duly credited on the respective native platform. This dual approach ensures continued visibility and accessibility of the content on its original platform, potentially accumulating additional views and engagement. Simultaneously, the system may cache the selected content tiles of the broadcast, primarily for digital rights management (DRM) purposes, which may encompass tasks such as content matching, facilitating copyright take-down notices, and contributing to the determination of true popular metrics across the vast expanse of the World Wide Web. This cache may be exclusively dedicated to DRM utility and adheres to the stringent DMCA safe harbor standards. The system operates as registered agents in this regard, further fortifying its commitment to safeguarding intellectual property rights, promoting content authenticity, and fostering a secure and innovative digital landscape. This innovative approach to content curation, protection, and management underscores the uniqueness and transformative capabilities of the platform, solidifying its position as a pioneering force in the digital realm.

The present invention represents an innovative paradigm shift in the realm of internet broadcasting, intertwining gamification and user empowerment. Through a meticulously crafted modular framework, users exercise creative control to curate personalized multimedia streams. The system may seamlessly fuse consumer-centric social branding, setting the stage for a user-centric experience.

A distinctive data empowerment mechanism is provided where users may assume the role of stakeholders, harnessing earned data from an array of interconnected social platforms funneled into the proprietary immersive display that may include a sphere. This aggregate of data amplifies user engagement and extends the value proposition beyond traditional content consumption. A component of the invention's innovation is a user-centric meta search engine, that may encompass a plurality of API components and in one embodiment up to 25 diverse social media, search engine and business utility platforms. This comprehensive amalgamation enables users to explore and gather content that resonates with their individual preferences, thereby fostering a sense of ownership and immersion. Once content is meticulously curated within the user's assembled meta search engine, the user exercises the prerogative to publish a personalized broadcast media stream. The integration of user selected commercial sponsors within these streams infuses an interactive and revenue-generating facet to the user experience; an "ORACLE-like platform on the blockchain. This innovation provides ultimate efficiency, transparency, and cyber security. Through this architecture, data tracking attains unprecedented levels of precision, ensuring seamless content curation, aggregation, and revenue generation in a secure and trust-enhancing environment.

The platform is an embodiment of technological prowess, marrying gamified broadcasting with cutting-edge data aggregation, blockchain transparency, and content curation. This novel blend revolutionizes content creation, distribution, and engagement, ushering in a new era of empowered user-driven media experiences.

The platform introduces a gamified "Proof of Work" mechanism that includes stake and mining, creating a novel and inventive system for income generation and value creation regarding video content placed in a broadcast streaming media timeline. The system offers users the ability to curate their own multimedia content streams through a specialized UI/UX design. Using a 360° scrollable spherical display with 2400 content windows aggregates search results from various platforms. The display of the present invention enables a display of all search results to the user. The display of all search results fosters cross-checking, objective assessment, and identification of misinformation by enabling users to directly compare contrasting content, enhancing content discovery through a unique user-oriented perspective. The innovative "Futures In Popular" feature introduces a novel approach to mining and value creation. By combining data collection on the subject of "true popularity" metrics and user-provided stake and mining weightings, the system introduces an inventive proof-of-work mechanism. This green implementation ensures that the process is energy-efficient and avoids excessive computational demands. The known methodology references wagering and monetization mechanisms in the context of "crowd wisdom" but lack the crucial "proof of work" and blockchain integration that define the present inventive system. The present platform uses the platforms "proof of work", instead of "crowd wisdom" in a consensus data premise. The most significant difference is the introduction of the "Futures In Popular" stake and mining mechanism in POPOLOGY®. This innovative approach harnesses users' data collection on "true popularity" metrics and combines it with blockchain-powered proof-of-work, value creation through user-provided weightings, and a unique wagering mechanism based on future video views. This combination introduces an entirely novel and inventive approach to income generation, engagement, and value creation.

The defining aspect of the present inventive system is the integration of blockchain technology and "proof of work" within the "Futures In Popular" mechanism. This technology empowers users to earn rewards through a sophisticated cryptographic process, ensuring data security, transparency, and value creation. This element is absent from the usual methods that rely on energy intensive calculations related to "crowd wisdom" calculations. The present invention introduces a comprehensive stake and mining system that incorporates prediction accuracy, user-defined weightings, and blockchain verification, contributing to a more advanced and innovative mechanism for rewarding users.

In another embodiment, the invention provides processing audio, video, and textual data to automatically categorize content into emotional categories via an emotion processing component 315 (FIG. 3A). The result is a visually highlighted color in each tile within the immersive display, enhancing the user experience by providing a quick emotional tone overview of the content by a color ledger. The system methodology analyzes, for example, the "emotional tone" such as happy, sad, fearful, angry, surprised, disgusted, happily surprised, happily disgusted, sadly fearful, sadly angry, sadly surprised, sadly disgusted, fearfully angry, fearfully surprised, fearfully disgusted, angrily surprised, angrily disgusted, disgustedly surprised, appalled, hatred, awed, that is conveyed by the content and categorizes the content into distinct buckets. These emotional states may be identified through facial expressions and other methods. An approach may also build upon machine learning and lexicon-based approaches as well as hybrids thereof in the categorization of content. Upon characterization, the tiles in the display are translated into a visually highlighted color that codes each emotion by forming a color ledgering system. The visual enhancement provides users with and immediate and intuitive understanding of the emotional content landscape. This system allows users to navigate and explore content based on emotional preferences, creating a more engaging and personalized user experience.

A further embodiment of the present invention introduces an innovative approach to personalized content recommendations through a user prediction processing component (UPC 315). By harnessing the power of artificial intelligence (AI) and machine learning (ML), the system algorithms predict user preferences culminating in the creation of a personalized user broadcast. The AI and ML algorithm components 310, analyze and interpret user behavior based upon historical content interactions of user patterns, trends and preferences. This continuous learning process enhances the precision of subsequent recommendations. The AI and ML components dissect user interactions with various types of content, identifying key indicators of preferences. This includes, for example, the duration of content consumption, interaction frequency and content categories engage with by the user. The system may employ predictive modeling techniques to forecast what content a user is likely to enjoy in the future. These predictions may be based on the comprehensive understanding of the user's historical interactions, ensuring that the personalized content recommendations align closely with their evolving tastes. The culmination of this methodology is the creation of personalized broadcasts. These curated content streams are dynamically assembled to cater specifically to the user's preferences, providing an enriched and tailored content consumption experience.

A further embodiment of this invention introduces a sophisticated mechanism for users using a smart playlist processing component 315. The technology is underpinned by advanced natural language processing (NLP) component 310 (FIG. 3A). The system leverages NLP algorithms to Analyze textual user inputs. Users can express their desired story plots or thematic preferences through text-based interactions with the platform. The NLP engine comprehends and interprets these inputs, extracting valuable information regarding the user's content preferences. Unlike traditional content recommendation systems, this system places active content creation in the hands of users. Through the use of NLP, users can type in specific story plots, themes, or content elements they wish to see included in their broadcasts. This user-initiated approach enhances engagement by making users integral to the content curation process. The extracted preferences from user inputs are dynamically integrated into the creation of personalized content playlists. The system ensures that the resulting broadcasts align closely with the user's stated preferences, fostering a highly personalized and engaging content consumption experience.

In yet another embodiment of this invention a system for identifying and tagging content bias may be provided using a bias processing component 315. This system may be the platform introducing an innovative approach to recognizing and categorizing content bias, including in relation to political or social perspectives. The system may employ advanced textual analysis algorithms to scrutinize content for potential bias. This includes linguistic pattern recognition and fact-checking mechanisms that assess the veracity of the information presented in the content. To enhance the precision of bias identification, the system may incorporate user-generated content labels. Users can contribute insights and perspectives, adding a valuable human element to the bias-detection process. This crowdsourced information contributes to a more comprehensive understanding of content bias. Upon identification of bias, the system tags the content accordingly. This tagged content may be visually highlighted with a distinctive color within each tile in the immersive display ensuring that users can quickly and intuitively discern the potential bias of a piece of content. One of the key features of this system may be its commitment to transparency. By visually marking biased content, users are provided with a transparent indication of the potential slant or partiality of the information they are consuming. The tagging and highlighting of biased content are seamlessly integrated into the user interface of the platform using the bias processing component 315. This ensures a user-friendly experience where individuals can navigate and engage with content while being informed about potential biases.

A further embodiment may provide a method for creating a story arc algorithm, using a story arc processing component 315. This method involves analyzing video content to determine the storyline's structure, encompassing exposition, rising action, climax, falling action, and resolution. It enhances user understanding of narrative structures. This methodology within the platform introduces a cutting-edge approach to understanding and analyzing video content for the purpose of creating a story arc algorithm (story arc processing 315) within a broadcast. The core of this method may involve a sophisticated analysis of video content, including video, audio, and textual elements. Advanced algorithms are employed to dissect the content and identify crucial elements such as exposition, rising action, climax, falling action, and resolution. The method goes beyond conventional content analysis by specifically targeting narrative structures. It is designed to recognize and comprehend the inherent structure of a story, ensuring a nuanced understanding of how the plot unfolds over time in an extended broadcast. This may involve the formulation and implementation of algorithms that encapsulate the Identified narrative elements using an encapsulation utilizing the story arc processing component 315. The algorithms are created to not only recognize these components within individual pieces of content but also to categorize and organize them in a meaningful way. The ultimate goal of this method is to enhance user understanding of narrative structures. By employing the developed story arch algorithm, users can gain insights into the storytelling techniques employed in multimedia content. This could be presented through visual aids, metadata, or other user interface elements. The algorithm may be designed to evolve and adapt based on continuous learning. As more multimedia content is processed, the algorithm may refine its understanding of narrative structures, ensuring an ongoing improvement in its analytical capabilities. This methodology secures the unique method implemented by the platform for creating a story arc algorithm. It covers the intricate process of multimedia content analysis, algorithmic implementation, and user interface integration aimed at enhancing user understanding of narrative structures.

A further feature of the present invention may result in a system for generating visual representations of content story arcs, allowing users to quickly grasp narrative structures and emotional progressions. It may provide a visual aid for users to better understand and explore content. The system within the platform may revolutionize the user experience by introducing a sophisticated mechanism for generating visual representations of content story arcs. This involves a combination of artificial intelligence, multimedia content analysis, and user interface design. The system may employ advanced algorithms to analyze multimedia content, including video, audio, and textual elements. It may dissect the content to identify key elements such as exposition, rising action, climax, falling action, and resolution. This analysis may form the basis for constructing visual representations of the content's narrative structure using a visual representation processing component. To enhance the accuracy and efficiency of content analysis, artificial intelligence (AI) may be integrated into the system. AI algorithms 310 contribute to the identification of story arc components, enabling a nuanced and detailed representation of the narrative progression. Visual representations may be seamlessly integrated into the user interface of the platform. The design may ensure that users can easily access and interpret these visual aids, providing an intuitive and immersive experience. The visual representations may take the form of interactive graphs, timelines, or other graphical elements. The system may be engineered to facilitate a quick and comprehensive understanding of the narrative structure. Users can, at a glance, grasp the key phases of a story, understand the emotional progression and make informed decisions about engaging with the content. The system may encompass the fusion of multimedia content analysis, artificial intelligence, and user interface design to provide users with an unparalleled tool for understanding and exploring narrative structures.

Yet a further embodiment of this invention may provide a means for detecting content bias. This method may detect content bias and political leanings through linguistic pattern analysis, fact-checking, and user reviews. Visual indicators of potential bias and source reliability may be provided, aiding users in making informed content choices using a content bias processing component 315. This method within the platform may introduce a sophisticated approach to detecting content bias and political leanings. It may employ a multifaceted analysis that includes linguistic pattern analysis, fact-checking procedures, and user reviews. The method may utilize advanced natural language processing (NLP) algorithms 310 to dissect the linguistic patterns present in the content. This involves examining the text for any indicators of bias, such as loaded language, framing, or selective presentation of facts. To enhance the accuracy of bias detection, the method may incorporate fact-checking mechanisms. It may cross-reference information within the content with reputable fact-checking databases, flagging potential inaccuracies or biases in the presented information. User-generated reviews may play a crucial role in bias detection. The method considers the sentiments and opinions expressed by users in their reviews. Patterns in user feedback, especially regarding perceived bias, may contribute to the overall assessment. Upon detecting potential bias, the method may provide visual indicators within the POPOLOGY® interface. These indicators serve as cues to users, highlighting the likelihood of bias in the content. Visual elements may include color-coded markers or icons associated with different types of bias and may, for example include the color coding of tiles or groups of tiles. The method may assess the reliability of the content source. This may involve evaluating the credibility of the publisher, fact-checking history, and overall reputation. Users may be presented with this inion to aid them in gauging the of the content. This secures the innovative method employed by the platform in detecting content bias. It may encompass linguistic pattern analysis, fact-checking integration and user review analysis to provide users with transparent insights into potential biases in content.

Additionally, the present invention's bias processing component 315 may include customizable content bias filters that may be customized to tailor content recommendations to their political preferences. It may empower users to curate their content experience based on their individual biases. This system within the platform may integrate advanced algorithms and user interface features to create a personalized and tailored content experience. The system may include a user-friendly interface that allows individuals to set and adjust content bias filters according to their preferences. Users can specify preferences related to affiliations, ideologies, or specific content elements they wish to include or exclude. Behind the user interface, sophisticated algorithms may adapt content recommendations based on the customized filters. These algorithms may take into account the user's specified preferences and intelligently curate content suggestions that align with those preferences. The system may incorporate machine learning techniques 310 to continuously refine and adapt the content bias filters over time. As users interact with the platform and provide feedback, the system may learn and adjust its recommendations to better align with the evolving preferences of the user. Content bias filters may operate in real-time, ensuring that users receive relevant and personalized recommendations as they explore the platform. The system may dynamically adjust its suggestions based on the user's interactions and the real-time analysis of their preferences. This patent may safeguard the unique technological and algorithmic processes involved in the creation and operation of customizable content bias filters within the platform. It may encompass the user interface design, the adaptive algorithms, and the integration of machine learning for continuous improvement.

A further embodiment may provide a methodology for generating bias score for video content included in the bias processing component 315. This method quantifies potential slant or partiality in video content based on linguistic and visual cues. It provides users with a bias score, aiding them in evaluating the objectivity of the content. This method may be an integral component of the platform, specifically designed to assess and quantify potential bias or partiality in video content. Leveraging advanced algorithms, linguistic analysis, and computer vision technologies, the system may evaluate both textual and visual elements within videos. The method may employ natural language processing (NLP) algorithms 310 to analyze spoken words, dialogues, and textual overlays within video content. It may identify linguistic patterns, keywords, and contextual cues that may indicate a particular bias. For visual cues, the system may utilize computer vision algorithms to analyze the visual elements in the video, including images, scenes, and graphical content. It may assess visual aspects such as color schemes, imagery choices and editing techniques to identify potential biases. The combination of linguistic and visual analysis may result in the generation of a bias score for the video content. This score may be a numerical representation of the content's potential slant or partiality. The algorithm may consider a spectrum of biases, allowing for nuanced scoring that goes beyond a binary classification. The bias score may then be presented to users within the platform, providing them with valuable insights into the content's objectivity. This may aid users in making informed decisions about the content they consume, promoting media literacy and empowering users to navigate content with awareness of potential biases. This may secure the unique method employed by for generating bias scores for video content. It may encompass the algorithms, processes and technologies involved in linguistic and visual analysis, as well as the overall methodology for calculating and presenting bias scores to users.

A system for allowing users to customize content bias filters, tailoring content recommendations to their political preferences using bias processing component 315. This system may operate within the platform, allowing users to customize content bias filters. The technology involves a sophisticated algorithm that analyzes various factors, including linguistic patterns, metadata, and user interactions, to assess the political bias of content. Users are provided with a user-friendly interface within the platform to set their content bias preferences. Upon user customization, the system may adjust its recommendation algorithms, taking into account the specified political preferences. It may employ machine learning techniques to continuously refine and adapt these filters based on the user's content interactions over time. The system integrates seamlessly with the broader content recommendation infrastructure of enhancing the user experience by tailoring content suggestions to align with individual political leanings. This method may involve timestamping and storing content metadata, including licensing and ownership information, on a blockchain. The purpose is to create a secure and verifiable record of content rights, usage, ensuring the integrity of intellectual property claims and accurate metrics of respective contents "true popular" facilitated by the users on the world wide web overall.

A further embodiment may provide a method for time-stamping and storing content metadata on a blockchain. This method within the platform may introduce a robust metadata storage processing component 30*i* for timestamping and securely storing content metadata on a blockchain. This process is pivotal in establishing an immutable and transparent record of content rights, licensing information, and ownership details. The method may seamlessly integrate with a blockchain infrastructure, utilizing its decentralized and tamper-resistant nature. When content metadata is time-stamped and stored on the blockchain, it becomes part of an unalterable ledger distributed across multiple nodes, ensuring the highest level of security and transparency. The method may employ cryptographic timestamping techniques to affix an indisputable timestamp to the content metadata. This timestamp may serve as a digital notary, providing a precise record of when specific actions related to the content, such as licensing or ownership updates, occurred. The content metadata may include comprehensive details such as licensing agreements, ownership records, and any pertinent information defining the intellectual property rights associated with the content. Each of these components may be meticulously timestamped and stored on the blockchain. Once recorded on the blockchain, the content metadata may form an immutable record. This may mean that no entity can alter or manipulate the stored information. Any changes or updates to the metadata are captured through additional timestamped entries, ensuring a complete and verifiable history.

In another aspect of the present invention, information and media literacy precepts Within a gamified internet broadcast network are established. The immersive user interface ("UI") aggregates content from diverse API components displayed within a scrollable arrangement that facilitates cross-source content exploration enhancing media literacy by exposing users to varied perspectives. The integration of educational metrics, matricies of popular at large and meta data delivery offer real-time insights into popular media consumption patterns across the UI wherein user media literacy comprehension of prevalent content preferences and behaviors are enabled. This fosters critical analysis vulnerability algorithm and misinformation. The media creation process wherein users assemble content from multiple media search results into a personalized broadcast of media streams allows users to create multimedia narratives encompassing various perspectives fostering media literacy through active content curation and storytelling. An innovative algorithm identifying bias and misinformation in media assets and/or tiles by analyzing content within the UI may highlight biases, imbalances and/or misinformation enables users to critically evaluate media content from an informed perspective. Users may insert into their broadcasts advertising placements featuring educational values incorporating informative and socially responsible content alongside brand messaging, encouraging users to critically evaluate the advertising messages for enhance media literacy. A Stake & Mining gaming feature educating users about Proof of Work (PoW) on the blockchain, where users predict future views of video content in their POPcast media streams, staking POPtoken wagers on prediction accuracy and earning POPtoken for accurate predictions, promoting PoW and blockchain understanding in a gamified manner; and education on popular at large results. The encompassing system synergizing lateral content discovery, educational matrices of popular at large, media curation, misinformation bias detection, responsible advertising, and blockchain education, fosters holistic information and media literacy in an immersive environment. This outlined system revolutionizes information and media literacy. The UI enables content aggregation across platforms, exposing users to diverse perspectives. Educational metrics provide real-time insights into media consumption patterns, enhancing media literacy. The media curation process empowers Citizen Journalism and storytelling, cultivating media literacy. The bias-detection algorithm highlights content biases, enabling critical evaluation. Educational advertising placements encourage critical analysis. The Stake & Mining gaming feature educates about PoW and blockchain through interactive prediction. This comprehensive system advances information & media literacy by synergistically combining the foregoing components.

One combination of the foregoing described components includes A system for constructing a personalized and user-assembled meta-search engine to generate search engine results that are displayed as video tiles to allow a user to curate a broadcast by assembling the tiles that can be published and ledgered onto a blockchain-based non-fungible token and foster tracking of behaviors comprising: at least one system processing component programed to perform operations associated with the system; a plurality of separate search engine, social media, and utility application programming interface (API) components configured to operate collectively as the initial search algorithm, further configured to return meta search engine results as video tiles; said system configured to retrieve aggregated streaming media search results from a plurality of components to form a bundled algorithm, wherein data and search results from said bundled algorithm are seamlessly integrated to generate a single RESTful API that is ledgered on a blockchain; a display component configured to assemble and display all of the retrieved video tiles for review by a user; a broadcast media stream component the user curates from the displayed video tiles; an advertising gallery component configured to present media streams of sponsored advertisements that may be embedded within the broadcast; a blockchain component configured so the broadcast may be published and ledgered as a blockchain-based non-fungible token (NFT); and a Restful API component including data and search result behaviors configured to be ledgered in the blockchain for monetization as data reports and subscriptions.

The system may further include a user prediction component ("UPC") 315 configured to predict user preferences based upon historical user content interactions, including patterns, trends and preferences unique to each user, further configured to provide key indicators of preferences including duration of content consumption, interaction frequency and content category engagement wherein the UPC incorporates artificial intelligence and machine learning components configured to analyze and interpret user content interactions and provide continuous learning processes including by employing predictive modeling techniques to forecast content user is likely to employ in the future.

The system of may further include a smart playlist component 315 configured to analyze textual user inputs in broadcasts of story plots to help enable creation of personalized content playlists wherein the smart playlist component includes natural language processing components configured to analyze textual user inputs, user story plots, thematic preferences to extract user content preferences.

The system may also include a story arc processing component 315 configured to analyze video content to determine storyline structure encompassing exposition, rising action, climax, falling action and resolution, specifically targeting narrative structures. Additionally, included in the story arc processing component may be a narrative encapsulation component 315 configured to recognize and encapsulate the identified narrative elements and organize these elements in a meaningful way whereby user understanding fosters storytelling techniques employed in multimedia content.

The system also may include an automatic an emotional processing component 315 configured to process audio, video and textual data to automatically categorize content into different emotional tone categories that may further include an emotion highlighting component configured to display a visually highlighted color within each tile to provide an emotional overview of the content by color ledger.

The system includes a broadcast that contains various story points and a broadcast media stream component configured such that users can compare and contrast opposing story points of any streaming media tile based on the API component source. The display component 1 of the system may include a spherical metaverse configured to display all of the retrieved content video tiles to be selected for user curation of a broadcast. The stake and mining component of the system may be configured for calculation of proof of work by forecasting the number of views any respective video tile or combination in the broadcast will receive in a given time period, further configured to allow a wager to be placed on the forecast of the number of views and pay out rewards if said wager is correct. Additionally, the blockchain component may be further configured to track as data, the views of the sponsored media branding video tiles wherein the leveraging of the number of views over a predicted duration in time is used to achieve consensus, thus eliminating the need for energy-intensive computational tasks.

Methodologies are provided for constructing a personalized and user-assembled meta search engine having at least one processing component operatively associated with the user-assembled meta-search engine comprising: selecting a plurality of separate search engine, social media, and utility application programming interface (API) components, wherein said components are configured to operate collectively as a bundled algorithm; for retrieving streaming media search results, wherein said bundled algorithm seamlessly integrates data and search results from said components to generate a single RESTful API component 315; for curating content from the aggregated streaming media search results into a broadcast, embedding media streaming sponsored advertisements within the broadcast and publishing said broadcast as a blockchain-based non-fungible token (NFT). Further included is a method for making a wager on the broadcast, calculating proof of work by forecasting the number of views the broadcast will receive in a given time period and mining rewards for being correct.

A further method and component is used in digital rights management (DRM) 301 and content policing, wherein the search results include at least two similar search result tiles which are called competing assets, by assigning a unique asset ID number to each tile of curated streaming media, caching each asset in said curated streaming media, comparing cached assets to identify content matches, determining which of the cached assets resulted from an original source and notifying the owner or stakeholder of the asset from the original source.

In yet another application of the present invention, a method for establishing Information and media literacy precepts within a gamified internet broadcast network, is provided for fostering holistic information and media literacy in an immersive environment comprising the steps of aggregating content from diverse API components displayed within an arrangement that facilitates cross-source content exploration enhancing media literacy by exposing users to varied perspectives; integrating educational metrics, matrices of popular at large and meta data delivery to offer real-time insights into popular media consumption patterns across the UI wherein user media literacy comprehension of prevalent content preferences and behaviors are enabled by fostering critical analysis vulnerability algorithm and misinformation; assembling users assemble content from multiple media search results into a personalized broadcast of media streams that allows users to create multimedia narratives encompassing various perspectives fostering media literacy through active content curation and storytelling; identifying bias and misinformation in media assets from an informed perspective by analyzing search result content represented by tiles within the UI to highlight biases, imbalances and/or misinformation; and educating users about Proof of Work (PoW) on the blockchain and popular at large by allowing users to predict future views within a given time period. This aspect may further include inserting into user broadcasts, advertising placements featuring educational values incorporating informative and socially responsible content alongside brand messaging, wherein users are encouraged to critically evaluate the advertising messages for enhanced media literacy, activating content bias filters, customizing the content bias filters to include user preferences, and curating broadcasts whereby the broadcast is curated based upon the user's biases, generating a bias score for video content including the steps of quantifying bias values for given content based upon linguistic and visual cues, and curating broadcasts using content quantified by selected bias values. Further, natural language processing algorithms may calculate bias values by analyzing spoken words, dialogues and textual overlays in the video content to identify linguistic patterns, keywords and contextual cues that indicate a particular bias, wherein visual aspects including color schemes, imagery choices and editing techniques that identify biases may be utilized. A method for generating bias scores for selected content may be used by combining user reviews, user interactions, fact checking, linguistic and visual analysis results (collectively, "interactions") and empowering users to navigate the contents objectivity by virtue of the bias scores. Further, the user may be evaluated in view of the user's interactions.

In yet another application of the present invention, a method for facilitating seamless transition between a personalized content creation metaverse 350 and virtual worlds within a unified metaverse framework 360 may include branded content within each metaverse as well as various virtual worlds, including providing a personalized content curation metaverse for users to create broadcasts from streaming media; providing virtual worlds within a unified metaverse network; providing tools and protocols for brands to acquire virtual land and establish virtual environments within their virtual environment metaverse; hosting virtual metaverse worlds where users can engage with content, purchase merchandise and experience brand specific activation. The virtual metaverse worlds may be compatible with virtual reality ("VR") devices, Apple glasses and other VR platforms that ensure wide accessibility and user engagement. The present invention may also include tools to design, develop and deploy virtual environments integrating e-commerce, live events and interactive experiences, Brand metaverse worlds may include gaming worlds, music worlds, e-commerce worlds, where users can engage in gaming, watch musical performances, purchase merchandise, access exclusive content and combinations thereof. User may transition between many metaverses 360+n. A further feature allows the user to invited friends into, for example, e-commerce metaverses and to have multiplayer competitions in gamified worlds including by and among fellow metaverse members.

In yet a further embodiment, a non-transitory computer readable medium containing program instructions when executed by a computer performs a method of constructing a personalized and user-assembled meta-search engine that includes user data and behaviors and displays streaming media search results in the form of video tiles which are curated into a broadcast and includes user selected media streaming sponsored video advertisements, a published curated broadcast as a blockchain-based non-fungible token and may include stake and wagering of anticipated views of the tiles for a given time period for cryptographic token rewards and to solve an associated cryptographic puzzle for each block in a blockchain, comprising the steps of: selecting by a user multiple Application Programming Interface (API) components that may include a plurality of separate Application Programing Interfaces (APIs) selected from search engines, social media memberships, business utilities and their combinations, wherein said Application Programing Interface (API) components operate collectively as an initial algorithm; retrieving streaming media search results in the form of video tiles using said initial algorithm; generating a single Representational State Transfer Application Programing Interface (RESTful API) by seamlessly integrating user data and behaviors search results from said API components into a bundled algorithm; curating by a user, content from the streaming media search results into a broadcast; embedding media streaming sponsored video advertisements selected and placed by the user within the broadcast; and publishing said broadcast as a blockchain-based non-fungible token (NFT). The non-transitory computer readable medium of the present invention may include the further methods described in this specification.

In yet a further embodiment of the present invention, a system including media elements for constructing an initial search algorithm having search indicia as a personalized and user assembled meta-search engine to generate video content trusted streaming media search results displayed as tiles within a metaverse that allow a user to curate a broadcast of selected media tiles and media sponsored advertisements stored in a database memory having instructions stored therein, that upon users selection form a data base component of sponsored video advertisements that can be published and legered into a blockchain that includes views and user behaviors for cryptographic token rewards, and fosters tracking of user data and behaviors comprising: one or more processors programed to perform operations associated with the system; one or more data bases having a memory configured for storing a plurality of media elements, stored instructions and resultant information from operations associated with the system; at least one central processing unit server having a memory interface to access the database and instructions stored in the memory and including one or more processors each configured for executing the stored instructions for performing at least one operation in the system on the media elements and to service the system including: Application Programming Interface (API) components, that include Application Programming Interfaces (APIs) selected by a user from the group consisting of search engines, social media memberships, business utilities and their combinations; a user-assembled meta-search engine component including multiple of the Application Programming Interface (API) components to operate collectively as the initial search algorithm, further configured to retrieve aggregated streaming media search results; a Representational State Transfer Application Programing Interface (Restful API) component that seamlessly integrates user data and behaviors; an immersive user interface (UI) component that displays each tile from the streaming media search results for each Application Programming Interface (API) component; a user curated broadcast media streaming component configured from tiles the user selects in the user interface (UI) component; a data base component containing sponsored video advertisements that are stored in the data base memory, wherein the media stream of sponsored video advertisements may be selected and embedded within the broadcast by the user; a blockchain component, wherein said broadcast may be subsequently published and ledgered on the blockchain as a blockchain-based non-fungible token (NFT); and a Representational State Transfer Application Programing Interface (Restful API) component having user data and behaviors ledgered on the blockchain for cryptographic token rewards as data reports and subscriptions. The system may further include components described and inferred from the description of the specification herein.

The foregoing embodiments allow integration and/or connection to multiple metaverses related to shopping, branded stores, entertainment, subscriptions, streaming content of a variety of entertainment including motion pictures, concerts, sporting events, gaming and the like. Additional features such as virtual reality, artificial intelligence, OTT, and on demand features may be integrated into the platform and its features.

Although embodiments have been described with reference to specific embodiments, it will be evident that various modifications and changes can be made to these specific embodiments without departing from the broader spirit and scope of the present application. Accordingly, the specification and drawings are to be regarded in an illustrative rather than a restrictive sense.

What is claimed is:

1. A computer-implemented system comprising:

a system processing component;

a plurality of separate search engine, social media, and utility application programming interface (API) components configured to retrieve streaming media search results from a plurality of API sources;

a bundled algorithm configured to integrate the streaming media search results;

a display component configured to display the streaming media search results as video tiles;

a broadcast media stream component configured to receive user selection of video tiles to assemble a broadcast media stream from a subset of video tiles placed by the user in a timeline;

a smart contract protocol component configured to verify ownership information and licensing information associated with selected video tiles before publication;

a blockchain component configured to publish the broadcast media stream as a blockchain-based non-fungible token (NFT) upon verification of the ownership and licensing information.

2. The system of claim 1, wherein the display component comprises an immersive sphere.

3. The system of claim 2, wherein the sphere displays a plurality of content tiles from multiple API sources simultaneously.

4. The system of claim 1, wherein the bundled algorithm is a representational state transfer application programing interface (RESTful API) that records user behaviors associated with integrated API components.

5. A computer-implemented method comprising:

retrieving streaming media search results from a plurality of search engine, social media and utility API components;

integrating the streaming media search results;

displaying the streaming media search results as video tiles;

receiving user selection of video tiles;

assembling a broadcast media stream from the selected video tiles into a timeline to render it into a broadcast;

generating a verifiable broadcast record associated with the timeline;

executing smart-contract logic to enforce licensing and advertising guidelines associated with the broadcast, publishing the broadcast media stream as a blockchain-based NFT provided the licensing and advertising guidelines are met.

6. The method of claim 5 further comprising associating source links with selected video tiles.

7. The method of claim 5 further comprising verifying ownership information and licensing information before publication.

8. A non-transitory computer-readable medium storing instructions which, when executed, perform the method of claim 5.

9. A computer-implemented system comprising:

a broadcast media stream component configured to receive user selection of video tiles to assemble broadcast media stream content from a subset of video tiles placed by the user in a timeline;

a blockchain ledger;

a metadata storage component;

a digital rights management component;

and a smart contract protocol configured to timestamp and store ownership information and licensing information associated with broadcast media stream content in the blockchain ledger, wherein publication of streaming media content is controlled by the smart contract protocol.

10. The system of claim 9 wherein ownership information comprises ownership records associated with streaming media content.

11. The system of claim 9, wherein licensing information comprises licensing agreements associated with streaming media content.

12. The system of claim 9, wherein ownership information and licensing information are timestamped.

13. The system of claim 12 wherein blockchain records are distributed across a plurality of computing nodes.

14. The system of claim 9, wherein blockchain entries establish a verifiable history of content rights transactions.

15. The system of claim 9 further comprising generating then comparing cached assets to identify content matches.

16. The system of claim 15 further comprising identifying an original source asset.

17. The system of claim 15 further comprising notifying a stakeholder associated with the original source asset of the content matches.

18. The system of claim 9 wherein the digital rights management component performs content matching.

19. The system of claim 9 wherein the digital rights management component performs attribution verification.

20. The system of claim 9 wherein the digital rights management component performs ownership verification.

21. The system of claim 9 wherein the digital rights management component performs source verification.

22. The system of claim 9 wherein publication is permitted only after verification of ownership information and licensing information.

23. A computer-implemented method wherein a broadcast media stream component is configured to receive user selection of video tiles to assemble broadcast media stream content from a subset of video tiles placed by the user in a timeline comprising:

displaying streaming media content;

receiving a forecast of future views associated with the streaming media content;

receiving a stake value associated with the forecast;

recording the forecast and stake value in a blockchain ledger;

calculating proof of work based upon the forecast; and issuing rewards when the forecast satisfies predetermined conditions.

24. The method of claim 23 wherein the forecast relates to a future time period.

25. The method of claim 23 wherein proof of work utilizes view metrics.

26. The method of claim 23 wherein blockchain validation is based upon popularity metrics.

27. The method of claim 23 wherein rewards comprise POPtoken rewards.

28. The method of claim 23 wherein a smart contract protocol records the forecast and stake value.

29. The method of claim 23 wherein forecasting is performed for media contained within a broadcast media stream.

30. The method of claim 23 wherein forecasting is performed for media associated with sponsored advertisements.

* * * * *